(12) United States Patent
Kennedy et al.

(10) Patent No.: US 6,826,204 B2
(45) Date of Patent: Nov. 30, 2004

(54) Q-SWITCHED $CO_2$ LASER FOR MATERIAL PROCESSING

(75) Inventors: John T. Kennedy, Granby, CT (US); Richard A. Hart, North Granby, CT (US); Lanny Laughman, Bolton, CT (US); Joel Fontanella, Tolland, CT (US); Anthony J. Demaria, West Hartford, CT (US); Leon A. Newman, Glastonbury, CT (US); Robert Henschke, East Hampton, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/116,392

(22) Filed: Apr. 4, 2002

(65) Prior Publication Data

US 2003/0156615 A1 Aug. 21, 2003

Related U.S. Application Data

(60) Provisional application No. 60/281,516, filed on Apr. 4, 2001.

(51) Int. Cl.[7] .................................................. H01S 3/11
(52) U.S. Cl. .............................. 372/10; 372/55; 372/93
(58) Field of Search ............................. 372/93, 10, 55, 372/25, 29.01

(56) References Cited

U.S. PATENT DOCUMENTS

| | | | |
|---|---|---|---|
| 3,772,611 A | 11/1973 | Smith | 331/94.5 |
| 3,820,038 A | 6/1974 | Tomlinson | |
| 4,030,839 A | 6/1977 | Rickert | 356/251 |
| 4,169,251 A | 9/1979 | Laakmann | 331/94.5 |
| 4,221,463 A | 9/1980 | Barsack et al. | |
| 4,363,126 A | 12/1982 | Chenausky et al. | 372/38 |
| 4,393,517 A | 7/1983 | Buser et al. | |
| 4,719,639 A | 1/1988 | Tulip | 372/66 |
| 4,787,090 A | 11/1988 | Newman et al. | 372/82 |
| 4,815,094 A | 3/1989 | Cantoni | 372/93 |

(List continued on next page.)

FOREIGN PATENT DOCUMENTS

WO     WO 98/40939     9/1998

OTHER PUBLICATIONS

"Review CW High Power CO2 Lasers", Anthony J. DeMaria, Proceeding of the IEEE, vol. 61, pp. 731–745 (1973) "Power Scaling of Laser Area Transverse RF Discharge CO2 Lasers", Abramski, et al., Applied Physics Letter, vol. 54, pp. 1833–1835 (1989).

(List continued on next page.)

*Primary Examiner*—Don Wong
*Assistant Examiner*—James Menefee
(74) *Attorney, Agent, or Firm*—Stallman & Pollock LLP

(57) ABSTRACT

A simultaneously super pulsed Q-switched $CO_2$ laser system for material processing is disclosed. The system comprises sealed-off folded waveguides with folded mirrors that are thin film coated to select the output wavelength of the laser. The system also comprises a plurality of reflective devices defining a cavity; a gain medium positioned within the cavity for generating a laser beam; a cavity loss modulator for modulating the laser beam, generating thereby one or more laser pulses; a pulsed signal generation system connected to the cavity loss modulator for delivering pulsed signals to the cavity loss modulator thereby controlling the state of optical loss within the cavity; a control unit connected to the pulsed signal generation system for controlling the pulsed signal generation system; and a pulse clipping circuit receptive of a portion of the laser beam and connected to the pulsed signal generation system for truncating a part of the laser pulses.

11 Claims, 37 Drawing Sheets

U.S. PATENT DOCUMENTS

| | | | |
|---|---|---|---|
| 4,891,819 A | 1/1990 | Sutter, Jr. et al. | 372/82 |
| 5,177,748 A | 1/1993 | Zhang | 372/18 |
| 5,220,576 A | 6/1993 | Krueger et al. | 372/87 |
| 5,299,223 A | 3/1994 | van der Wal | 372/94 |
| 5,353,297 A | 10/1994 | Koop et al. | 372/64 |
| 5,491,579 A | 2/1996 | Justus et al. | 359/241 |
| 5,600,668 A | 2/1997 | Erichsen et al. | 372/87 |
| 5,610,936 A | 3/1997 | Cantoni | 372/93 |
| 5,654,782 A | 8/1997 | Morokawa et al. | 349/143 |
| 5,748,663 A | 5/1998 | Chenausky | 372/64 |
| 5,881,087 A | 3/1999 | Sukhman et al. | 372/61 |
| 5,982,790 A | 11/1999 | Grossman et al. | |
| 6,697,408 B2 * | 2/2004 | Kennedy et al. | 372/55 |

OTHER PUBLICATIONS

BeO Capillary CO2 Waveguide Laser, Bukhardt, et al., Optics Communications, vol. 6, pp. 193–195 (Oct. 1972)
"Hollow Metallic and Dielectric Wave–guides for Long Distance Optical Transmission and Lasers", Marcatilli, et al., Bell System Technical Journal, vol. 43, pp. 1783–1809 (1964).

"Lasers", Anthony E. Siegman, University Science books, pp. 712–727 (1788) "Reflection Polarizers for the vacuum ultraviolet using Al+MgF2 mirrors and an MgF2 plate", Hass, et al., Applied Optics, vol. 17, Jan. 1, 1978.

"Polarization Studies in the vacuum Ultraviolet", Hamm, et al. Journal of the Optical Society of America, vol. 55, No. 11, pp 1460–1463 (1965) "Reflective device for polarization rotation", Greninger, Applied Optics vol. 27, No. 4 pp 774–776 (1988).

"Radiofrequency–Discharge–Excited CO2 Lasers", Hall, et al. pp. 165–258.

Patent Abstracts of Japan for Publication No. 02211684, dated Aug. 22, 1990.

H. Imai et al., "Etching of Polyimide by a Q–switched $CO_2$ Laser," *Proceedings of SPIE—in High–Power Lasers in Manufacturing*, vol. 3888 (2000) pp. 617–624.

T. Sakai et al., "A Q–Switched $CO_2$ Laser using Intense Pulsed RF Discharge and High Speed Rotating Chopper," *SPIE*, vol. 2502 (1994), pp. 25–30.

* cited by examiner

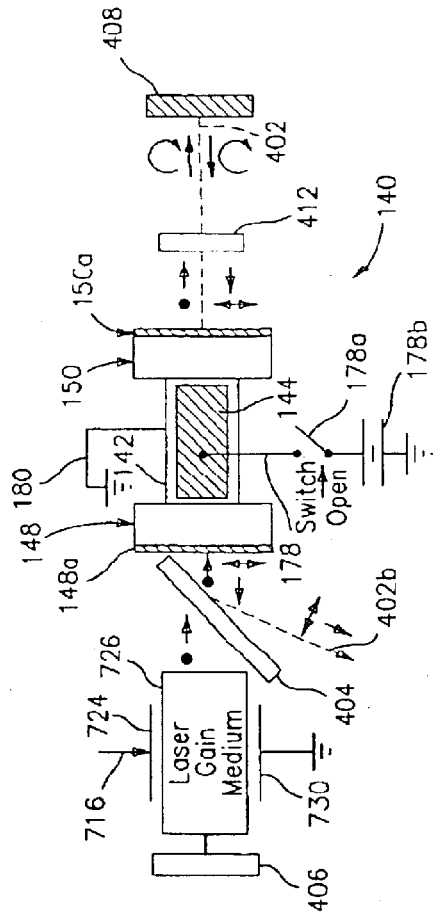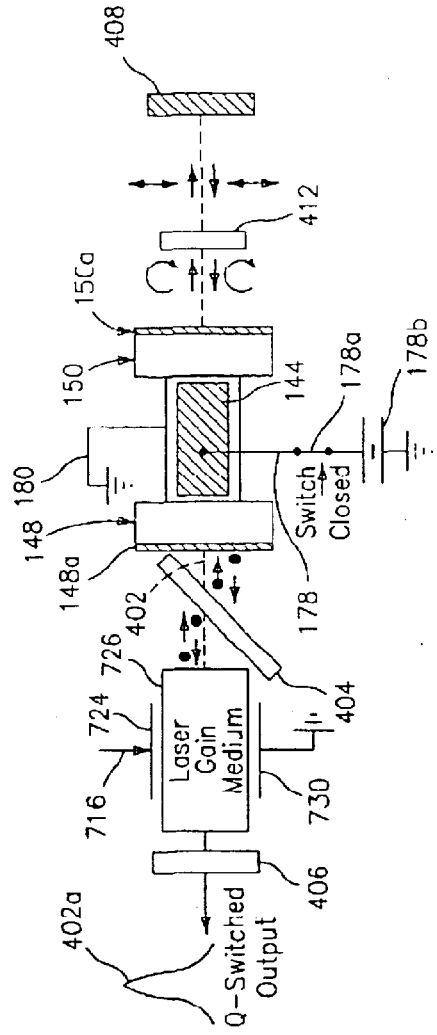
FIG. 16A
FIG. 16B

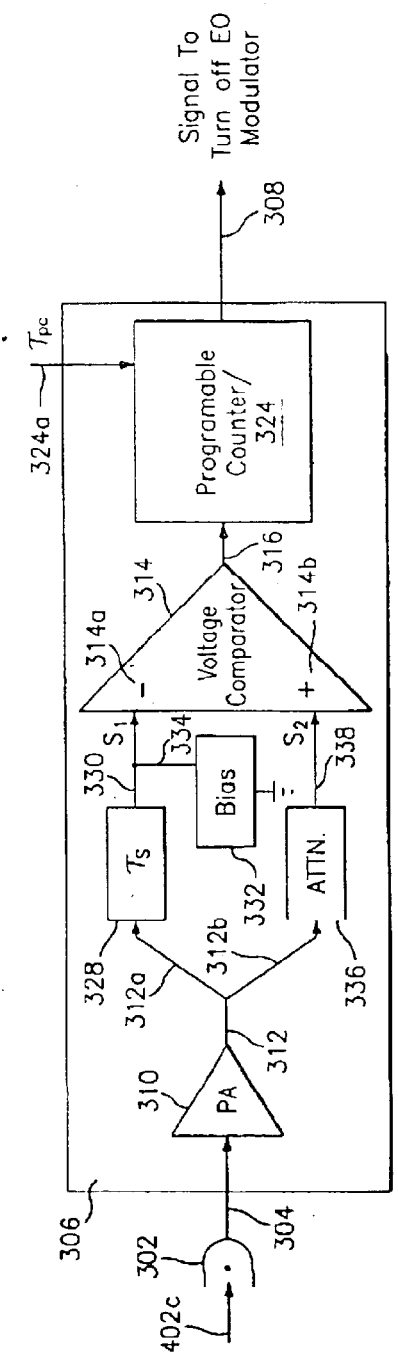
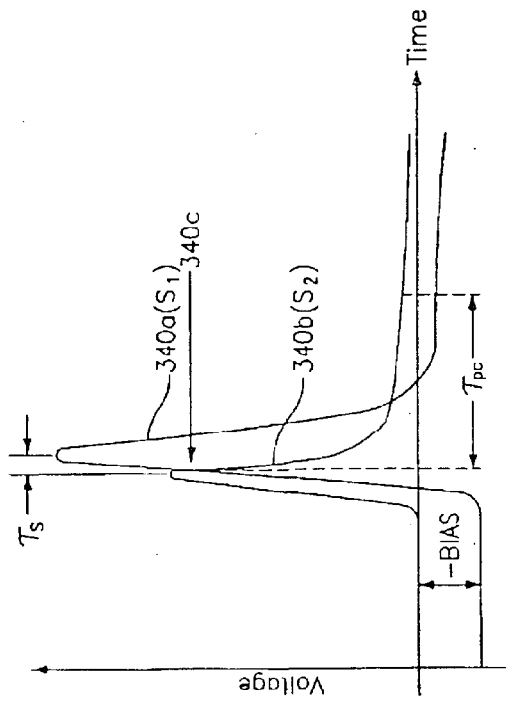
FIG. 22A
FIG. 22B

Q-SWITCHED $CO_2$ LASER FOR MATERIAL PROCESSING

RELATED APPLICATIONS

This application claims the benefit of the filing date of U.S. Provisional Patent Application No. 60/281,516, which was filed on Apr. 4, 2001 and is incorporated herein by reference.

TECHNICAL FIELD

This invention relates to short pulse Q-switched and simultaneously super pulsed and Q-switched $CO_2$ lasers and more particularly to such lasers in material processing.

BACKGROUND

It has become well appreciated in the laser machining industry that machined feature quality is improved as one utilizes shorter laser pulse widths and higher laser peak intensity in drilling holes. More specifically, the geometry of holes drilled with lasers become more consistent, and exhibits minimal recast layers and heat-affected zone around the holes as the laser pulses become shorter and their peak intensity becomes higher (XiangLi Chen and Xinbing Liu; *Short Pulsed Laser Machining: How Short is Short Enough*, J. Laser Applications, Vol. 11, No. 6, December 1999, which is incorporated herein by reference).

It is desirable to have the highest quality at the lowest cost but often one must choose a compromise. High-machined feature quality means low recast layer and heat-affected zone thickness, small surface roughness, accurate and stable machined dimensions. Low cost of ownership means a quick return on the investment made in the purchase of the laser machining equipment. Low cost of ownership also involves low maintenance, low operational costs, and high process speeds and yields in addition to low equipment cost. The choice of the laser parameters such as wavelength (IR, near IR, visible or UV lasers) and operational pulse format (milliseconds, microseconds, tenths of microseconds, nanoseconds, picosecond or femtosecond duration pulses) depends on the particular process, material design tolerance, as well as cost of ownership of the laser system.

Moving from lasers that function in the IR region (i.e. $CO_2$) to the near IR (i.e. YAG or YLF), to the visible (i.e. doubled YAG or YLF), to the near UV (i.e. tripled YAG, YLF or excimer lasers), the trend is toward higher equipment cost in terms of dollar per laser average output power and lower average power output (which are disadvantages) while also having a trend toward higher power density (w/cm²) because of the ability to focus shorter wavelengths to smaller spot sizes (which is an advantage).

Moving toward shorter pulsed widths, the laser costs and the peak power per pulse and therefore power density (W/cm²) both tend to increase, while the average power output tends to decrease which results in the cost in terms of dollars per laser output power to increase.

The recast layer and heat-affected zone thickness are greatly reduced when using nanosecond pulses over millisecond and microsecond wide laser pulses. (XiangLi Chen and Xinbing Liu; *Short Pulsed Laser Machining. How Short is Short Enough*, J. Laser Applications, Vol. 11, No. 6, December 1999) These improvements result from the higher laser beam intensity associated with the higher peak powers that are obtained with shorter laser pulses that utilize Q-switching, mode locking and other associated techniques and the fact that the pulse duration is shorter than the thermal diffusion time. For example, the typical thermal diffusion time for a 250 micron diameter hole is approximately 0.1 millisecond. In spite of the lower energy per pulse, high drilling speeds can still be cost effectively obtained because of the high pulse repetition rate obtained with these technologies. The high laser beam intensity provided by short laser pulses technology results in vaporization-dominated material removal rather than the melt-expulsion-dominated mechanisms using millisecond wide laser pulses. It is also known that shorter pulse width yield more limited heat diffusion into the surrounding material during the laser pulse. Hole-to-hole dimensional stability is also improved because the hole is drilled by the material being nibbled away by tens to hundreds of laser pulses of smaller pulse energy but occurring at a high pulse repetition frequency rather than by a few high-energy pulses. For the same reason, thermal and mechanical shocks from nanosecond pulses are also reduced compared with millisecond pulses. These advantageous effects obtained with nanosecond laser pulses have been detected by observing fewer micocracks occurring when holes were drilled in brittle materials such as ceramic and glass when utilizing nanosecond laser pulses.

When the intensity is further increased through laser mode locking techniques to get down to the subnanosecond pulse width (i.e. picoseconds and femtosecond region), additional reductions in the recast and heat-affected zones are observed. Since a typical electron energy transfer time is in the order of several picoseconds, femtosecond laser pulse energy is deposited before any significant electron energy transfer occurs within the skin depth of the material. This forms a plasma that eventually explodes and evaporates the material leaving almost no melt or heat-affected zone. Due to the small energy per pulse (~1 mJ), any shock that is generated is weak resulting in no microcracks even in brittle ceramic alumna material. Femtosecond pulses are not presently obtainable with $CO_2$ lasers due to the narrow gain of the laser line. Femtosecond pulses are presently obtainable with solid-state lasers.

For the same total irradiated laser energy, femtosecond pulses remove two to three times more material than the nanosecond pulses. However, even "hero" type, one of a kind experimental, state of the art laser research and development systems that operate in the femtosecond range deliver only several watts of average power, while nanosecond lasers yield one or two order of magnitude higher power output. Consequently, femtosecond lasers are still too low in average power to deliver the required processing speeds for most commercial applications. It has been reported (XiangLi Chen and Xinbing Liu; *Short Pulsed Laser Machining: How Short is Short Enough*, J. Laser Applications, Vol. 11, No. 6, December 1999) that a 1W femtosecond laser requires more than a minute to drill a 1.0 mm deep hole of 0.1 mm diameter. Present femtosecond lasers have such high cost that their use is cost effective for only special high value applications that unfortunately have relative low unit volume market potential. For example, Lawerance Livermore National Lab has made use of the fact that femtosecond laser pulse energy is deposited essentially with no thermal transfer to cut and shape highly sensitive explosive materials without denotation.

It is well known that the trend for optical absorption in metals as a function of wavelength is toward lower absorption with increasing wavelengths as shown in FIG. 1. Consequently, the near IR, visible and ultra violet wavelength regions are most effective in machining most metals. This advantage does not exist in plastic material. The data contained in FIG. 1 is not relevant once a plasma is initiated on the metal surface because all of the laser energy is absorbed in the plasma, which in turn imparts the energy to the material. Once the plasma is initiated, the absorption as a function of wavelength variation for metals becomes essentially flat. Consequently, one can paint the surface of the metal for greater absorption at longer wavelengths and the higher absorption advantage of shorter laser wavelengths is effectively eliminated.

The electronics industry has needs to shrink the size of semiconductor and hybrid packages, and greatly increase the density of printed circuit boards because of the market desire for smaller cellular phones, paging systems, digital cameras, lap top and hand held computers, etc. These needs have resulted in interest in the use of lasers to form small vertical layer-to-layer electrical paths (via) in printed circuit boards. The short pulse $CO_2$ laser is particularly attractive for drilling via holes in printed circuit boards because of 1. the high absorption of the printed circuit board or hybrid circuits resin or ceramic material at the $CO_2$ wavelength when compared to YAG or YLF lasers which operate in the near IR and in the visible and UV wavelength regions with harmonic generating technique; 2. the lower cost per watts associated with $CO_2$ lasers when compared to YAG lasers, and 3. because of the high reflectivity of copper at $CO_2$ wavelengths, which enables $CO_2$ laser via hole drilling equipment to drill through the resin layer down to the copper layer where the drilling is stopped because of the high reflectivity of the copper interconnect material at the $CO_2$ laser wavelengths. These are called "blind via," which connect the outer layer of a circuit to the underlying inner layer within the multi layer board. The major disadvantages of $CO_2$ lasers in via hole drilling is the larger spot size obtainable with its 10.6 micron wavelength when compared to shorter wavelength laser. Another disadvantage is that pulse widths below several nanoseconds are difficult to obtain with $CO_2$ lasers. The major advantages of $CO_2$ Q-switched lasers are: they offer lower cost per watt of laser output when compared with solid state lasers, higher absorption of their radiation by resin and ceramic board materials, their ability to operate at high PRF, their ability to generate substantial output power under Q-switched operation, and their ability to stop drilling when the radiation gets to the copper layer.

The advantages of drilling via holes in printed circuit boards with laser systems have enabled laser systems to capture 70% of the via hole machine drilling market in 1999 (David Moser; *Laser Tools For Via Formation,* Industrial Laser Solutions, p. 35, May, 2000, which is incorporated herein by reference), with the remaining 25% of the market held by photo-via and the remaining 5% by other techniques, such as mechanical drilling, punch and plasma etching.

The upper $CO_2$ laser transition level has a relatively long decay rate for storing larger than normal population inversion (385 $torr^{-1}$ $sec^{-1}$ at 300 K and approximately 1300 $torr^{-1}$ $sec^{-1}$ at 500 K). The lower $CO_2$ laser levels for both the 9.4 and 10.4 transitions are approximately an order of magnitude faster so a large population inversion between the lower levels and the upper level can be easily maintained. Laser mediums that have transitions with long lifetime upper energy levels are good candidates for application of Q-switched techniques (A. E. Siegman; Lasers, Chapt. 26, University Science Books, 1986, which is incorporated herein by reference). The long lifetime of the upper levels store energy by building up a higher than normal population with respect to the lower laser level. Consequently, $CO_2$ lasers are good candidates for performing Q-switching (G. W. Flynn et al; *Progress and Applications of Q-switching Techniques Using Molecular Gas Lasers,* IEEE J. Quant. Electronics, Vol. QE-2, p. 378–381, September 1966, which is incorporated herein by reference).

Q-switching is a widely used technique in which a larger than normal population inversion is created within a laser medium by initially providing for a large loss within the feedback cavity. After a large inversion is obtained, one quickly removes the large optical loss within the feedback cavity, thereby quickly switching the cavity Q back to its usual large value (i.e. low loss value). This results in a very short intense burst of laser output, which dumps all the excess population inversion into the short laser pulse (A. E. Siegman; *Lasers,* Chapt. 26, University Science Books, 1986).

FIG. 2A typically illustrates the time dependent variation of the losses within the feedback cavity that can be obtained with either a rotating feedback mirror, an electro-optics modulator (i.e. switch) or with an acousto-optics switch inserted in the lasers feedback cavity under continuous pumping condition, $P_{RFCW}$, of FIG. 2B. FIG. 2A also illustrates the time dependent gain variation experience by the continuously excited laser under the internal cavity loss variations illustrated. The gain is allowed to rise for an optimum time of about one or two population decay time of the upper $CO_2$ laser level. At such an optimum time, the cavity loss is switched from a high loss to the normal loss condition (i.e. the Q of the cavity is switched from a low to a high value condition) by applying a high voltage pulse, say to the electro-optic modulator (EOM) as shown in FIG. 2B. Since the gain greatly exceeds the losses at this point, laser oscillations by stimulated emission begins with the output building up exponentially, resulting in the emission of a giant laser output pulse whose peak power is hundreds of times larger than the continuous power of the laser. The pulse has a long tail, which will eventually decay down to the lasers' CW power level as long as the gain exceeds the feedback cavity loss. In most cases, this tail is detrimental to a hole drilling process. This invention will provide a solution to this long pulse tail problem. When the high loss cavity condition is again switched on, the laser action stops and the described dynamic process of gain build up is repeated.

To the present time, Q-switched $CO_2$ lasers have not found extensive commercial application, as have solid-state lasers (whose upper state life times are measured in seconds instead of tenths of seconds as for the $CO_2$ laser). Nearly all of the Q-switched $CO_2$ laser applications to date have addressed predominately military applications. Some of the reasons for the lack of interest in commercial $CO_2$ Q-switched lasers are high cost of the electro-optic crystal (namely CdTe), limited suppliers for the electro-optic (EO) crystals, large performance variation between different optical paths within an EO crystal and large performance variation between different crystals. There is also difficulty in obtaining good anti reflection thin-film coatings on CdTe crystals. In addition, electro-optic modulators cannot be easily replaced by acousto optic modulators in the IR because they have higher attenuation and poorer extinction performance than in the visible region, as well as larger thermal distortion and poorer reliability. Q-switched $CO_2$ lasers were also considered to have poorer reliability than the Q-switched solid state laser which was mostly caused by the CdTe crystals. Consequently, superpulsed or externally gated CW laser operation of diffusion cooled $CO_2$ lasers or TEA laser techniques have been utilized with $CO_2$ lasers to satisfy most short pulse $CO_2$ laser needs to date (A. J. DeMaria; *Review of CW High Power $CO_2$ Lasers,* Proceedings of the IEEE, pg. 731–748, June 1973, which is incorporated herein by reference). Mechanically Q-switched $CO_2$ laser have also been utilized but they do not have the pulsing flexibility of electronically Q-switched lasers.

For these reasons, techniques such as gated CW and super pulse, along with acousto-optic deflection external to the optical cavity of either CW or super pulsed lasers into a aperture have been predominately utilized to date with $CO_2$ lasers to obtain IR laser pulses for industrial applications, even though each of these techniques are deficient when compared with $CO_2$ Q-switching techniques in one or more of the following: longer pulse widths with slower rise time, lower pulse repetition frequencies (PRF), lower over all laser efficiencies, long duration tails associated with the pulses and lower peak powers. TEA lasers have also been used to date, but they suffer from higher time jitter from pulse to pulse, higher pulsed voltage requirements along with associate acoustic shock noise and non-sealed off laser operation which requires gas flow.

Thus it is desirable to make the Q-switched $CO_2$ laser lower in cost, more reliable, enable the cost effective utilization of the present state of the art of CdTe electro-optics crystal technology without sacrificing Q-switching performance, and obtaining higher peak power and shorter pulses by simultaneously utilizing super pulse and Q-switching techniques as well as cavity dumping techniques, and utilizing the same EO modulator to clip off the long tail of the laser pulses usually obtained with Q-Switching techniques. It is desirable to make Q-switched $CO_2$ lasers commercially practical for numerous hole drilling applications, especially for via hole drilling of printed circuit board and for laser marking of stressed glass containers holding a vacuum or partial vacuum or a pressure higher than ambient pressure such as automobile headlights, flat panel displays, cathode ray tubes for TVs and computers, street lights, light bulbs stressed plate glass in automobiles or pressured glass or plastic containers containing soft drinks, beer, etc.

SUMMARY OF THE INVENTION

FIG. 3 illustrates a block diagram of a laser material processing system. The system includes the laser head and its power unit, which may or may not have an internal controller. An RF power unit is preferred. The RF unit can be operated CW or in a super pulsed mode. The super pulsed mode of operation is used to obtain increased peak power laser pulses. The laser head and its power unit and controller are usually provided by a laser supplier, while the controller for the XY scanning system, the scanners, the keyboard, the optical shutter and a display unit are usually the responsibility of the original equipment manufacturer. The original equipment manufacturer (OEM) controller commands the scanning system and the display unit and sends signals to the laser controller, which in turn commands the laser head. If the laser is liquid cooled, a chiller is required which either the laser manufacturer or the systems OEM can supply. Usually, the OEM chooses to supply the chiller. Laser beam shaping optics are usually required between the laser head and the scanners.

Either the laser manufacturer or the OEM system manufacturer can supply the laser beam shaping optics. This overview block diagram is essentially identical to a block diagram used to describe laser engraving, marking, cutting and drilling systems for desk top manufacturing type applications with the software being basically the differentiating portion of the system. The system OEM normally is responsible for the optical scanner, the system controller and its software and the displays.

The OEM system controller tells the XY optical scanning system where to point and informs the laser head through the controller within the laser's head power unit when to turn on or off and how much power is to be emitted. The OEM system controller also monitors and supervisors the chiller, and displays the desired information on the display unit to the system operator who usually enters commands through the keyboard that address the system controller. The system controllers and the laser power unit controller also perform appropriate diagnostics to protect the system from inadequate cooling, RF impedance mismatch between the laser discharge and the RF power supply, and safety features such opening and closing the systems optical shutter, etc.

FIG. 4 illustrates the modifications to FIG. 3 for the case when a Q-switched laser is utilized in the material processing system. In addition to commanding the laser power supply, the system controller performs calculations utilizing the input from the operator provided through the keyboard and issues commands regarding the laser modulation format (i.e. gated output or super pulse output for example, the timing of the Q-switched laser pulse along with pulse duration and repetition frequency, etc.) and monitoring the status of the laser head and its power supply as well as the chiller. The system controller also issues commands (and may receive signals) from the Q-switched power module. The system controller receives signal from an operator through a keyboard and commands as well as monitors the status of the optical shutter, which can be inserted either before or after the optical scanners. In some cases, the optical shutter is specified for inclusion at the direct exit of the laser beam out of the laser housing. If the shutter is included as part of the laser housing, the laser manufacturer supplies the optical shutter and its circuitry. The status of the system is displayed to the operator of the keyboard by an appropriate display unit. The Q-switching module of FIG. 4 is in principle the same for either a solid state or gas laser system with the major difference being the use of a different electro-optical crystal.

In addition to utilizing Q-switched lasers and even shorter pulsed laser systems, such as mode locked or cavity dumped short pulse laser systems for hole drilling applications, the Q-switched laser system of FIG. 4 can also be utilized to mark, encode or drill stressed glass vessels or structures as well as to perforate or punch holes in paper without charring. The advantage of utilizing Q-switched or cavity dumped lasers to mark or encode stressed glass containers, which have a pressure difference between the inside and outside surfaces of the containers, has not been appreciated nor recognized because laser systems for such applications have not been presently commercially available. Such containers include, for example, sealed glass automotive headlights, streetlights, cathode ray tubes, flat panel displays and beer, soda, and champagne bottles. Tempered glass surfaces of safety glass doors, windows, and automotive side windows are also good candidates for laser marking or encoding with short laser pulses because microcracks in brittle materials such as glass and ceramic materials are not generated by Q-switched or shorter laser pulses. If longer pulsed laser radiation is used to mark or encode such stress containers and glass surfaces, micro cracks are created at the location where the laser marks or encodes the glass. These microcracks become enlarged and propagate with time under the stress load to which the brittle material is subjected. $CO_2$ laser radiation is strongly absorbed by glass and ceramics so they are the laser of choice for such applications. Because of their size, power, cost and processing speed $CO_2$ lasers are preferred for non-metal processing of materials. UV radiations are also absorbed by glass material and are considered alternate lasers for such applications, but at higher cost and slower processing speeds.

The high laser beam intensity provided by short pulse laser technology results in the vaporization-dominated material removal rather than the melt-expulsion-dominated mechanisms using longer duration pulses. Thermal and mechanical shocks are reduced with the short laser pulse system of FIG. 4 when compared with longer pulse systems of FIG. 3. Consequently, micro cracks do not occur under laser marking or encoding with short pulse lasers. Cutting off the long Q-switched pulses long tail will prevent the development of micro cracks at the glass location, which is marked or encoded. The application of the laser system of FIG. 4 thereby opens up the market of direct marking or encoding on stressed glass containers and structures. Currently ink jets or other similar devices are used to mark or encode such glass containers and structures. Inkjets have well known disadvantages over laser marking/encoding system. Some of these disadvantages are their mark is not permanent and can rub off through handling and exposure to the environment, the inks and solvents are consumables and recurring costs can be high, the inks and solvents are toxics and dirty up the factory environment and the down time of inkjet marking systems is high which adds to their operating costs. The major advantage of inkjet marking systems for this application is low initial capital cost.

The drilling of numerous small holes in paper or plastic parts without charring the edges of the paper or plastic material is desired in many industries. Some examples are in the tobacco filtration, and in the banking and billing industries for perforating checks and other financial documents. In the past TEA lasers have been used for these applications. It has not been appreciated that Q-switched lasers can be utilized to perforate such materials. If higher energies are required than available with sealed-off Q-switched lasers, then a laser amplifier can be used to increase the pulse energy of the Q-switched laser. Q-switched lasers have output pulse repitition rates exceeding 100 kHz, while TEA lasers have practical PRR having an upper limit of about 500 Hz.

A Q-switched $CO_2$ laser system for material processing is disclosed. The system comprises a plurality of reflective devices defining a cavity. A gas discharge gain medium is positioned within the cavity for generating a laser beam and an electrical power supply is used to excite the discharge. A cavity loss modulator modulates the laser beam, generating thereby one or more laser pulses. A pulsed signal generation system is connected to the cavity loss modulator for delivering pulsed signals to the cavity loss modulator, thereby controlling the state of optical loss within the cavity. A control unit is connected to the pulsed signal generation system for controlling the pulsed signals delivered to the cavity loss modulator. A pulse tail clipping circuit is receptive of a portion of the laser beam and is connected to the pulsed signal generation system for truncating a part of the laser pulses.

The electro-optical crystal is birefringent. Consequently, stress will cause polarization changes in a laser beam, independent of any voltage applied to the crystal. The holder of the electro-optic crystal is designed to minimize stress on the crystal while holding the crystal firmly in place. The electro-optic crystal is piezoelectric, so the packaging of the crystal is such as to absorb the ultrasonic energy generated by the cavity loss modulator when a voltage is repetitively applied and removed. A thin Indium plate is utilized for this purpose.

The laser system includes a system for automatically terminating the generation of the laser. This feature is used to protect the laser from back reflection from the workpiece into the laser cavity, thereby preventing optical damage. This feature is also used to stop the laser from operating once the high reflecting surface, such as copper, is encountered. In FIG. 29, a first polarizing device receives the laser beam. A second polarizing device, receptive of the laser beam from the first polarizing device, is operative thereby to change the polarization of the laser beam from a first state to a second state. The second polarizing device is receptive of the laser beam in the second state of polarization, reflected from an object or work piece and is operative thereby to change the polarization of the laser beam from the second state to a third state. The first polarization device is also receptive of the laser beam, in the third state of polarization from the second polarizing device. A detector is receptive of the laser beam from the first polarization and provides an output signal indicative of the reflectance of the object. A comparator is provided for comparing the output signal of the detector with a reference signal. This generates an output signal indicative of the greater or lesser of the detector output signal or the reference signal. The laser system also includes a shutter system connected to the control unit for alternately blocking and passing the laser beam.

The pulsed signal generation system comprises a pulse receiver, connected to the control unit, providing electrical isolation. A pulsed signal generation switching circuit is receptive of pulsed signals from the pulse receiver and is operative thereby to charge or discharge the cavity loss modulator. A power supply powers the pulse receiver and the pulsed signal generation switching circuit. The pulsed signal generation switching circuit comprises a first switch connected to the power supply and to the cavity loss modulator and is receptive of a pulsed signal from the pulse receiver and is operative thereby to charge the cavity loss modulator when the first switch is in the closed position. A second switch is connected across the cavity loss modulator. The second switch is receptive of a pulsed signal from the pulse clipping circuit and operative thereby to discharge the cavity loss modulator when in the second switch is in the closed position and the first switch is in the open position.

The cavity loss modulator comprises an active optical crystal having an entrance surface receptive of the laser beam and an opposing laser beam exit surface. A first optical window has an optical entrance surface receptive of the laser beam and an opposing laser beam exit surface. The exit surface of the optical window is in physical contact with the entrance surface of the active optical crystal and thereby defines a first optical interface. An optical reflector is in physical contact with the laser beam exit surface of the active optical crystal thereby defining a second optical interface. The optical reflector is operative to receive the laser beam from the active optical crystal and to redirect the laser beam into the active optical crystal.

The laser system includes a multiple pass optical assembly comprising a first reflective device positioned within the cavity. The first reflective device is receptive of the laser beam from the cavity loss modulator and operative to redirect the laser beam into the cavity loss modulator. A second reflective device is positioned within the cavity receptive of the laser beam from the cavity loss modulator. The second reflective device is operative to redirect the laser beam into the cavity loss modulator. Thus multiple passes of the laser beam through the cavity loss modulator are realized. A plurality of mirrors which are wavelength selective mirrors comprise an output coupling mirror having high transmission at non-lasing wavelengths for coupling the laser beam out of the optical cavity; a plurality of laser beam turning mirrors having high reflectivity at lasing wavelengths for directing the laser beam between the waveguide channels; and a feedback mirror providing optical feedback to the laser cavity.

The laser system includes a phase grating for receiving the laser beam. The phase grating thus diffracts a portion of the laser beam away from the laser beam at a prescribed order and controls the amplitude of the Q-switched pulses.

A method of maintaining constant phase retardation induced in a laser beam by an electro-optic crystal in a repetitively Q-switched $CO_2$ laser is also disclosed. The method comprises maintaining zero voltage across the electro-optic crystal during the high optical loss interval of the Q-switching cycle; and maintaining a prescribed non-zero voltage across the electro-optic crystal during the low optical loss interval of the Q-switching cycle.

A method of operating a Q-switched $CO_2$ laser having a gain medium and a cavity loss modulator for material processing is disclosed that comprises energizing the gain medium for a first prescribed time duration; and energizing the cavity loss modulator for a second prescribed time duration causing the laser cavity to switch from a high loss state to a low loss state generating thereby one or more laser pulses.

A method of controlling the amplitude of the output pulses of a repetitively Q-switched $CO_2$ laser which includes a diffraction grating is disclosed that comprises diffracting a portion of the laser output pulses into a diffraction side order; and varying frequency of the diffraction grating.

BRIEF DESCRIPTION OF THE DRAWINGS

FIG. 16A is a first schematic diagram of an electro-optical modulator within a laser cavity with no voltage applied across the electro-optical crystal resulting in a state of high optical loss within the laser cavity.

FIG. 16B is a first schematic diagram of an electro-optical modulator in a laser cavity with a nonzero voltage applied across the electro-optical crystal resulting in a state of low optical loss within the laser cavity.

FIG. 22A is a second schematic diagram of an electronic circuit for truncating a portion of output pulse in a $CO_2$ Q-switched laser.

FIG. 22B is a graphical depiction of the variations in the triggering of the output of the circuit of FIG. 22A as a function of the time delay and attenuation of the output pulse in a $CO_2$ Q-switched laser.

DETAILED DESCRIPTION OF THE INVENTION

Q-Switched $CO_2$ Laser Housing

Figure 5:
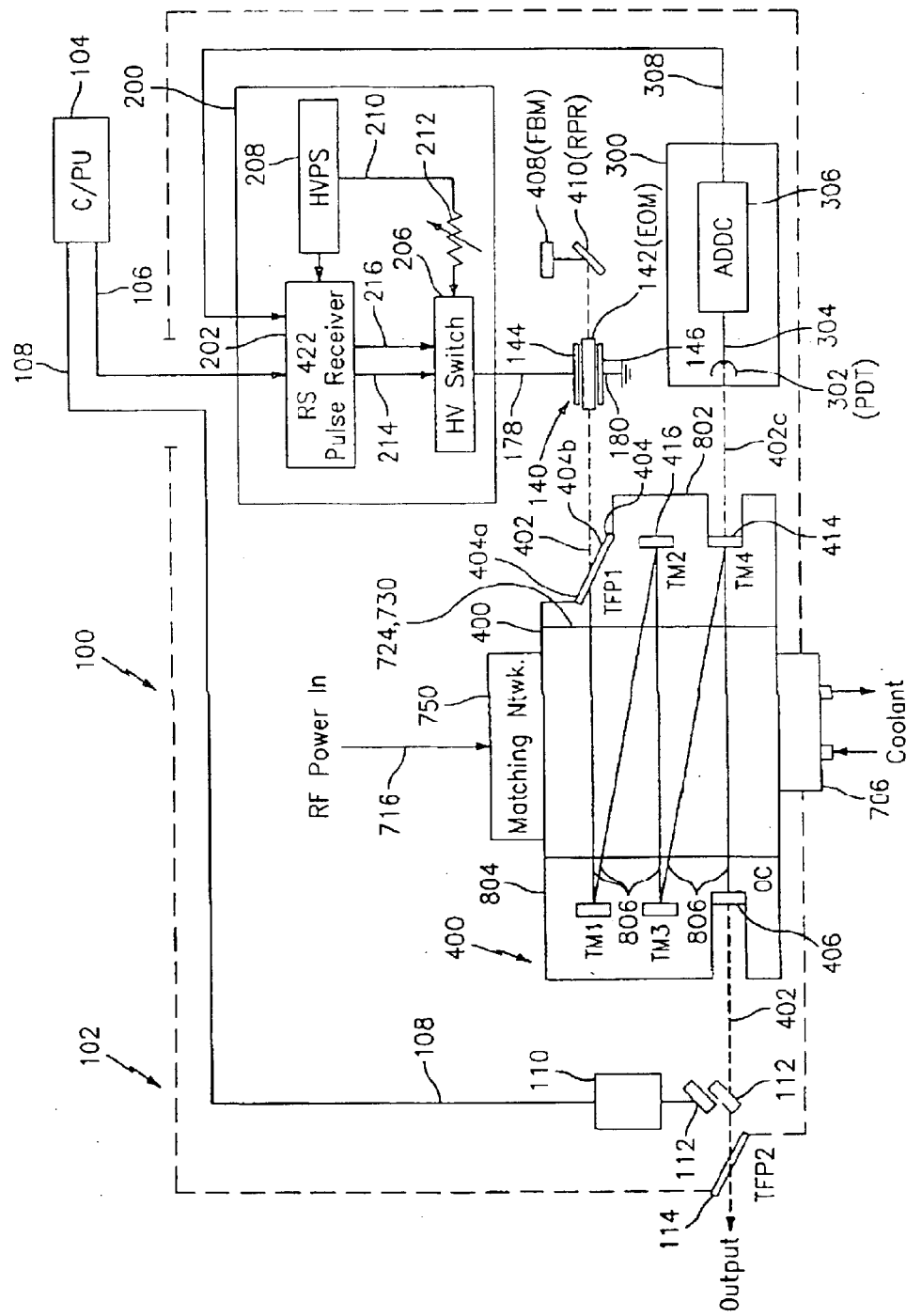
FIG. 5 is a first schematic diagram of a Q-switched $CO_2$ laser system for material processing.

FIG. 5 illustrates a schematic overview of a laser assembly 100, including a laser housing 102 containing a sealed-off, folded waveguide, electro-optically Q-switched $CO_2$ laser head 400 and various electronics, optical, an electro-optical modulator and electro-mechanical switches. A multiple pass zig-zag folded waveguide is shown at 806 within the laser head 400 for illustration purposes. A three pass or more than five pass folded waveguide configuration could also be used in the hermetically sealed laser head 400. An output coupling mirror (OC) 406 and turning mirror (TM) 414 utilize a metal O-ring to maintain the hermetical seal as disclosed in U.S. patent application Ser. No. 09/612,733 entitled High Power Waveguide Laser, filed on Jul. 10, 2000 (which is incorporated herein by reference in its entirety) and in U.S. provisional Patent Application Serial No. 60/041,092 entitled RF Excited Waveguide Laser filed on Mar. 14, 1997 (which is incorporated herein by reference in its entirety). The OC 406 and the TM 414 transmit radiation out of the hermetically sealed laser head 400 with the OC 406 transmitting approximately 51% and TM 414 approximately 1% or less. The mirror holder flange 804 for the OCM 406 and the TM 414 are as disclosed in U.S. provisional patent application Serial No. 60/041,092 entitled RF Excited Waveguide Laser filed on Mar. 14, 1997. Turning mirrors 416 (TM1, TM2, TM3), do not transmit radiation out of the laser head 400. The mirror holder flange 802 for turning mirrors 416 are the same as the disclosed in U.S. provisional Patent Application Serial No. 60/041,092 entitled RF Excited Waveguide Laser filed on Mar. 14, 1997.

Figure 6:
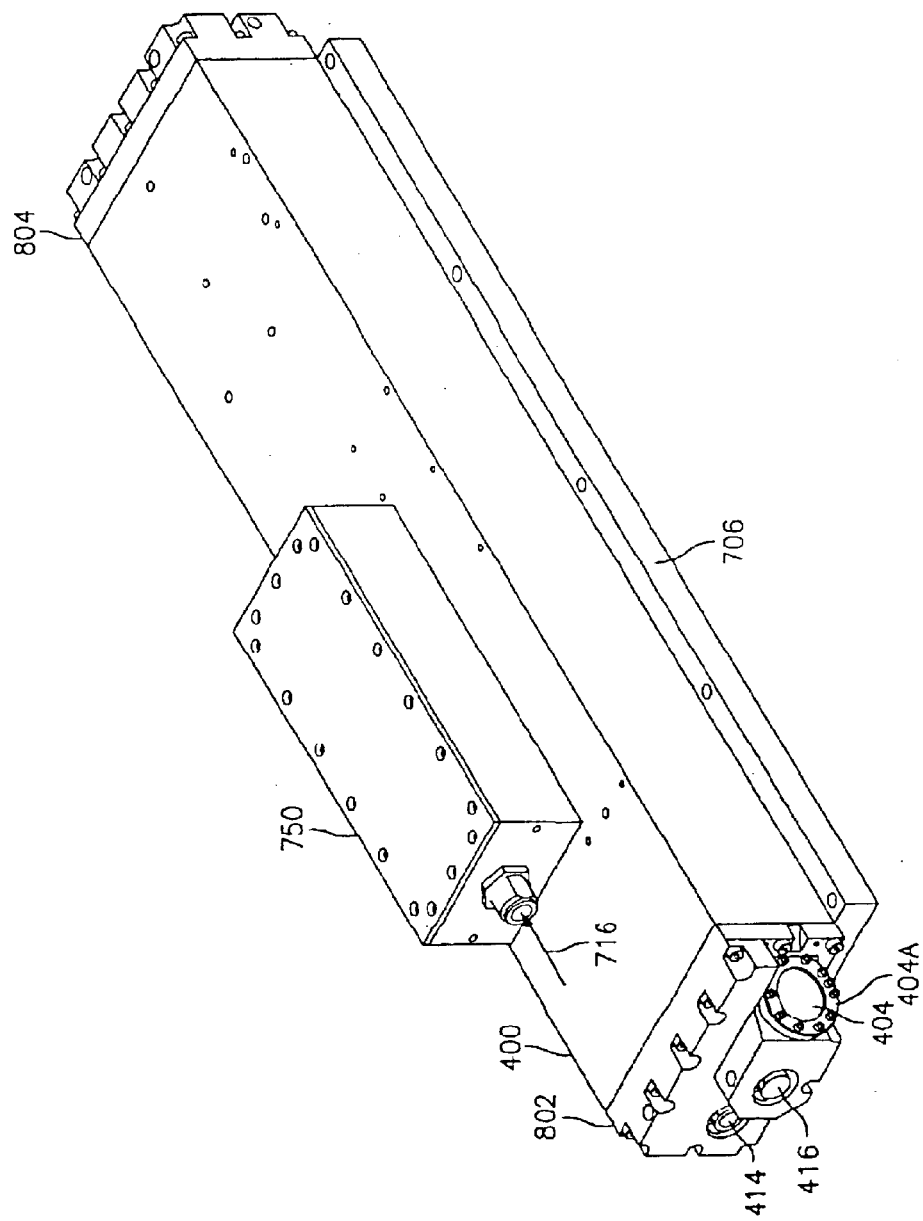
FIG. 6 is an isometric view of a laser head, with a heat exchanger, mirror holders and a housing for a RF phase matching network used in FIG. 5.

The mirror holder flange 802 for the thin film polarizer (TFP) 404 mounted on the laser head 400 is a modified version for OCM 406 and TM4 414. The modification is needed because of the larger diameter and the angle required for TFP 404. It is also a modified version of the mirror holder for thin film polarizer 114. The modification over the TFP 114 holder is required because of the need for thin film polarizer 404 to be mounted on the laser head 400, which requires a hermetical seal. TFP 114 is mounted on the laser housing 102 where a hermetical seal is not required. There is an option to place a window 404b in place of TFP 404 and then place TFP 404 outside of the laser head 400. FIG. 6 illustrates an isometric view of the laser head 400 with mirror holder flanges 802 and 804 containing the TFP 404 and its retainer ring 404a, as well as mirrors 416 and 414.

Figure 7:
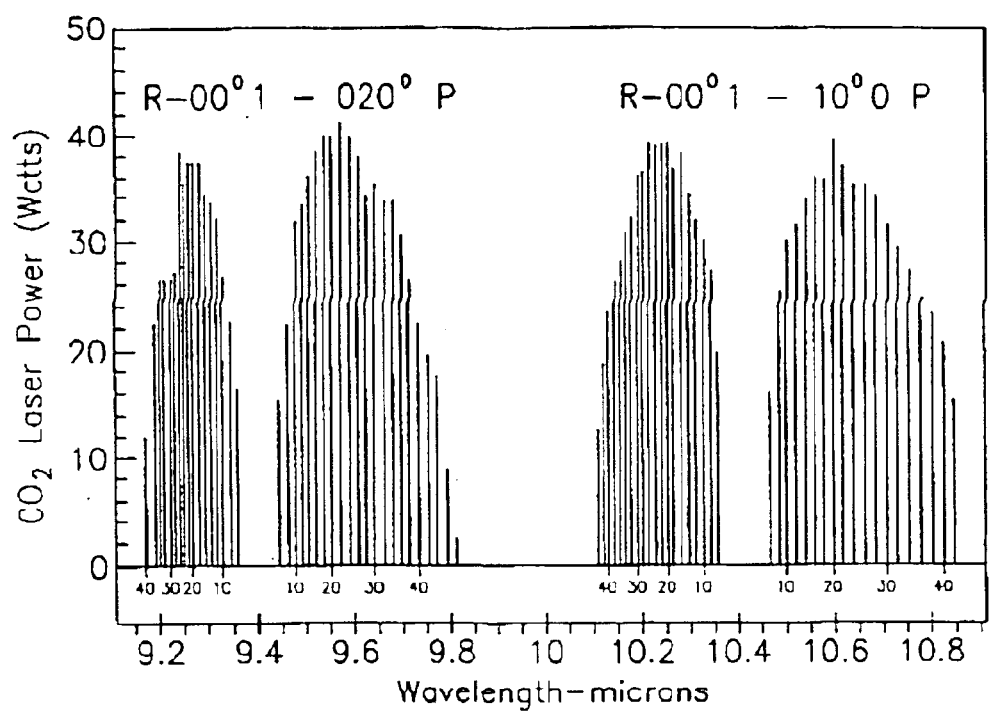
FIG. 7 is a graphical depiction of the output power of $CO_2$ lasers at various laser wavelengths.

For many plastic materials, $CO_2$ laser operation at a wavelength of approximately 9.2 microns is preferred over a wavelength of 10.6 microns or other wavelengths because of the increased absorption of the material at 9.2 microns. When operation at a lower $CO_2$ gain line is desired as in this case, it becomes necessary to suppress lasing at higher gain lines. This is especially true under Q-switching laser operations because of the very high gain that is built-up under the high optical loss (i.e. laser hold-off) condition. FIG. 7 illustrates the relative power output of the various gain lines that can be emitted by a $CO_2$ laser. Note that high gains occur at wavelength of approximately 9.3, 9.6, 10.25 and 10.6 microns. One can utilize a grating to select one of these gain lines and discriminate against the rest. Unfortunately gratings are expensive, easily damaged by high intensity laser radiation and optically lossey. Fortunately, one can utilize state-of-the-art mirrors that have thin-films deposited on them to reflect the desired gain line back into the cavity and/or transmit undesired gain lines out of the laser cavity. For example, the optimum transmission of the output coupling mirror 406 for a $CO_2$ laser having a 226 cm long unfolded waveguide gain length operating at a wavelength of 9.249 microns under Q-switched conditions is approximately 50%. Consequently, for the partly reflecting OCM 406 of FIG. 5, one would desire all other wavelengths to have a higher transmission so as to provide higher attenuation for these other wavelengths.

Figure 8:
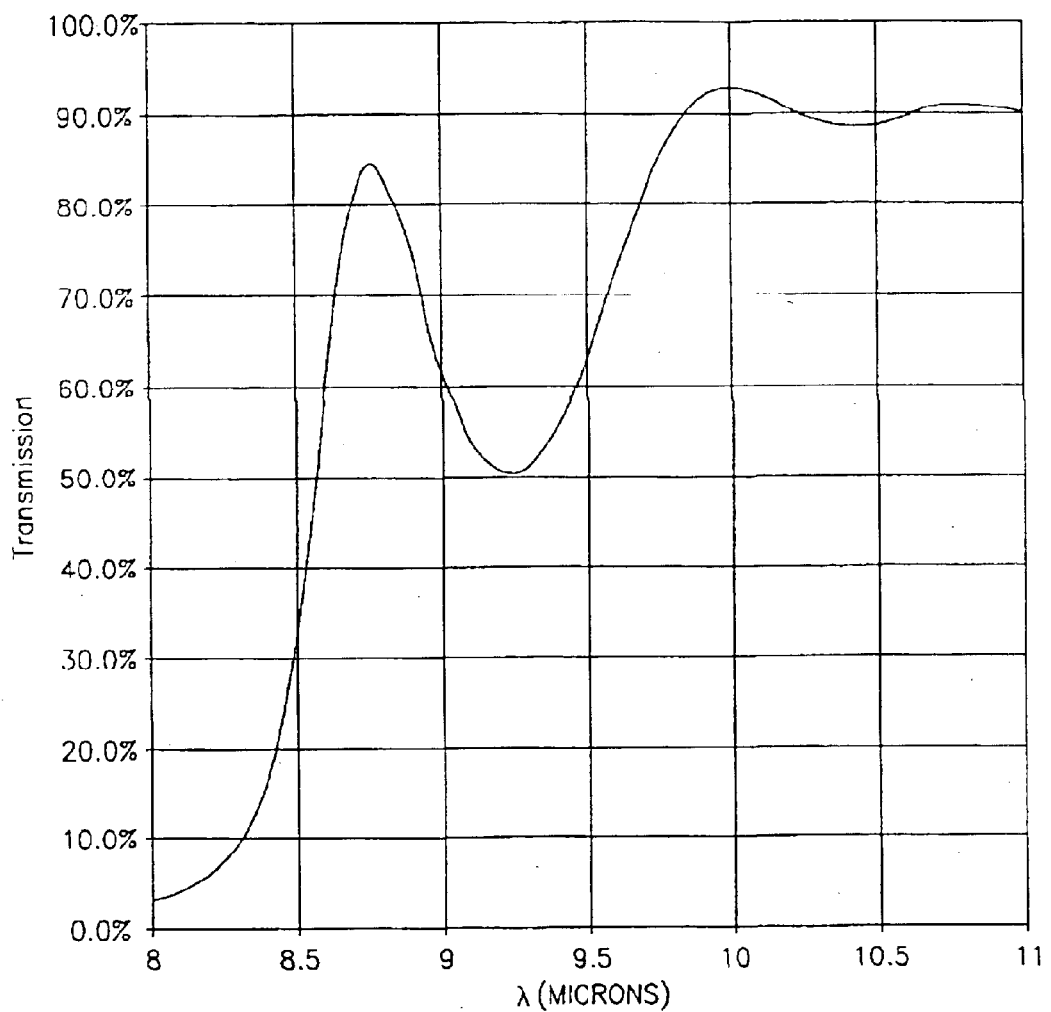
FIG. 8 is a graphical depiction of the transmission of an output coupling mirror for a $CO_2$ laser as a function of wavelength used in FIGS. 5, 6 and 10.

FIG. 8 shows the functional relationship of transmission vs wavelength of a coated ZnSe mirror that has a 50% transmission at a wavelength of about 9.25 microns, approximately 90% transmission at wavelengths of about 10.25 and 10.6 microns and approximately 70% transmission at a wavelength of 9.6 microns. These are the highest gain lines for $CO_2$ lasers. This mirror performance is well suited for the output coupling mirror 406 of the laser head 400 in FIG. 5 because it transmits more of the undesired wavelengths out of the laser cavity, defined between OC 406 and feedback mirror (FBM) 408, if oscillation at a wavelength of around 9.2 microns is desired.

Figure 9:
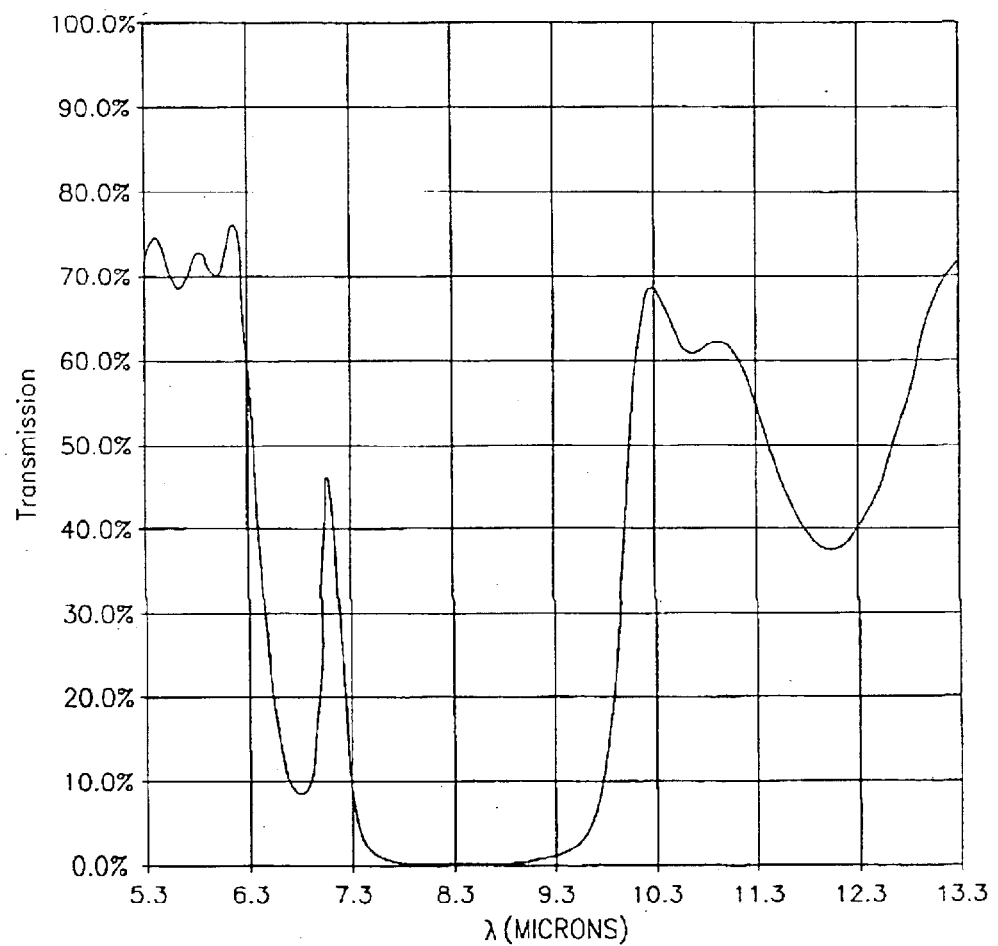
FIG. 9 is a graphical depiction of the transmission of a turning mirror for a $CO_2$ laser as a function of wavelength used in FIGS. 5, 6 and 10.

For additional discrimination against undesired gain lines, turning mirrors 416 can also be thin-film coated so that they have higher reflectivity at the desired wavelength and less at the undesired wavelengths. This characteristic would also beneficially contribute to the oscillation at the desired wavelength while assisting in the prevention of oscillation at undesired wavelengths. It may not be necessary to coat all three of these mirrors, one can coat only as many as required to prevent undesired oscillation on other gain lines. FIG. 9 illustrates the functional relationship of the transmission vs. wavelength of a ZnSe thin-film coated mirror that has only 1% transmission (i.e. 99% reflectivity) at a wavelength of 9.25 microns and higher transmission (i.e. lower reflectivity) at the higher $CO_2$ gain lines with wavelengths of 9.6, 10.25 and 10.6 microns. These characteristics favor the oscillation at a wavelength of 9.25 micron and discriminate against the oscillation on the other gain lines. This coating can also be used on turning mirrors $TM_1$, $TM_2$ and $TM_3$ 416 as required for additional wavelength discrimination.

Mirror 414 of FIG. 5 has high reflectivity at the desired wavelength (e.g. 9.25 microns). It none-the-less transmits a small amount of radiation out of the cavity (about 1% or less at a wavelength of 9.25 microns). The small radiation output of mirror 414 is detected by a detector 302 such as a pyro-detector whose electrical signal 304 is fed to an Automatic Down Delay Circuit (ADDC) 306. The purpose of the ADDC 306 is to clip the long tail of the Q-switched laser pulse after a selected time delay, $\tau_{pc}$, from the beginning of the laser pulse. The amount of time delay, $\tau_{pc}$, is selected by the laser operator. Mirror 414 is positioned and hermetically sealed in an identical mirror holder as OCM 406

Figure 10:
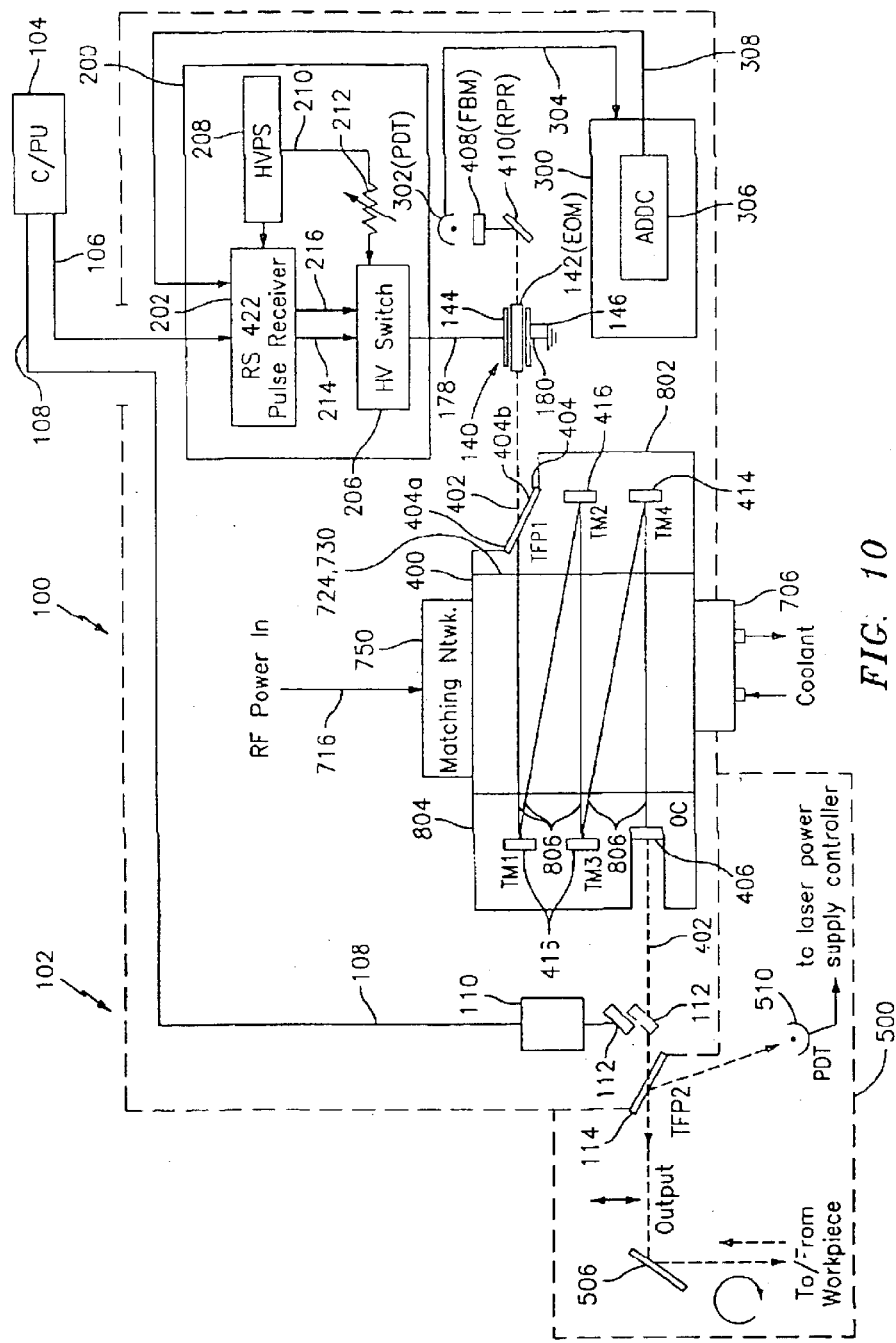
FIG. 10 is a second schematic diagram of a Q-switched $CO_2$ laser system for material processing showing a stop drilling option.

From a cost and reliability standpoint it is wise to minimize openings in a laser head that has to be hermetically sealed. Consequently, as seen in FIG. 10, one may use the option of having feedback mirror (FBM) 408 of FIG. 5 to have a small amount of transmission (about ½ to 1%) (i.e. by not using a metal coated mirror for example) and detecting this output radiation with the detector 302 for supplying the electrical signal 304 to the ADDC 306. This alternative allows mirror 414 to utilize the same mirror holder as for mirror 416, and allows mirror 414 to be placed inside the laser head 400 so that a hermetically sealing metal O-ring will not be required for mirror 414 since it no longer needs to emit radiation outside the laser head 400. It also allows mirror 414 to serve as an optical filter to discriminate against other wavelengths if needed.

Figure 17A:
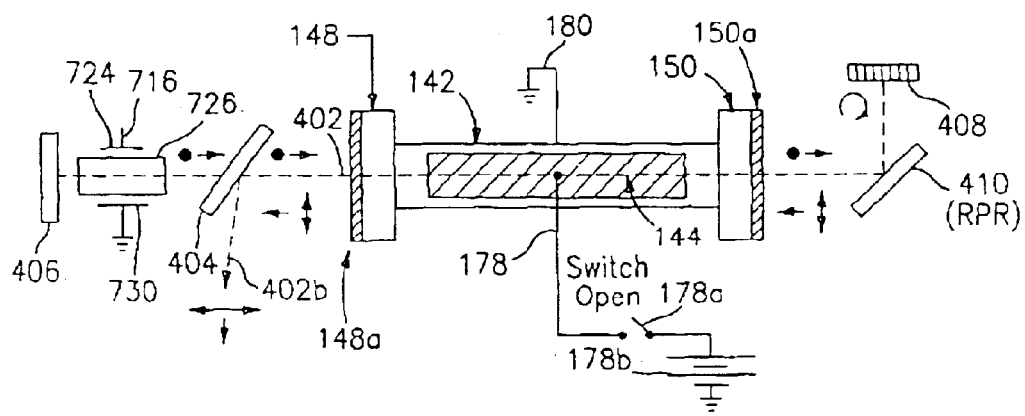
FIG. 17A is a second schematic diagram of an electro-optical modulator within a laser cavity with no voltage applied across the electro-optical crystal resulting in a state of high optical loss within the laser cavity.
Figure 17B:
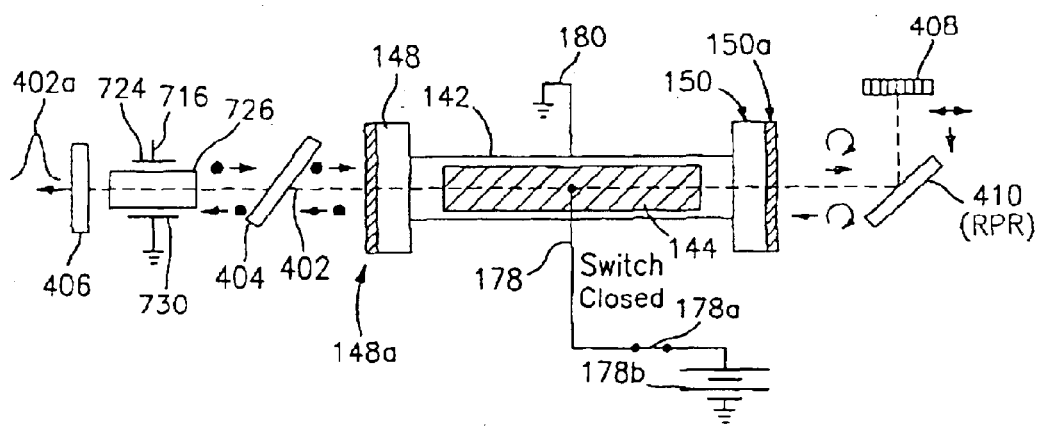
FIG. 17B is a second schematic diagram of an electro-optical modulator within a laser cavity with a nonzero voltage applied across the electro-optical crystal resulting in a state of low optical loss within the laser cavity.

The thin-film polarizer ($TFP_1$) 404 of FIGS. 5 and 10 serves the same function as the TFP 404 of FIGS. 16A and 16B as will be explained in the narrative associated with those figures. In FIGS. 16A and 16B, the polarized laser radiation exiting TFP 404 of FIGS. 5 and 10 passes through an electro-optic modulator (EOM) 140 through a ¼ wave polarization rotator 412 to the FBM 408. In FIGS. 17A and 17B the polarization exiting TFP 404 passes through the electro-optic modulator 140 off the reflective phase retarder (RPR) 410 to the FBM 408. FIGS. 5 and 10 illustrate how the pulsed signal 106 from the laser head's power supply controller unit 104 is feed to the EOM 140 by a pulse receiver 202 such as a RS422 differential transistor/transistor logic (TTL) circuit. This circuit 202 provides good noise immunity for the rest of the electronics interfacing with the laser assembly 100 from the high voltage (i.e. several kV's) pulse switching circuit 206 that drives the EOM 140. The pulse receiver 202 provides electrical isolation by not having a common ground with the laser head 400. The high voltage power supply 208 provides DC power to both the pulse receiver 202 and to the switching circuit 206.

The power supply controller unit 104 of the laser system 100 provides signals to a driver 110 of an optical shutter 112 to block or unblock the output 402 from the laser head 400. This optical shutter is added so that the operator can manually open the shutter to operate the laser, as is well known in the art.

High Optical Damage Threshold Electro-Optic Modulator

Active optical CdTe crystals are utilized extensively as electro-optics modulators for $CO_2$ lasers. It is generally difficult to get anti-reflection coatings to adhere well to the entrance and exciting surfaces of the CdTe modulator crystals. These films can easily be damaged when inserted into $CO_2$ laser feedback cavities. Anti-reflection coatings are used to reduce optical losses when these crystals are inserted within a laser feedback cavity to switch the cavity losses from a higher loss condition (i.e. low cavity Q) to a low loss condition (i.e. high cavity Q). Peeling and optical damaging of these coatings by the intense laser radiation is a common damage failure for these modulators when used to Q-switch $CO_2$ lasers. Solving the thin film optical damage problem of the EO modulation crystals would result in a significant increase in the failure damage safety margin of Q-switched $CO_2$ lasers and in the material drilling systems in which they are utilized.

Figure 11:
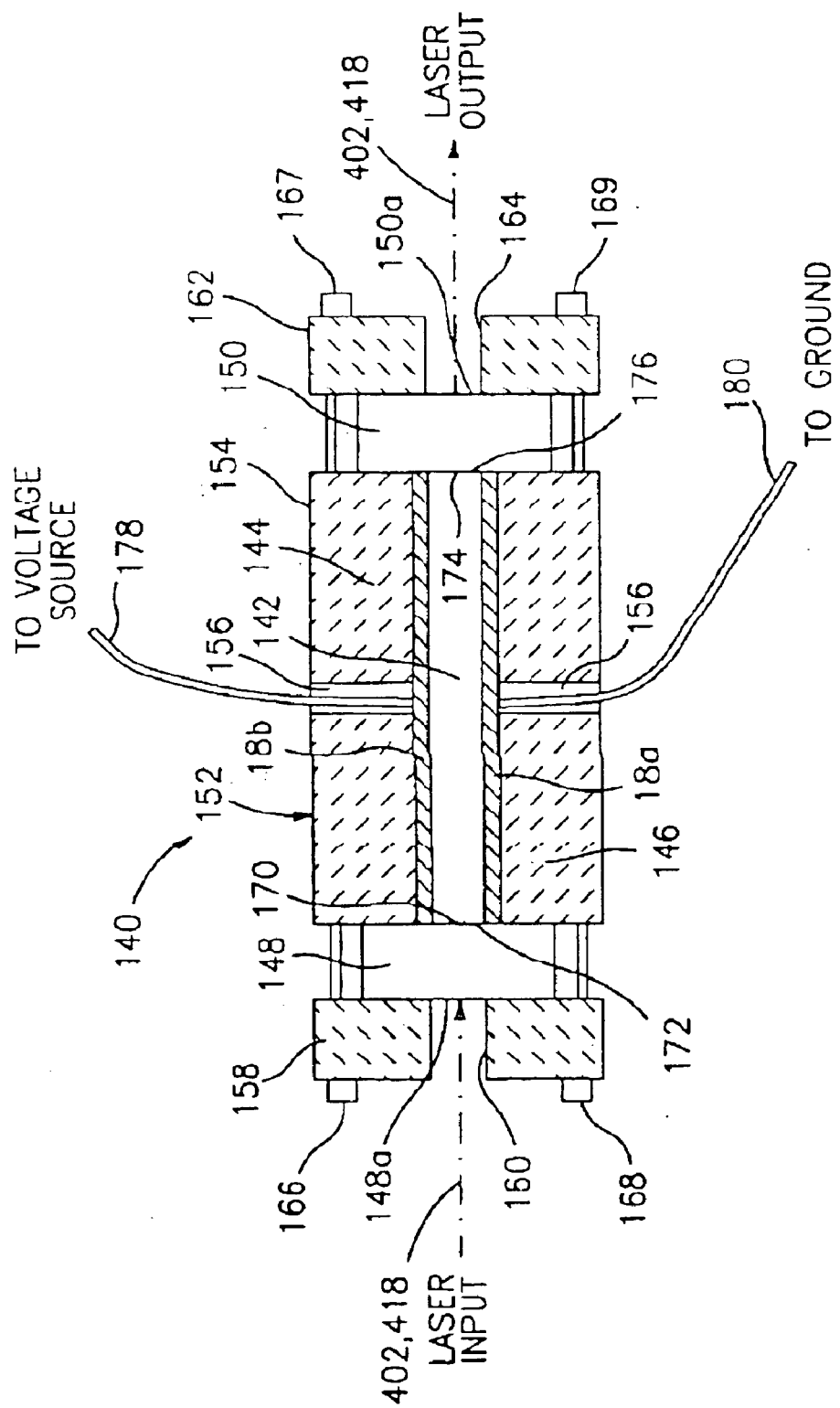
FIG. 11 is a first cross-sectional side view of a high optical damage threshold electro-optical modulator of FIGS. 5 and 10.

The anti-reflecting thin film damage problem is much less severe with passive optical IR window materials such as ZnSe or GaAs (U.S. Pat. No. 5,680,412, which is incorporated herein by reference). Since CdTe and ZnSe have refractive indices, n, which are close to one another (i.e. n=2.6 and 2.4 respectively) at $CO_2$ laser wavelengths, optically polished ZnSe windows can be placed in optical contact with the entrance and exit surfaces of a CdTe EO crystal and not experience high transmission losses through either direction of the CdTe/ZnSe interface. The losses for a ZnSe/CdTe/ZnSe electro-optical modulator structure are a little higher than for thin film coated CdTe EO modulators, but the trade-off between the improvement in the reliability of the laser and the slightly higher losses is worth it. FIG. 11 illustrates such a ZnSe/CdTe/ZnSe EO modulator structure at 140. High optical damage threshold anti-reflection thin film coatings on ZnSe are easily deposited and are commercially available. Item 142 is the CdTe EO crystal and items 148 and 150 are the ZnSe transparent windows in optical and thermal contact with the CdTe EO crystal 142.

The problem experienced in the deposition of anti-reflection coatings on CdTe is believed to arise from the fact that in order to get good adherence films, the CdTe needs to be heated at such a temperature that the material decomposes; i.e. Te is driven off of the surfaces of the CdTe crystal 142 to be coated. This leaves a Cd enriched surface that presents an electrical conducting path between electrodes 146 and 144 of the EO modulator of FIG. 11. Under the high voltage applied to the electrodes of the CdTe crystal 142 this poor electrical conducting path along the surfaces of the crystal causes electric current to flow between the electrodes 144, 146 which in turn causes non-uniform heating at the interface of the thin film anti-reflection coatings and the CdTe crystal surface. This leads to a weakened bond between the two materials. In addition, the periodic stress imposed by the pulsating laser radiation also contributes to the optical damage in the poor bond between the anti-reflecting films and the CdTe substrate, which causes the Q-switched laser performance to deteriorate with time. ZnSe can be heated to the necessary temperature for the deposition of good adherence anti-reflecting films without decomposition of the material. It is fortuitous that the refractive index between ZnSe and CdTe crystals is sufficiently close so as to yield low optical losses at their contacting surfaces if these two materials are placed in optical contact.

FIG. 11 illustrates in a side view of the basic components of an electro-optical modulator 140 containing, for example, a CdTe crystal 142 having conductive electrodes 144, 146 applied on opposite sides thereof. The CdTe crystal 142 is disposed between two transparent windows 148, 150 whose refractive index matches or comes close to matching the crystal 142. For the case of the CdTe EO crystal, ZnSe is suitable. The outer faces 148a and 150a of the transparent windows 148, 150 are anti-reflection coated. It is assumed that the deposition of a high optical damage threshold thin film coating on crystal 142 is difficult if not impossible while such coatings are easily depositable on windows 148, 150. The EO modulator housing 152 includes dielectric support member 154, which has an opening 156 so that electrical contact can be made to electrodes 144, 146. The EO modulator housing 152 has end support members 158, 162, each having an opening 160, 164 through which laser radiation 402 can pass through the window/EO crystal assembly. End members 158, 162 are secured to member 154 by fasteners 166, 167, 168, 169. The laser beam 402 is positioned with respect to the optical axis 418 of crystal 142 for amplitude or phase modulation.

Figure 12:
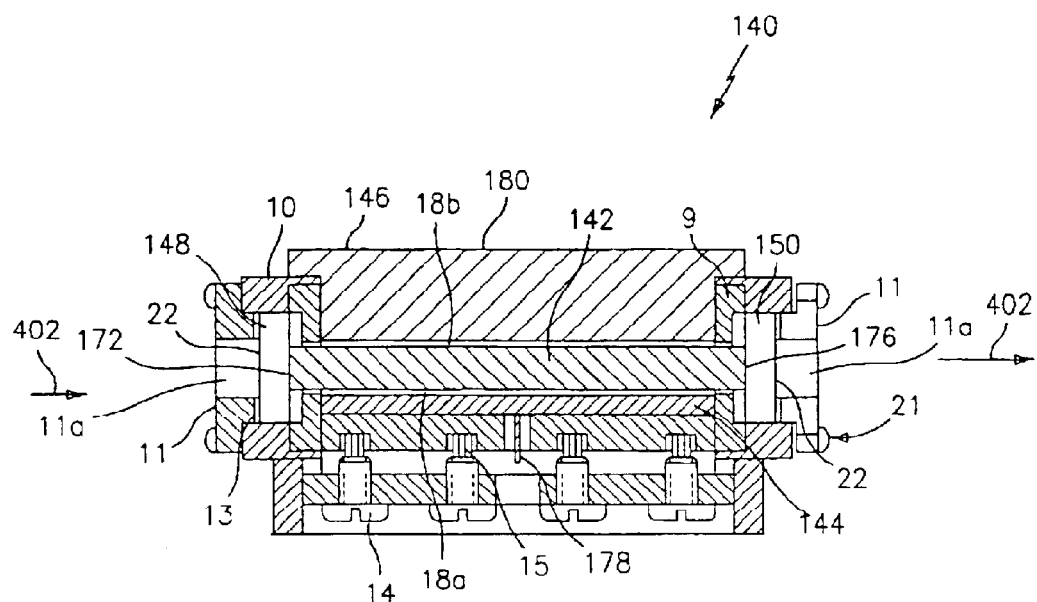
FIG. 12 is a second cross-sectional side view of an electro-optic modulator illustrating greater detail than in FIG. 11 on how not to stress the electro-optic modulator crystal.
Figure 13:
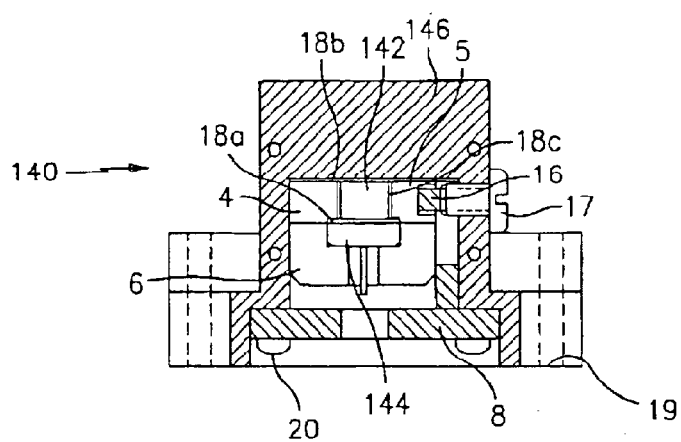
FIG. 13 is a cross-sectional end view of an electro-optic modulator of FIG. 12.

FIGS. 12 and 13 illustrate side and end views, respectively, of the EO modulator assembly 140 in greater detail. Since CdTe is birefringent, mechanical stress can cause changes in the polarization rotation. Consequently, to obtain optimum optical performance, it is important not to stress the EO crystal 142 by holding it so tight that normal thermal expansion and contraction will stress the crystal 142 thereby causing changes in the polarization of the laser radiation propagating through the crystal 142, independent of any voltage applied across the crystal 142. The crystal 142 is contained in a metal housing 2, which is fabricated, for example, of Aluminum (Al). Item 18b is a thin (e.g. 0.10 inches in thickness) cushion, such as an Indium strip, which is placed between the metal housing 2 (which serves as a ground electrode) and the CdTe crystal 142 and the ceramic spacers (items 4 and 5). Item 18a is also a thin cushion, such as an Indium strip, that is placed between the CdTe crystal 142 and the entire length of the hot copper electrode 144. A spring associated with screws 17 provide cushions for the crystal 142 from being over stressed by the tightening of bolts 14 and 17. Since CdTe is also a piezoelectric material, the Indium strip also acts as an acoustic absorber for the ultrasonic energy generated by the CdTe crystal as the voltage is repetitively applied and removed across the crystal 142. This acoustic absorption is important for proper operation of the CdTe electro-optic modulator 140. The electrically hot positive electrode 144 is pressed against the EO crystal 142 by a dielectric 6, which has a hole in it to enable making an electrical contact to the hot electrode 144. The dielectric 6 is spring loaded 15 so as to gently press the hot electrode 144 against the EO crystal 142 by the threaded bolts 14. The bolts 14 are threaded through a metal cover 8 fabricated from the same material as the metal housing 2. This cover 8 is bolted into the metal housing 2 by bolts 20. There is a thin plate of Indium metal 18b between the metal housing 2 and the EO crystal 142 and between dielectrics 4 and 5 and the EO crystal 142 to cushion the crystal 142 against the housing 2, to absorb the acoustic energy generated by the piezoelectric action of the CdTe crystal 142 when the voltage is repetitively applied and removed from the crystal 142 and also to ensure good electrical contact between the electrodes and the EO crystal 142. Dielectrics 4, 5 hold the EO crystal 142 sideways, again by spring action 16 upon which pressure is exerted by the threaded bolt 16. Optically polished transparent windows 148, 150 are pressed up against the optically polished end faces 172, 176 of the EO crystal 142 by the use of wave springs 13 which are compressed by the retainer spring holder 11 by bolts 21. The retainer spring holder 11 has a hole 11a in it to provide passage of a laser beam 402 through the ZnSe window/CdTe EO crystal/ZnSe window arrangement 172, 142, 176. The outer surfaces 22 of the transparent windows 148, 150, which are not in contact with the EO crystal end faces 172, 176, are coated with an anti-reflection coating to minimize optical transmission loss through the structure 140. Items 9 and 10 are an insert and a window holder, respectively, to ensure that excessive compression cannot be directed toward the transparent window 148, 150 and crystal interface. Springs 15 and 16 are used to prevent stressing the CdTe crystal 142 so that its birefringence does not cause undesired rotation of the polarization of the laser radiation passing through the crystal 142.

Maintaining Zero DC Bias on CdTe EO Crystals for Q-Switching IR Lasers

CdTe electro-optic modulator crystals contain traces of impurities at very low concentration levels, which adversely affect the performance of these crystals in electro-optical modulator applications. The concentrations are so low that they are difficult to control in the crystal growing process. Consequently, the yield in growing these crystals with the same phase retardation performance for a given applied voltage from crystal to crystal is not high, especially if the crystal is operated by requiring that an external DC bias be maintained across the crystal for a long time. The reasons why these impurities adversely effect EO modulator performance in Q-switched lasers are as follows. It is well known that the voltage, $V_o$, required to be placed across an EO crystal in order to change the phase of the optical radiation propagating therethrough by $\frac{1}{2}\lambda$ (or 180 degrees) is given by:

$$V_O = \frac{\lambda_O}{2n_O^3 r_{41}} \times \frac{d}{l} \qquad (1)$$

where $\lambda_o$ is the wavelength of the radiation$\times 10^{-4}$cm, $$\frac{d}{l}$$

is the aperture/length ratio of the crystal, $n_o$ is the refractive index of the crystal (=2.6 in CdTe) and $r_{41}$ is the electro-optic coefficient (=6.8×10$^{-10}$ cm/volt in CdTe) (A. J. Beauliea; *Transversely Excited Atmospheric Pressure $CO_2$ Lasers,* Applied Phys. Letters, Vol. 16, pg. 504–506, June 1970, which is incorporated herein by reference). Typically a CdTe crystal of d=0.5 cm and l=5 cm requires a voltage of $V_o$=4.35 kV to obtain ½λ phase retardation.

Figure 14:
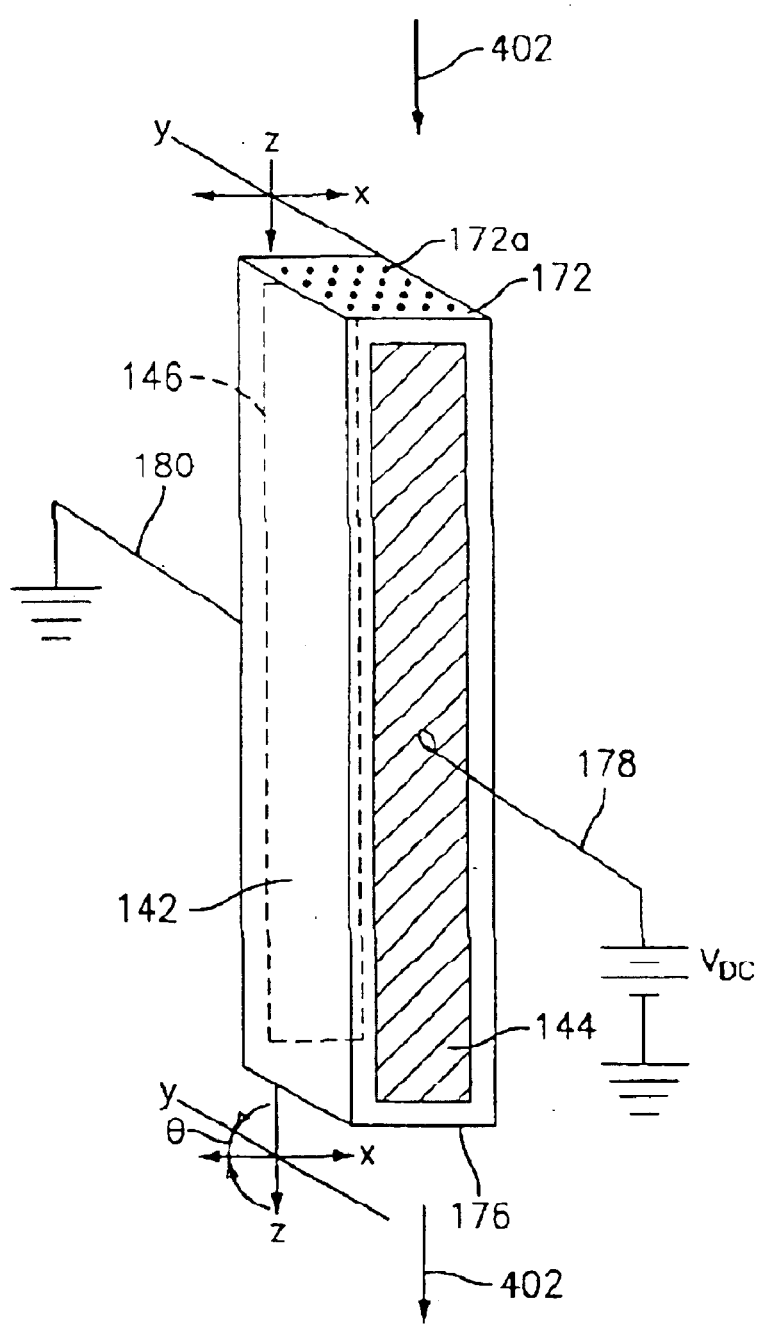
FIG. 14 is a diagram of the arrangement of an electro-optic crystal receptive of a laser beam polarized in the X axis as shown and subject to a constant applied voltage.

When a DC voltage calculated from Eq. 1 is applied across a crystal 142, as illustrated by FIG. 14, the residing charge carriers within the crystal 142 move slowly through the crystal 142 and become captured within the unevenly distributed traps caused by the aforesaid impurities. Besides being unevenly distributed, the sizes of the traps also vary. These localized, captured charges set-up a DC bias within the crystal 142. This in turn causes variations in the phase retardation suffered by the radiation propagating through the crystal 142 as a function of the location of the propagation path through the crystal 142. In addition, these internally generated phase retardations vary with ambient temperature and with time. The yield in producing crystals that do not demonstrate these effects is low and consequently the cost is high for obtaining crystals having acceptable performance. These problems have been a big influence toward limiting the application of Q-switched $CO_2$ lasers to primarily military applications and not toward industrial applications.

An approach that addresses the difficulties discussed above in order to obtain a Q-switched $CO_2$ laser suitable for industrial material processing applications is disclosed that ensures that an external DC bias is not required on the EO crystal 142 in order to obtain a high loss state within the laser cavity 406, 408. FIG. 14 illustrates an experimental arrangement to determine the effects, at various locations across the face 172 of a crystal 142, of the trapped charges on the polarization of the optical radiation propagating through a CdTe crystal 142, at a given time and temperature, when subjected to a ½λ retardation DC voltage. Such a variation in polarization across the face of the crystal 142 is indicated by the surface 182 of FIG. 15. If the crystal were perfect, one would obtain a 180° rotation of the polarization vector such that the polarization exiting of the crystal would equal the polarization entering the crystal 142. Instead a rotation of the polarization by a phase angle, θ, varying from spot to spot 172a across the face 172 of the crystal 142 is found.

Figure 15:
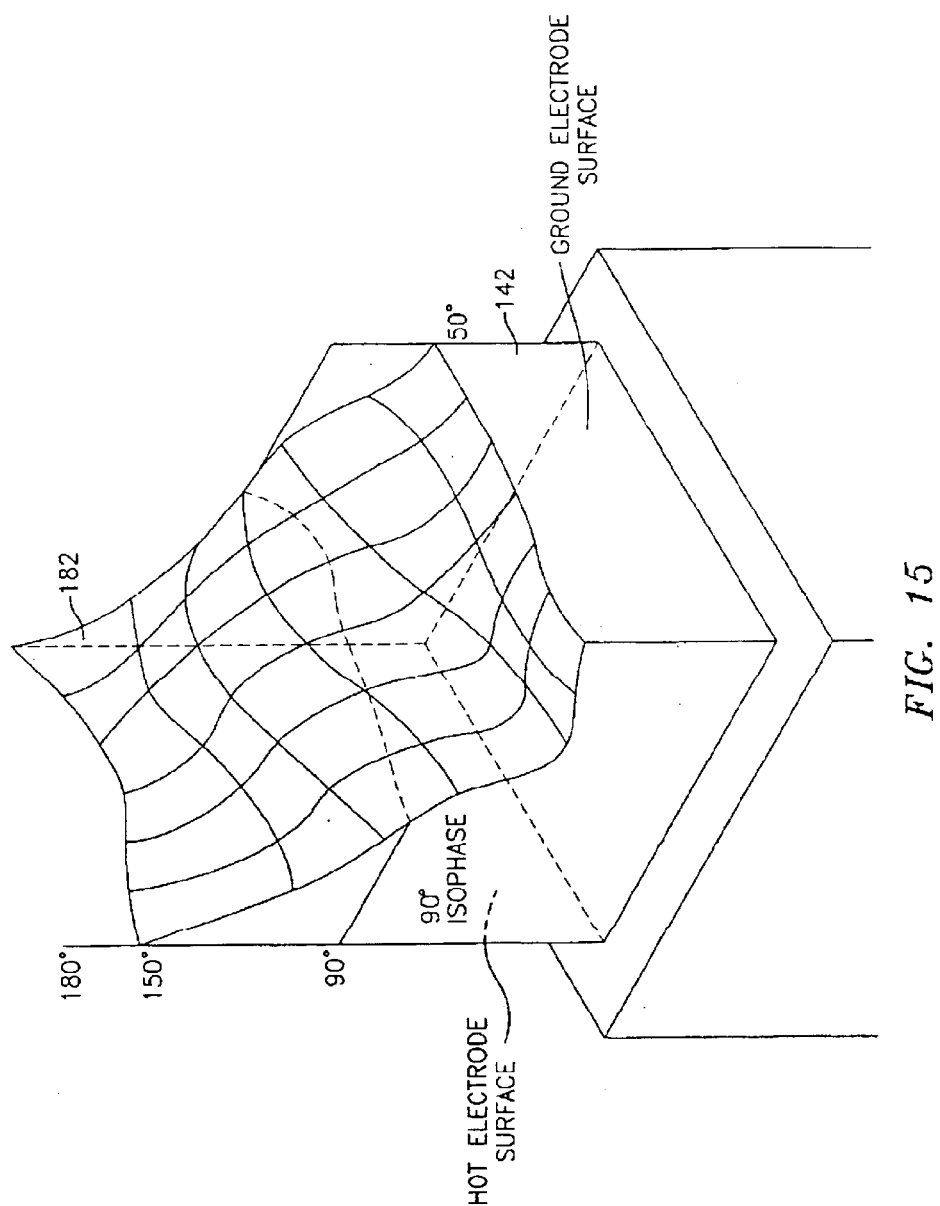
FIG. 15 is a graphical depiction of the variation in the optical phase shift in the laser beam passing through the electro-optical crystal of FIG. 14 as a function of position across the face of the electro-optical crystal.

FIG. 15 illustrates phase retardation data taken on a CdTe crystal subjected to a 4,400V DC bias voltage. Note the large variation away from the uniform 180° phase retardation that would be expected from a perfect crystal. Under this situation, one has no choice but to select a given location over the face of the crystal and adjust the voltage to obtain the desired phase retardation. This results in the use of a narrow laser beam whose diameter is much smaller than the cross sectional area of the crystal. If a large beam is used, then different portions of the cross section of the beam would experience different phase retardations as the beam progresses through the crystal. This effect would also require that each Q-switched laser must have the voltage and location across the EO crystal be individually adjusted to obtain the required phase retardation. Because of the nature of the trapped charges not being tightly captured and the fact that they have a slow mobility, the phase retardation shown in FIG. 15 varies with time and the temperature of the crystal. This compounds the difficulty of using EO Q-switched lasers in industrial applications. In addition, if the polarity of the applied DC voltage is reversed, an entirely different phase retardation pattern across the face of the crystal is obtained.

Figure 1:
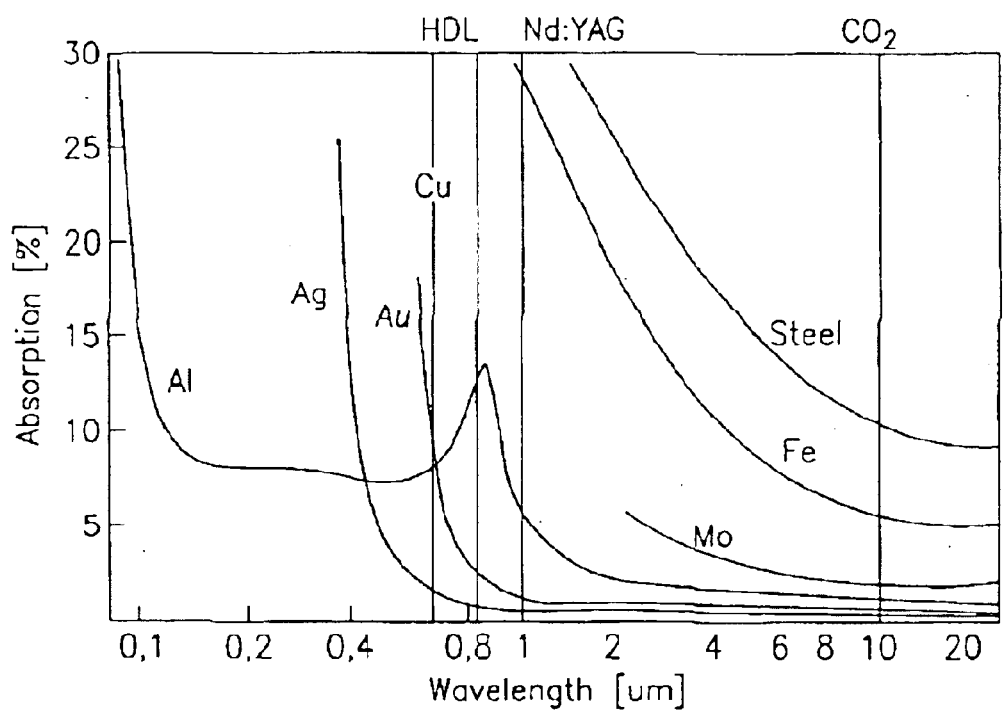
FIG. 1 is a graphical depiction of a comparison between the absorption rate of several different metals as a function of wavelength for several laser sources.
Figures 2A, 2B:
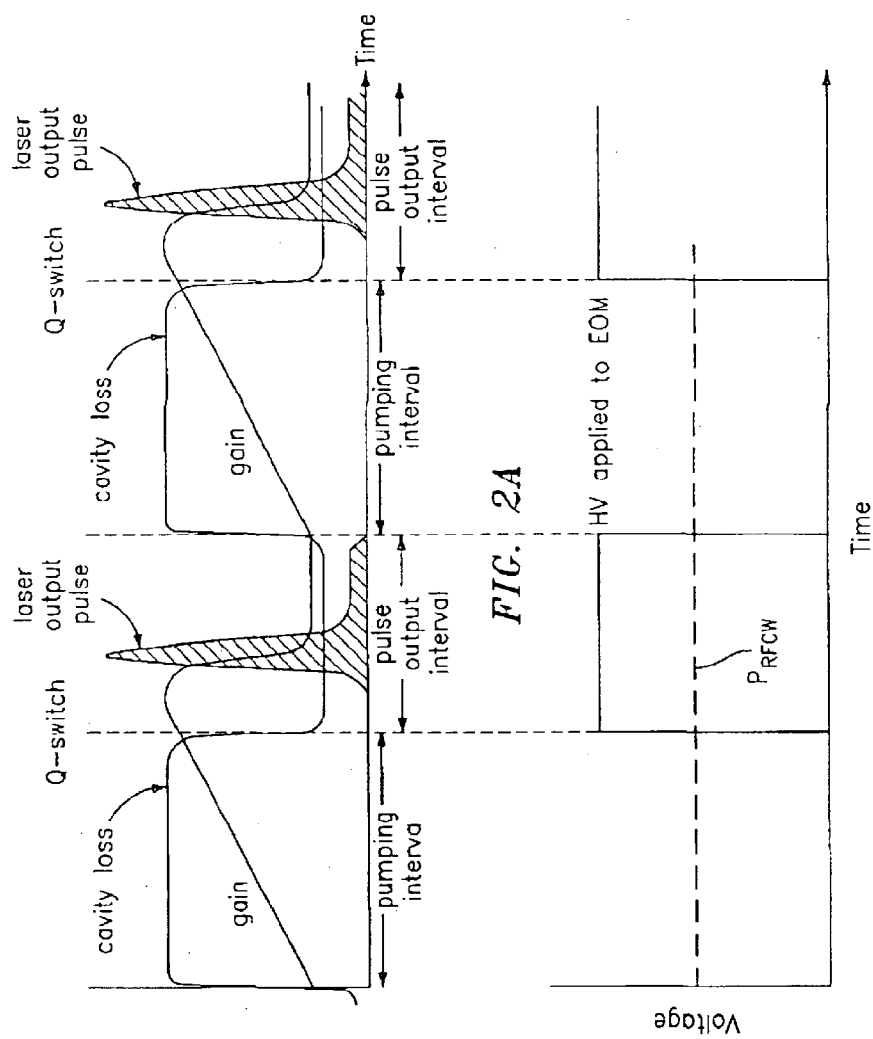
FIG. 2A is a graphical depiction of the cavity loss, gain and laser output pulse in a repetitively pulsed Q-switched laser.
FIG. 2B is a graphical depiction of the continuous wave radio frequency power input to a Q-switched $CO_2$ laser and the high voltage signal delivered to an electro-optic modulator to effect Q-switching.
Figure 3:
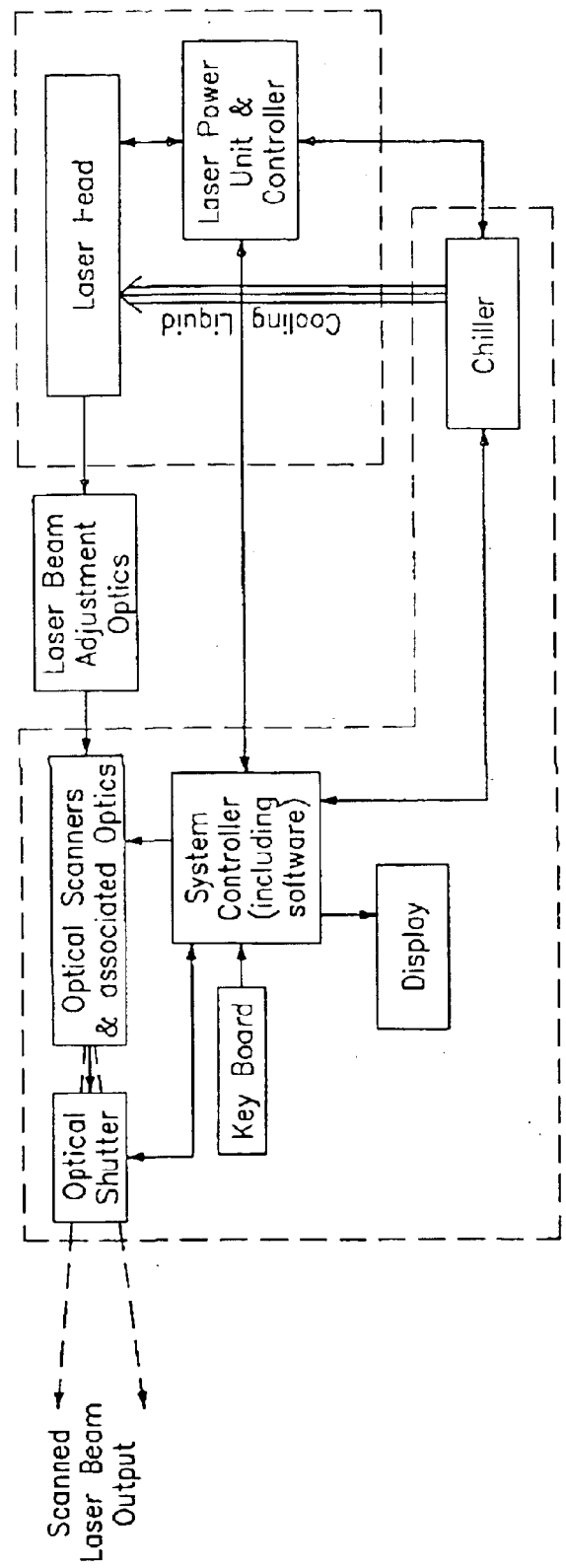
FIG. 3 is a block diagram of a generalized laser material working system.

One approach to getting around these CdTe material problems in order to obtain a $CO_2$ Q-switched laser suitable for industrial material processing applications comprises operating the EO modulator under a zero DC voltage condition during the high cavity optical loss portion of the pumping interval of the Q-switching cycle indicated in FIGS. 2A and 2B. The DC voltage is only applied to the CdTe crystal 142 during the short time of the pulse output interval shown in FIGS. 2A and 2B when the cavity loss is low (i.e. the cavity has a high Q). The short time that the voltage is applied to the crystal minimizes the charge carriers congregating in traps and generating an internal DC bias unevenly across the crystal 142.

The arrangement for operating CdTe crystals 142 with no external DC voltage applied to the EO modulator crystal 142 and inserted within a Q-switched laser is shown schematically in FIG. 16A. The output beam of a $CO_2$ laser is polarized parallel to the plane of the metal electrode 730 that is exposed to the gas discharge within the laser gain medium 726. Consequently, in the side view shown in FIG. 16A, the optical electric field is polarized perpendicular to the plane of the paper as shown with the dots "•" in FIG. 16A. A thin film polarizer (TFP) 404, is inserted between the laser gain medium 726 and the high optical damage threshold EO modulator assembly 140 as shown in FIGS. 16A and 16B. The TFP 404 is positioned so that the optical radiation 402 polarized perpendicular to the plane of the paper propagates through the TFP 404 with minimum optical losses (FIG. 16B). However, optical radiation 402 polarized in the plane of the paper does not propagate through TFP 404 (FIG. 16A). Polarization in the plane of the paper is shown by the arrows "⇆" and "↕". Radiation exiting to the left of TFP 404 passes through the laser gain medium 726, partially reflected back into the laser gain medium 726 by the partially reflecting mirror 406, and back through TFP 404 into the CdTe EOM assembly 140.

In FIG. 16A, the radiation 402 polarized perpendicular to the plane of the paper emitted by the laser gain medium 726 propagates through the TFP 404 and continues through the high damage threshold ZnSe/CdTe/ZnSe EO modulator assembly 140 of FIGS. 11, 12, 13 and 14 and a polarization rotator 412 such as a quarter wave plate. The ¼λ plate 412 is utilized to convert linear polarization to circular polarization as shown by the circular arrows "↺", "↻". Other polarization rotating devices can also be used, such as quarter wave rhombs, prisms or reflective phase retarders.

The linearly polarized beam 402 propagating through the ¼λ plate 412 in FIG. 16A becomes circularly polarized and is in turn reflected off the reflecting mirror 408 with its sense of circularity reversed by the reflection and directed back through the ¼λ plate 412 thereby being converted to linear polarization again. The optical radiation propagating back toward the ZnSe/CdTe/ZnSe EO modulator assembly 140 is now polarized parallel to plane of the paper. This radiation propagates through the EO modulator assembly 140 back toward the TFP 404. The TFP 404 reflects this polarization component out of the laser cavity comprised of mirrors 406, 408. This in effect maintains a high loss condition for the laser cavity 406, 408 with no voltage applied to the EO crystal 142. This high loss condition prevents the laser from oscillating which in turn enables the population (i.e. the gain) in the upper laser level to build-up to a much larger than normal value. This population build-up acts as an optical energy storage process for the laser. This optical stored energy is released by applying a voltage to the EO modulator crystal 142 in order to induce a ¼λ polarization rotation. The application of a pulsed voltage to the EOM crystal avoids the phase retardation variation problems caused by the impurities within the CdTe material as mentioned previously.

The switch to a low cavity loss condition of the laser cavity 406, 408 can be made to occur as follows. The spontaneous emission radiation emitted by the laser gain medium 726 that is polarized perpendicular to the plane of the paper as shown in FIG. 16B, propagates through the TFP 404 and through the high optical threshold ZnSe/CdTe/ZnSe EO modulator assembly 140. The difference this time is that a voltage applied to the EO modulator 140 converts the linear polarization to circular polarization exiting to the right of the EO crystal 142. The voltage applied in this arrangement is ½ of $V_o$ of Eq. 1 because the radiation will eventually make two passes through the EOM crystal 142. Consequently, the radiation leaving the EO modulator 140 is circularly polarized. When this circularly polarized radiation propagates through the ¼λ plate 412, it becomes linearly polarized in the plane of the paper as shown in FIG. 16B. This linearly polarized radiation is reflected from the reflecting mirror 408 as linearly polarized light, back through the ¼λ plate 412, which again converts the radiation to circular polarization. This circularly polarized light is directed back through the EO crystal 142. Since a ¼λ voltage is still experienced by the CdTe crystal 142, the circular polarization is converted back to the original polarization perpendicular to the plane of the paper as seen in FIG. 16B. This polarized radiation is propagated through the TFP 404 into the laser gain medium 726 and amplified therein. The optical intensity within the laser cavity 406, 408 can now build up rapidly thereby depleting the larger than normal optical energy stored in the upper laser level which results in a short, high peak power laser output pulse 402a. By the above described process, the radiation is rotated 180 degrees by making two passes through the EO modulator 140 and the quarter wave plate 412.

Reflective phase retarders have found extensive applications in the laser material processing industry to avoid variation in the Kerf width (or cross-section of the laser cut) caused by how the linearly polarized laser beam making the cut in the material is oriented with respect to the direction in which the beam is traveling. It is well known that the orientation of the polarization in relation to the direction of the cut significantly affects the cut cross-section. The conversion of the linear polarization into circular polarization eliminates the cross-section variation of the laser cut with direction of travel of the laser beam. RPRs are capable of handling the intensity within a laser cavity and are preferred for use in Q-switched $CO_2$ lasers suitable for industrial material processing applications. FIGS. 17A and 17B illustrate the use of a RPR 410 in place of the ¼λ plate 412 of FIGS. 16A and 16B. The explanation for the RPR 410 is the same as for the quarter wave plate 412.

FIGS. 17A and 17B illustrate the operation of a Q-switched laser with a ¼λ reflective phase retarder device 410 in place of the ¼λ plate of FIG. 16A and 16B. The alignment of the RPR 410 is not very sensitive where as the alignment of the laser's reflecting mirror 408 with the lasers partially reflecting mirror 406 is sensitive. Consequently, the reflecting mirror 408 and the RPR 410 can be pre-aligned and placed in one housing (not shown). This housing can then be aligned with respect to the partially reflecting mirror 406.

The above paragraphs describe how the cavity loss and gain variations illustrated in FIGS. 2A and 2B are experimentally obtained for Q-switched laser operation. The ¼λ DC voltage can be applied in a periodically or randomly "on-command" pulsed format. The low loss enables the large energy stored in the upper state of the laser medium to be emitted in a single pulse of radiation with several orders of magnitude greater peak power over the continuous wave average power and more than one order of magnitude greater peak power over the RF super pulsed pumped operation. The pulse rise time is determined by the gain achieved during the high loss phase of the cyclic Q-switching process, the optical losses within the cavity, and the cavity length. Typically, we find that pulse rise times of 50 to 75 nsec and pulse widths at the half power points of 100 to 130 nanosecond are obtained from Q-switched diffusion cooled, sealed-off $CO_2$ utilizing an NV shaped saw tooth folded waveguide configuration 806 having a total gain length of 226 cm and excited by 1100 watts of RF power. It has been found that a time delay of approximately 300 nsec occurs before significant laser radiation is emitted from the time the cavity is switched from a high loss state to a low loss state. Peak powers of approximately 8 kW are typically obtained at a 20 kHz pulse repetition rate. Typically such a laser would normally emit over 100 W but when operated with the insertion of the TRP 404, EO crystal 142 and a RPR 410 within the feedback cavity 406, 408, such a laser typically emits 50 to 60 W of average power when operated in a Q-switched mode at high repetition rates.

Multiple Passes to Reduce EO Crystal Size and Voltage Requirements

The larger the EO crystal that is required, the more difficult it is to obtain good quality crystals. Furthermore, the cost of the crystal increases with size. On the other hand, the smaller the ratio of d/l, in Eq. 1, the lower the voltage, $V_o$, required to be applied across the crystal to obtain the desired polarization rotation. Consequently, making two or more passes through the crystal is, in many cases, advantageous from the standpoint of cost or from the standpoint of the reduction in the DC voltage applied across the crystal. This is so in spite of the additional optical losses suffered by multiple passes through the window/crystal/window assembly; assuming that one does not increase d appreciably in order to utilize the multiple pass approach.

Figure 18A:
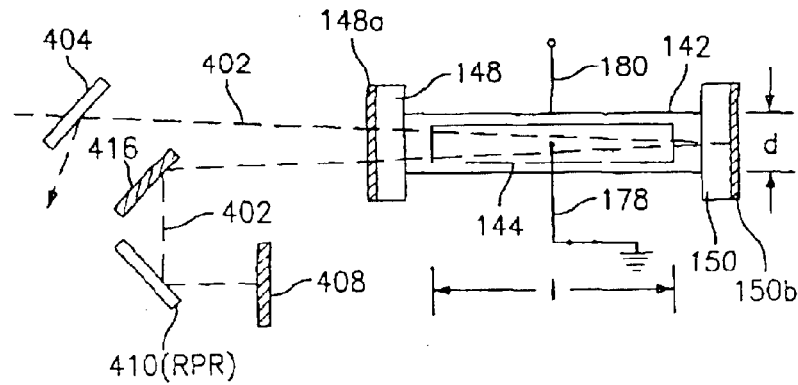
FIGS. 18A, 18B and 18C depict multiple pass configurations of the electro-optical modulator of FIGS. 16A–17B.
Figure 18B:
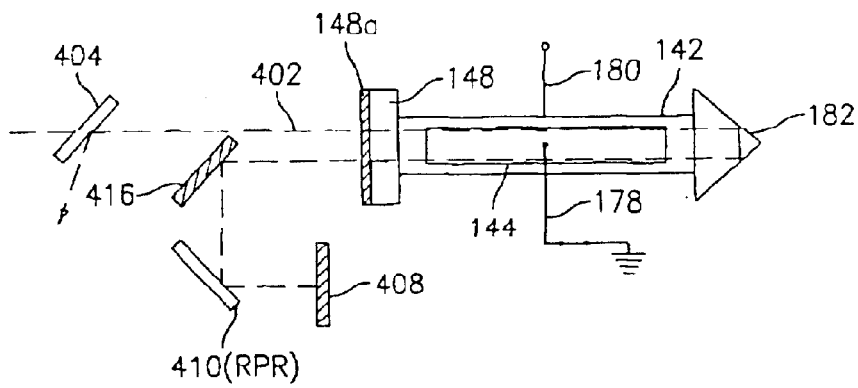
Figure 18C:
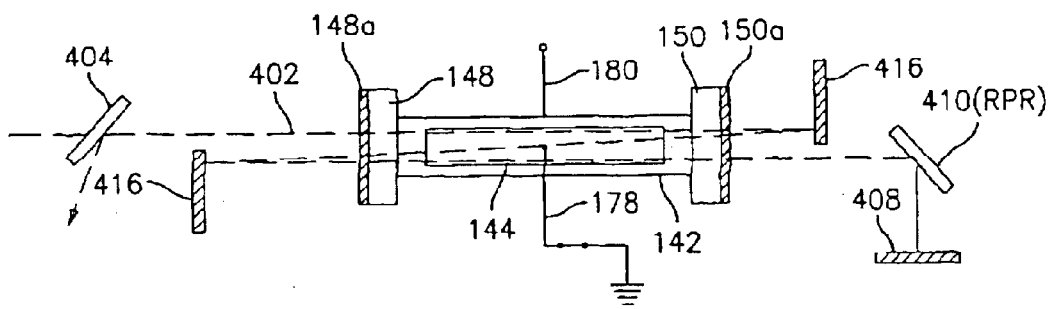

FIGS. 18A, 18B and 18C illustrate some multiple pass configurations in a side view format. FIG. 18A illustrates a double pass configuration with a high reflection coating 150b deposited on the outer surface of the ZnSe window 150 furthest from the gain medium 726. The ZnSe window 148 closest to the laser gain medium 726 is coated with an anti-reflection coating 148a. If d remains the same as in the single pass configuration of FIGS. 16A, 16B, 17A and 17B, then one has the choice of reducing l by ½ so that a shorter crystal is utilized, or, if l remains the same, as in the above single pass configurations, then the double pass configuration of FIGS. 18A and 18B reduces the voltage, $V_o$, by ½ for the same phase retardation. By this process one can reduce the voltage by ⅓ for the triple pass configuration of FIG. 18C.

FIG. 18B illustrates another version of the double pass EO modulator 140. This version utilizes a ZnSe prism 182 replacing the ZnSe window 150 and the reflecting coatings 150b thereon shown in FIG. 18A. The double pass versions require ½ $V_o$ of Eq. 1 to be applied to the EO crystal 142 for an 180 degree phase retardation, whereas the triple pass version of FIG. 18C requires ⅓ $V_o$ to be applied; assuming the d/l ratio of the EO crystal 142 is maintained constant. For a 90 degree phase retardation, the voltages required are ¼ $V_o$ for a double pass and ⅙ $V_o$ for a triple pass arrangement of the crystal 142.

The inclusions of the TFP 404 and the RPR 410 optical components are also indicated in FIGS. 18A, 18B and 18C. The ¼λ plate 412 of FIGS. 16A and 16B or other polarization retardation devices can also be used in place of the RPR devices 410.

Automatic Down Delay Circuit (Pulse Tail Clipping)

Figure 19:
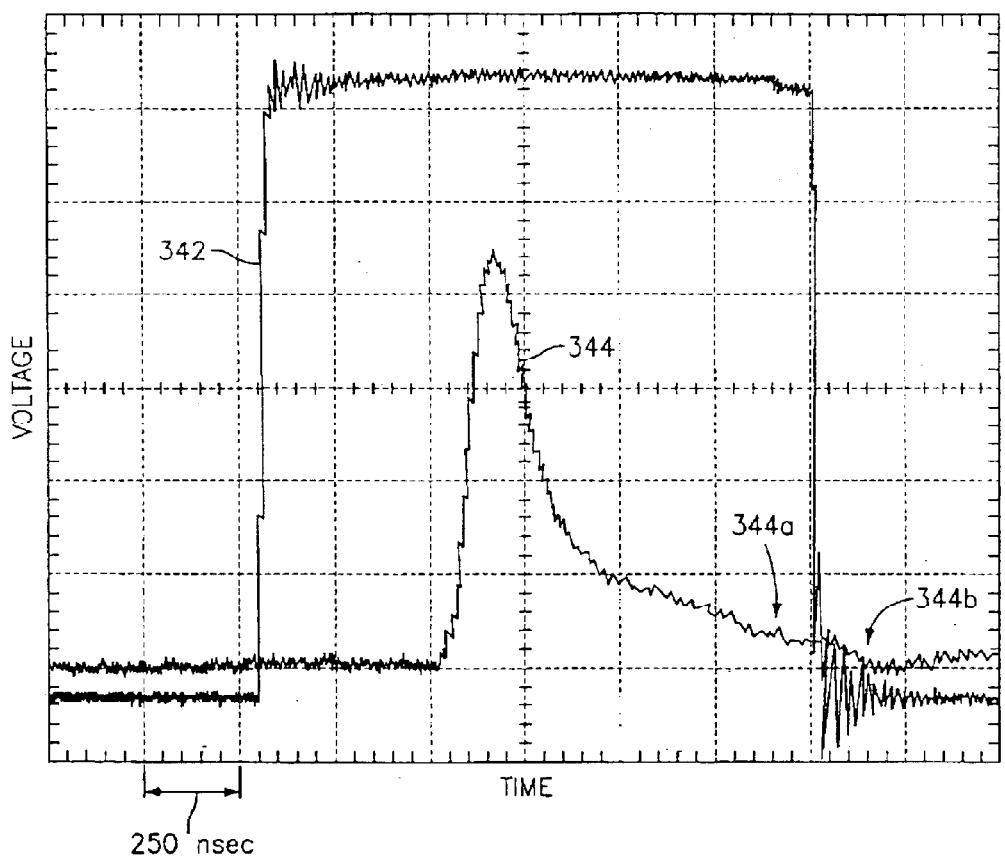
FIG. 19 is a first graphical depiction of oscilloscope traces of a high voltage pulse applied to an electro-optical crystal in a Q-switched laser and the resultant output pulse of the laser.

FIG. 19 illustrates the operation of the Q-switched laser system of FIG. 5 or FIG. 10. The square shaped waveform 342 is the high voltage pulse applied to the CdTe EO crystal 142 by the switching circuit 206 of FIGS. 5 and 10. The pulse-like waveform 344 is the Q-switched output pulse of the laser displaying a long tail 344a. The horizontal scale is 250 nsec per major division. Both waveforms are bandwidth limited in this figure. The peak voltage of the high voltage pulse 342 applied to the CdTe EO crystal 142 is 2.7 kV and its width is approximately 1.5 microsec. Approximately 500 nsec after this voltage is applied to the EO crystal 142, laser action is initiated. The average power of the Q-switched output pulse 344 of the laser, at a 20 kHz pulse repetition frequency (PRF) for the voltage pulse applied to the crystal 142, and with a long tail, is approximately 15 W for 110 nsec wide pulses. This yields about 6.8 kW of peak power per pulse (15 W÷(110×10$^{-9}$ sec×2×10$^4$ Hz)). The energy per pulse is approximately ¾ mJ. Notice that the pulse 342 extends out to beyond 1 microsecond because of the long tail 344a. This tail 344a contains appreciable energy which can circumvent the advantages of using short laser pulses to drill holes or mark or encode stressed glass containers or surfaces, or to perforate or drill small holes in paper or plastic. Notice also that when the high voltage 344 applied to the EO modulator crystal 142 goes to zero the laser pulse 344 is clipped or truncated at 344b. At 20 kHz, and with tail clipping such that little or no pulse tail occurs, the average laser power experimentally obtained was 10 W with pulse energies of approximately 0.5 mJ per pulse.

The major function of the Automatic Down Delay Circuit (ADDC) 306 of FIGS. 5 and 10 is to realize the full benefit of short Q-switched laser pulses in material processing applications, such as drilling, by truncating the long tails 344a of the Q-switched laser pulses. This prevents unnecessary heating of the material during processing, such as hole drilling. The use of Q-switched pulses with tail clipping has not been previously utilized in industrial material processing applications such as via hole drilling of printed circuit boards.

Figure 20:
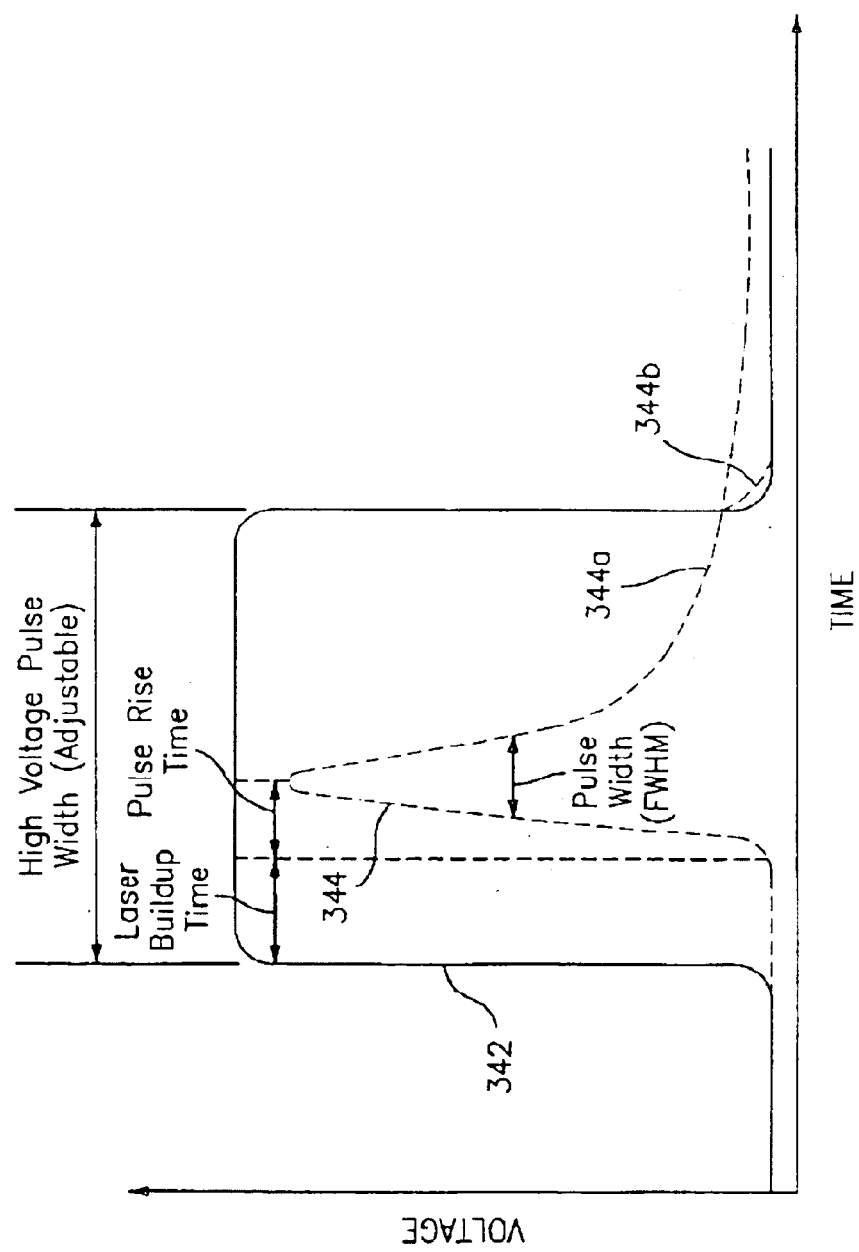
FIG. 20 is a graphical representation of the time interrelationship of a high voltage pulse applied to an electro-optical crystal in a Q-switched laser and the resultant output pulse of the laser.

One method by which to clip or truncate the tail of the laser pulses 344 in the laser system of FIGS. 5 and 10 is depicted by FIG. 20. FIG. 20 follows the data shown in FIG. 19. The width of the high voltage pulse 342 applied to the EO crystal 142 is preselected or adjusted at a set value so as to obtain approximately the desired amount of tail clipping of the long tail Q-switched laser pulse 344. This is accomplished when the switching circuit 206 turns off the pulse 342. The turning off of the high voltage pulse 342, causes the laser to transition from a low loss state to a high loss state, thereby causing laser oscillation to cease. By preselecting or adjusting the width of the high voltage pulse 344, the amount of tail clipping can be preselected or varied as desired, yielding a laser shape and pulse width (LPW) at the half power points as shown in FIG. 20. The width of the high voltage pulse can be decreased to the point where the back end of the simultaneously super pulsed Q-switched laser pulse can be truncated to yield pulses shorter than 100 nanoseconds.

For some applications this pulse width preselection or adjustment approach may not be suitable because of the variation that can occur in the laser oscillation build time (BT) and the pulse rise time (PRT). BT is the time required for the laser to begin to lase after building up from spontaneous emission after the laser has transitioned from a high loss state to a low loss state by the application of the high voltage pulse 344 to the EO crystal 142. The laser pulse rise time (PRT) and the laser buildup time (BT) can vary primarily due to gain changes that can occur within the laser medium. This can be caused by the aging of the laser, variations in the temperature of the laser head 400, varying the pulse repetition rate, loss changes within the laser feedback cavity 406, 408, the amount of applied RF power 716 driving the laser head 400 because of power line variations, and in the variation in the polarization of the laser radiation 402 caused by changes in the EO modulator 140. All of these effects will cause a variation in the amount of laser pulse tail clipping that will occur when utilizing the preselected high voltage pulse width approach. The largest variation will occur with changes in the pulse repetition rate of the laser.

Figures 21A, 21B:
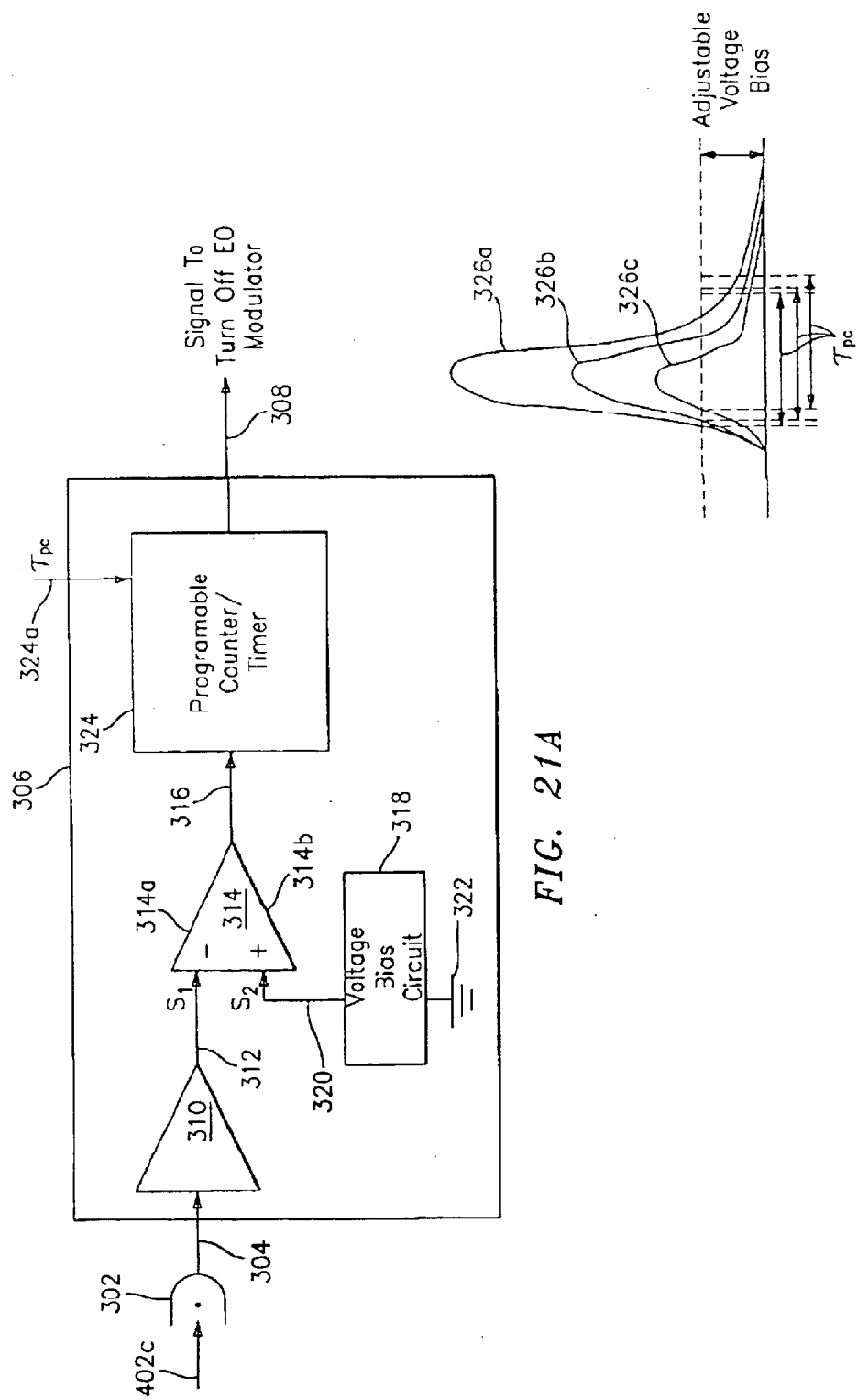
FIG. 21A is a first schematic diagram of an electronic circuit for truncating a portion of the output pulse in a $CO_2$ Q-switched laser.
FIG. 21B is a graphical depiction of the variations in the triggering of the output of the circuit of FIG. 21A as a function of the variations in the rise time and amplitude of the output pulse in a $CO_2$ Q-switched laser.

A second method of tail clipping is illustrated by FIGS. 21A and 21B. This laser pulse tail clipping approach offers less variation in pulse length with changes in laser gains and/or pulse repetition rate. This approach can be utilized in the laser systems depicted in FIGS. 5 and 10 for industrial material processing applications.

In the ADDC of FIG. 21A, radiation 402c emitted by either mirror 414 in FIG. 5 or FBM 408 of FIG. 10 is detected by an optical detector 302 such as a pyro-detector. An output electrical signal 304 from the detector 302 is applied to the input of one or more cascaded preamplifiers 310. The output signal 312 from the preamplifier 310 is applied to one input terminal 314a of a voltage comparator 314. An adjustable DC bias 318, 320 is applied to the other input terminal 314b of the voltage comparator 314. When the pulsed signal 312 from the preamplifier 310 exceeds the preselected voltage bias level 320, the voltage comparator 314 provides an output signal 316 to a programmable timer 324. Programmable gate arrays can be configured to perform the programmable timing or counting function of the timer 324. Provision is made at 324a to allow the laser operator to manually provide the appropriate time delay, $\tau_{pc}$, of the programmable timer 324, thereby enabling the laser operator to select how much of the Q-switched tail 344a is clipped. After the selected time delay, $\tau_{pc}$, the programmable timer 324 emits a signal 308 to the pulse receiver 202 or the switching circuit 206 of FIGS. 5 and 10. This turns off the high voltage 342 applied to the EO crystal 142 thereby transitioning the laser from a low loss state to a high loss state and causing the laser action to cease.

Since the beginning of the sequence for issuing the signal 308 to clip the tail 344a of the Q-switched pulse 344 is started by detecting the Q-switched pulse itself and not by the beginning of the high voltage pulse 342 as in FIG. 20, the approach of FIG. 21A is not sensitive to the laser oscillation build up time (BT) of FIG. 20 and therefore provides a better control of the laser pulse width (LPW).

As illustrated in FIG. 21B, as the Q-switched pulse rise time and/or Q-switched pulse amplitude changes, shown for illustration purposes as 326a, 326b and 326c, there is some variation in the time at which the timer 324 starts running because of changes in the laser pulse rise time (PRT). Changes in the laser pulse rise time and amplitude will occur because of the same reasons given above. This approach will cause a much smaller variation in the laser pulse width (LPW) than the approach of FIG. 20.

If the LPW variation provided by the approach of FIGS. 21A and 21B still cannot be tolerated in the application of interest, a third method of tail clipping is illustrated by FIGS. 22A and 22B. In FIG. 22A, the comparator 314 issues a signal 316 at a pre-selected position on the Q-switched pulse. Examples of possible pre-selected pulse positions are at 50% of the pulse rise time or at the peak of the pulse. In FIG. 22A, a detector 302 is used to detect the Q-switched pulse 402c. The electrical output signal 304 of the detector 302 is provided to one or more cascaded preamplifiers 310. The output signal 312 of the preamplifier 310 is split in two signals 312a, 312b. One signal 312a is propagated through a time delay, $\tau_s$ device 328, which yields a signal $S_1$ 330 as shown. Signal $S_1$ has the pulse shape shown at 340a in FIG. 22B. The time delay, $\tau_s$, of up to about 60 nsec was found to be adequate. The other signal 312b is propagated through an attenuator 336, which provides a signal $S_2$ 338 as shown. Signal $S_2$ has the pulse shape shown at 340b in FIG. 22B. Signal $S_1$ along with a negative DC bias voltage 334 is applied to one input terminal 314a of the voltage comparator 314. Signal $S_2$ is applied to the other input terminal 314b of the comparator 314. When the value of signal $S_1$ equals the value of the signal $S_2$ (340c of FIG. 22B), the voltage comparator 314 issues a signal 316 to the timer 324. After the time delay, $\tau_{pc}$, at 324a, the programmable timer 324 issues the signal 308 to the pulse receiver 202 or switching circuit 206 of FIGS. 5 and 10 to turn off the high voltage 342 being applied to the EO modulator 140 of FIGS. 5 and 10. The turning off of the high voltage 342 applied to the EO modulator 140 causes the laser cavity to transition from a low loss state to a high loss state, thereby stopping the laser action and clipping the Q-switched laser pulse tail 344a. The amount of the tail clipped is determined by the time, $\tau_{pc}$, applied to the programmable timer 324 at 324a by the operator of the laser system. FIG. 23B illustrates the relationship of the signals S1 and S2 provided to the voltage comparator 314.

Figure 23A:
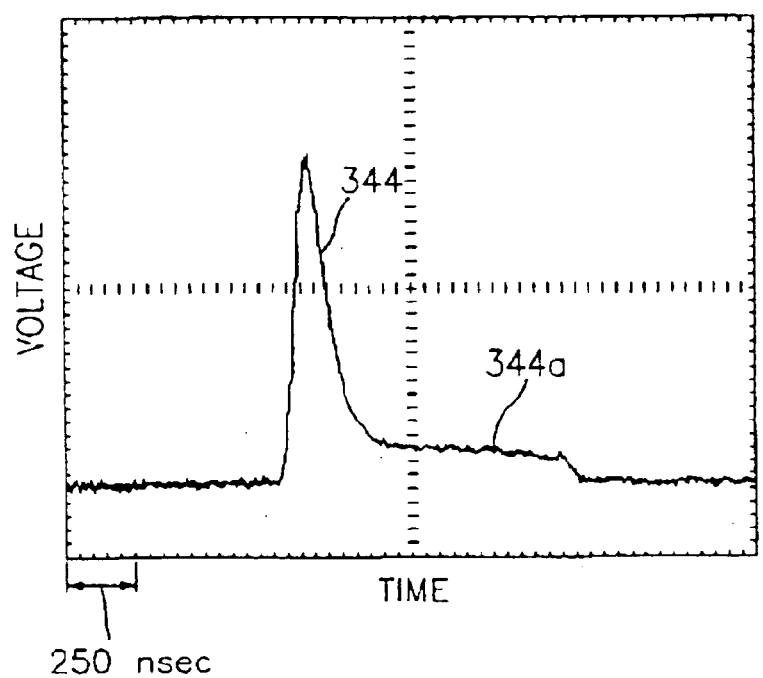
FIG. 23A is a graphical depiction of an oscilloscope trace of the output pulse of a $CO_2$ Q-switched laser with a long tail.
Figure 23B:
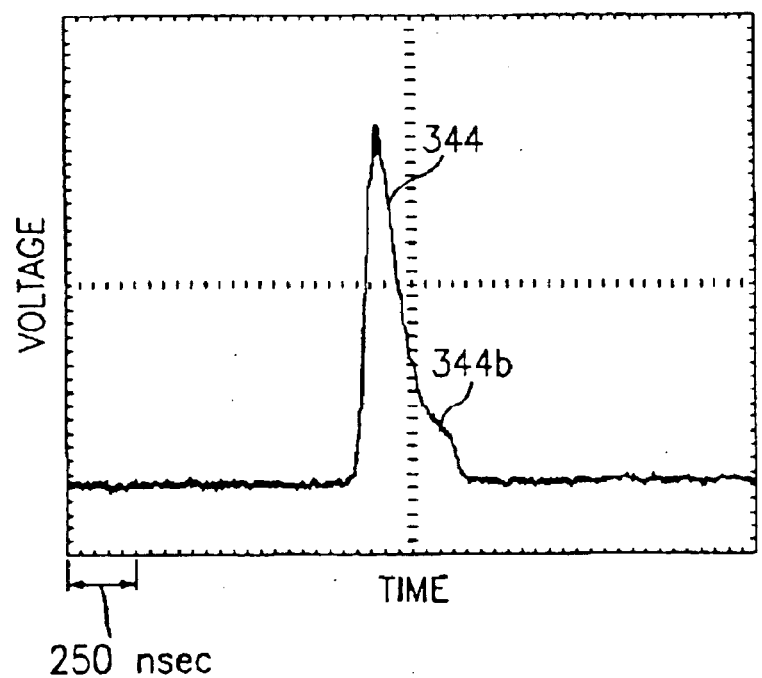
FIG. 23B is a graphical depiction of an oscilloscope trace of the output pulse of a $CO_2$ Q-switched laser with a truncated tail.

FIGS. 23A and 23B illustrate typical Q-switched pulses 344 obtained from the laser of FIG. 5 under long pulse and short pulse tail conditions, respectively utilizing the ADDC 306 of FIG. 22A. The data is not bandwidth limited. The data was taken with a HgCdTe detector (not shown) at the output of the laser housing 102 of FIG. 5 or 10. FIG. 23A shows an approximately 1.1 microsecond pulse length at the baseline including the long tail. By decreasing the value of the delay, $\tau_{pc}$, in the programmable timer 324 of FIG. 22A, a short pulse tail 344b is obtained as illustrated in FIG. 23B. In this case, the total Q-switched pulse width at the baseline is now about 450 nsec. The Q-switched pulse width at the half power points of the pulse is 100 nsec for both cases. The data in FIGS. 23A and 23B was taken at a PRF of 20 kHz for the voltage 342 applied to the electro-optic crystal 142.

In the housing arrangement for the ADDC 306, high electromagnetic interference (EMI) immunity is desired because of the closeness of the nearby high voltage pulse circuitry required to drive the EO crystal 142. The EMI immunity is obtained by inserting the detector 302 and the rest of the ADDC circuitry 306 within a tightly sealed metal housing 346 and its cover 348 and making exceptionally good electrical contact to the covers and electrical connectors that enclose the circuitry 306 within the metal housing 346 and its cover 348.

Figure 24B:
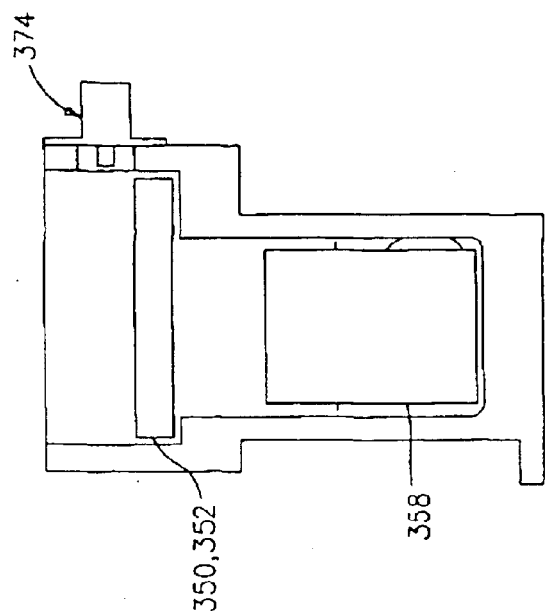
FIGS. 24A and 24B are schematic depictions of the housing and the arrangement of the electronic circuits of FIGS. 21A and 22A.
Figure 24A:
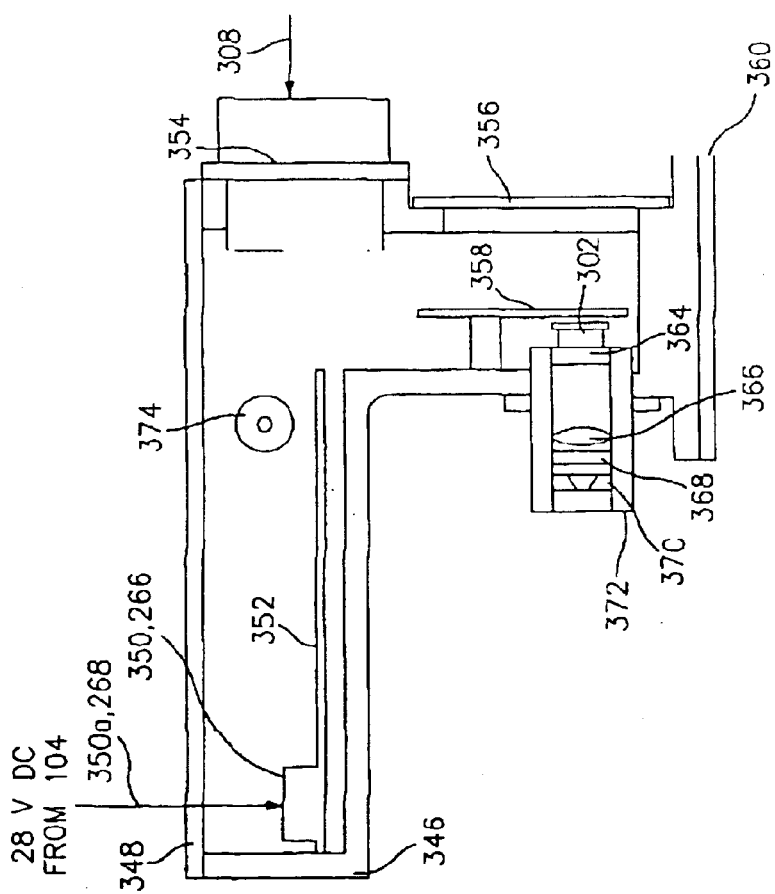
Figure 25A:
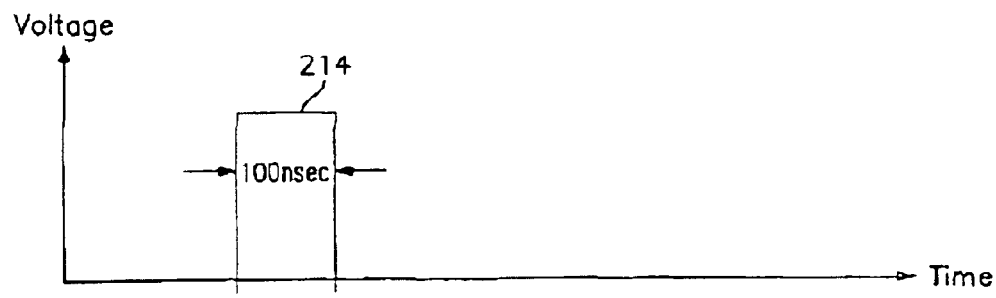
FIGS. 25A, 25B, 25C and 25D are graphical depictions of the relative timing of the charging and discharging signals, the high voltage signal applied to an electro-optical modulator and the resultant output pulse of a Q-switched laser.
Figure 25B:
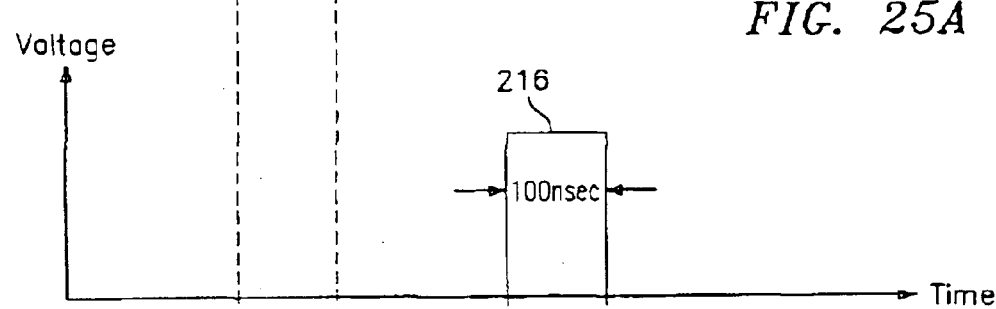
Figure 25C:
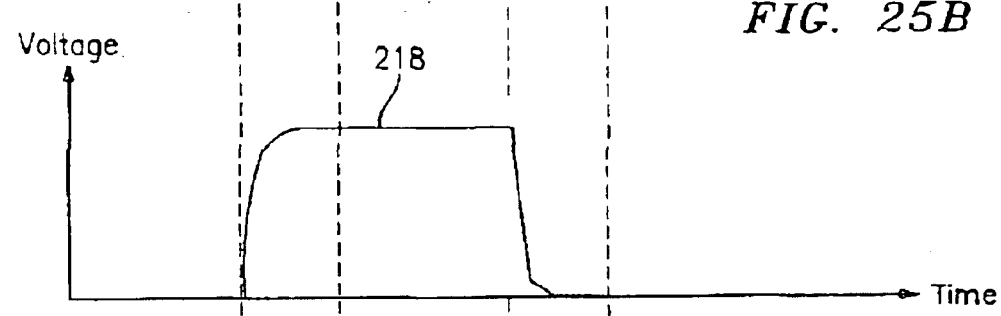
Figure 25D:
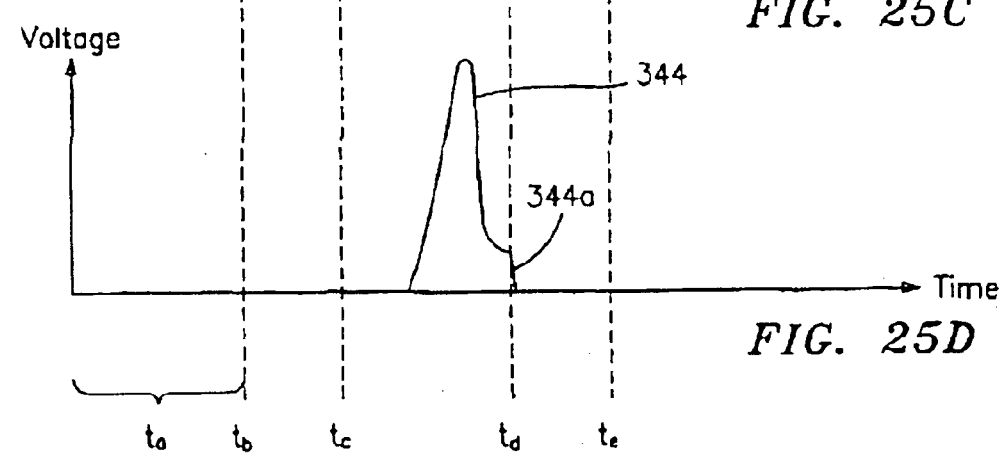

FIGS. 24A and 24B present a side and end views that illustrate where the ADDC 306 components are placed within the metal housing 346. In FIG. 24A, item 348 is the top metal cover and item 356 is the rear metal cover. These are tightly bolted onto the metal housing 346 with good electrical contact gaskets (not shown) between the covers 348, 356 and the housing 346 to eliminate spurious electrical signals from getting into or out of the housing 346. Item 350 is a DC to DC converter to convert 28 volts DC from the controller 104 to the appropriate DC voltage value to power all the circuits of the ADDC 306. The DC to DC converter 350 is placed on the signal processing printed circuit board 352. This printed circuit board 352 contains the programmable gate arrays and associated components comprising the programmable timer 324. Item 354 is an electrical connector that provides electrical signal access into and out of the laser housing 102. The Q-switched laser pulse tail-clipping signal 308 from the ADDC 306 is delivered to the pulse receiver 202 through this EMI protected connector 354. Item 358 is the printed circuit board that contains the preamplifiers 310, the time delay, $\tau_s$, 328 the attenuator 336, the DC bias 332 and the voltage comparator 314 circuits illustrated in FIGS. 21A and 22A. Item 360 is a bottom height adjustment plate. Item 302 is the optical detector which can be a pyro-electric detector as illustrated in FIGS. 21A and 22A. Item 364 is an optical diffuser to ensure uniform illumination of the pyro-detector 302. Item 364 is inserted into a separate optical component barrel housing 372 which fits into the main ADDC housing 346. Inserted in the optical component barrel housing 372 is an aperture 370, an optical attenuator 368 and a beam-concentrating lens 366. Items 368, 346 and 364 are inserted only if needed. Item 374 is a BNC coaxial connector, which provides an output signal from the detector 302 so that one can monitor the Q-switched laser pulse 344 outside the ADDC assembly housing 346.

High Voltage EO Crystal Electronics Design

Figure 26:
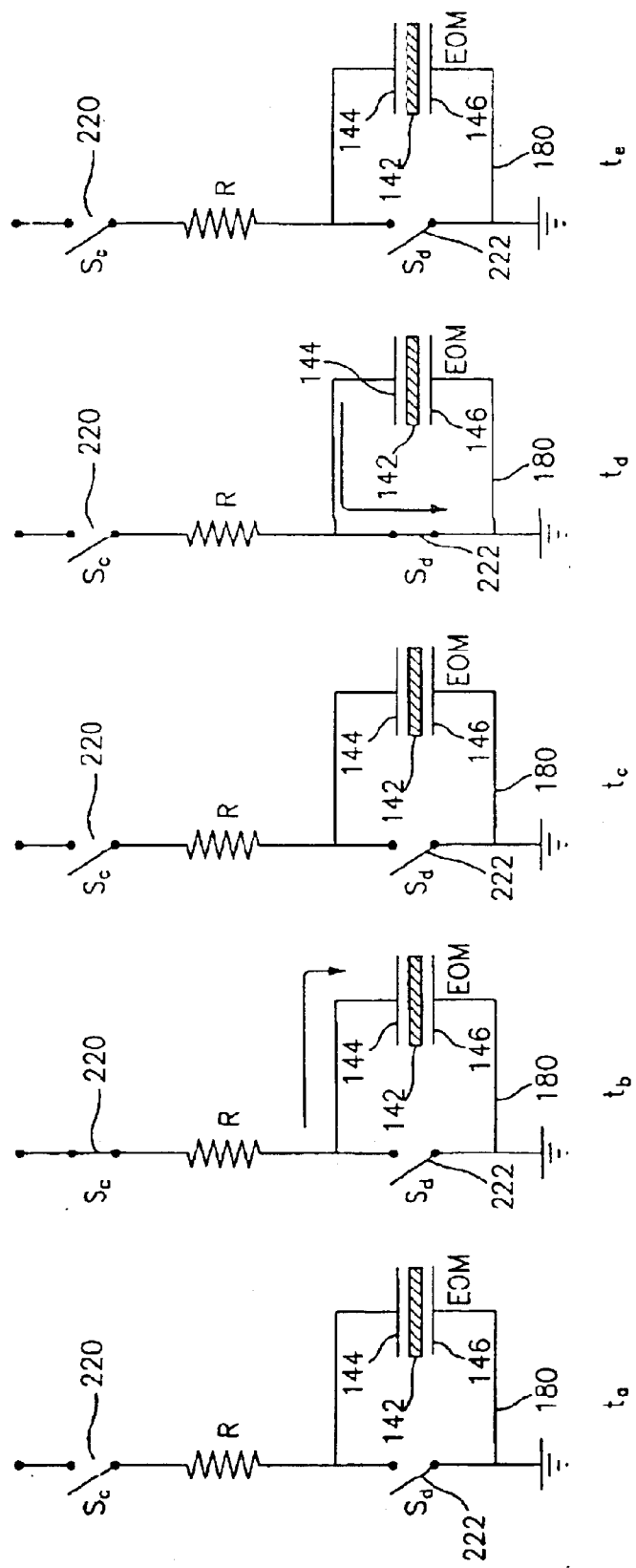
FIG. 26 is an electrically equivalent schematic diagram corresponding to FIG. 25 utilizing the positions of mechanical switches for charging and discharging the EOM to explain the switching circuit processes for an electro-optic modulator in a Q-switched laser.

FIGS. 25A–25D illustrate the operation of the high voltage switching circuit 206 for the EO crystal 142 of FIGS. 5, 10, 11, 12 and 13. FIGS. 25A–25D show the relative timing relationships between the waveform signals to command the charging 214 of the EOM 140, to discharge 216 the EOM 140, the high voltage 218 applied to the EOM 140 and the resultant Q-switched pulse 344 emitted by the laser. For illustrative purposes, the fundamental operation of the high voltage switching circuit 206 is depicted in FIG. 26 in an electro-mechanical switching format with cross-reference to FIGS. 25A–25D. During the period of time denoted by "$t_a$" in FIGS. 25A–25D, there is no signal applied by the high voltage switching circuit 206 of FIGS. 5 and 10. Consequently, in FIG. 26 the charging switch 220 and the discharging switch 222 are both open and the EOM 140 is not charged-up (i.e. no voltage is applied to the EOM 140). When a signal 214 to charge-up the capacitance of the EOM 140 is provided by the system controller 104 of FIGS. 5 and 10, charging switch Sc 220 in FIG. 26(b) is closed at time "$t_b$" thereby permitting the capacitance of the EOM 140 to be charged up to the full high voltage value available from the HV switching circuit 206 of FIGS. 5 and 10. After approximately 100 nsec, signal 214 to charge the EOM 140 is turned off at time "$t_c$." The EOM 140 is fully charged and switch 220 is opened as illustrated at "$t_c$" in FIG. 26(c). The laser is now in a low cavity loss condition and laser oscillation is initiated. After the cavity build-up time (i.e. CBT of FIG. 25D) the Q-switched laser pulse 344 is emitted as shown. At time "$t_d$" the signal 308 from the ADDC 306 of FIG. 5 or 10 or FIG. 21A or FIG. 22A, discharges the EOM 140 by closing switch 222 as shown at "$t_d$" in FIG. 26(d). After approximately 100 nsec, signal 216 to discharge the EOM 140 is turned off and switch 222 is opened at time "$t_e$," thereby leaving the high voltage switch 206 as in FIG. 26(e), which is the same as in the original state during the time "$t_a$." The discharge of the EOM 140 clips the tail 344a of the Q-switched pulse 344 as previously discussed (see FIGS. 25A–25D).

Figure 27:
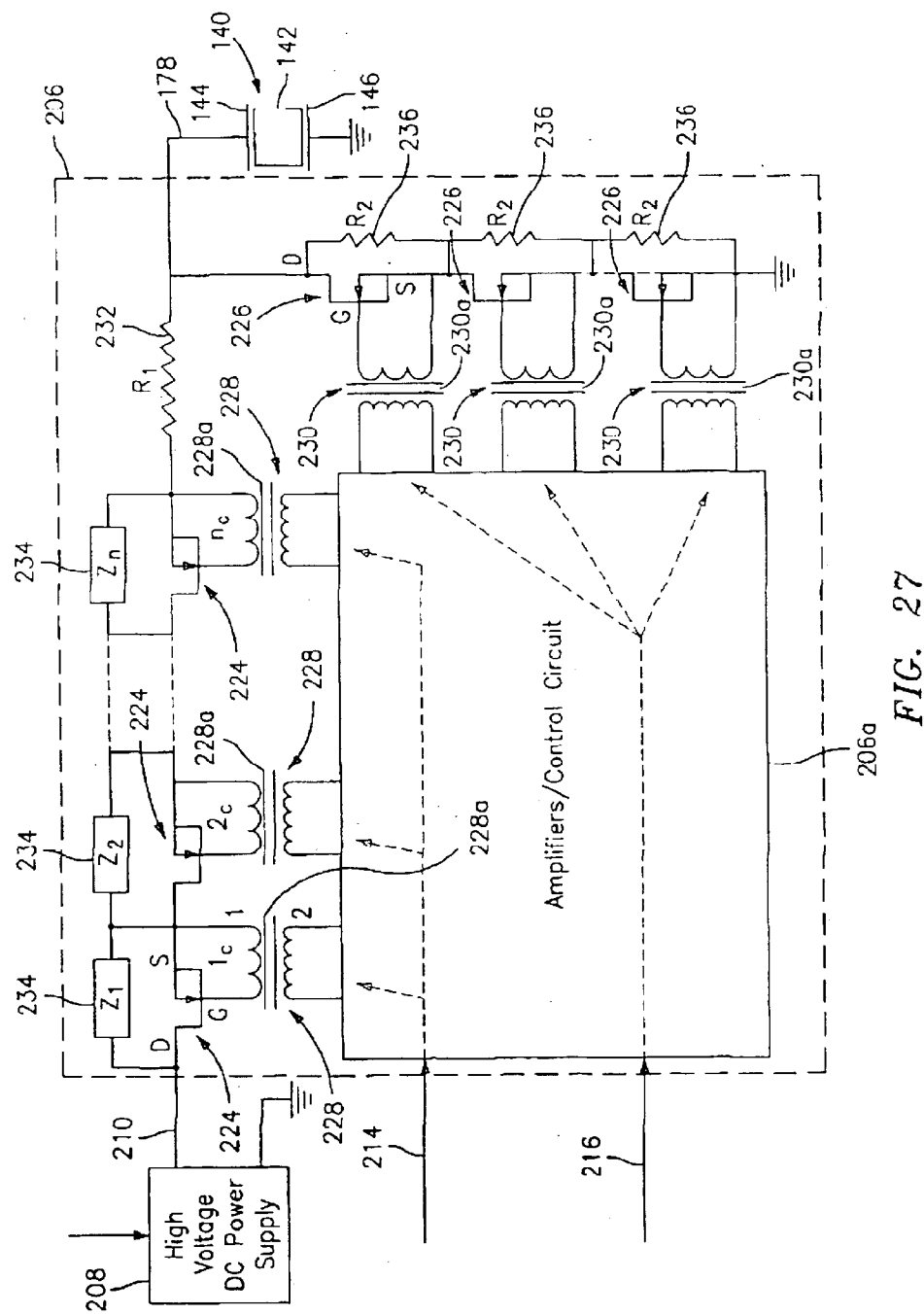
FIG. 27 is a more detailed electrical schematic diagram of the switching circuit in FIG. 26.

FIG. 27 illustrates the electronic implementation of FIG. 26. The high voltage pulse switching circuit 206 operates in conjunction with the Automatic Down Delay Circuit (ADDC) 306 of FIGS. 21A and 22A to generate the high voltage waveform required for driving the EO modulator crystal 142 to produce the Q-switched laser pulse 344. The high voltage pulsed signal generation system 200 of FIGS. 5 and 10 includes a high voltage DC power supply 208 and the high voltage switching circuit 206 as shown in detail in FIG. 27. The HV switching circuit 206 accepts either a pulsed signal 214 to charge the EO modulator 140 or a pulsed signal 216 from the ADDC 306 to discharge the EO modulator 140.

The pulsed signal 214 to charge the EO modulator 140 initiates a charge cycle, which applies high voltage to the EO modulator crystal 142 as depicted in time "$t_b$" of FIGS. 25A–25D. The pulsed signal 216 to discharge the EO modulator 140 initiates a discharge cycle where the EO modulator voltage is returned to zero as depicted in time "$t_d$" of FIGS. 25A–25D.

In order to produce fast high voltage pulse rise times of ~10 ns or less, the design of the high voltage pulse switch 206 requires careful attention in minimizing parasitic capacitance and inductance while still providing the necessary high voltage insulation to prevent electrical arcing. In addition, reducing parasitic capacitance results in lower power dissipation, which significantly effects the thermal management and ultimately overall size of the high voltage switching circuit 206.

The desirable features for the high voltage switching circuit 206 driving the EO crystals 142 are: 1) reliable high voltage operation in a small size and at high PRFs, 2) low parasitic capacitance for fast pulses rise times and reduced power dissipation, 3) low propagation delay to allow Q-switched or cavity dumped operation and 4) the ability to adjust the optical pulse amplitude by varying the high voltage pulse amplitude To achieve the above performance, the high voltage switching circuit 206 is constructed using a plurality of high voltage power MOSFETs 224, 226 of FIG. 27 for charging and discharging the EO crystal 142. The high voltage power MOSFETS 224, 226 fulfill basic the functions of the mechanical switches 220, 222 of FIG. 26. The switching MOSFETs 224, 226 are selected for their high operating speeds and avalanche high energy capabilities. The high speed characteristic is used to generate fast high voltage pulses while the latter characteristic is used to obtain reliable, fault tolerant operation. For example, MOSFET's such as Philips Electronics BUK 456 are suitable for this application. Drive for the charging MOSFET switches 224 is provided by a series arrangement of $n_c$, wideband pulse transformers 228. These transformers 228 are constructed on toroidal ferrite cores 228a using high voltage wire and potting compounds to obtain the required high voltage insulation. FIG. 27 illustrates a plurality of $n_c$ step down pulsed transformers 228 with a n:1 ratio such as 2 to 1 or 3 to 1 in order to obtain current gain. When a "charge" pulsed signal 214 is applied to the pulse generation switching circuit 206through the amplifier/control circuit 206a, these transformers 228 provide a positive signal to the gate (G) and a negative signal to the source (S) connectors of each of the $n_c$ charging MOSFETs 224. This causes current to flow from the high voltage DC power supply 208 through the drain (D) to the source (S) of each of the MOSFETs 224 then through the resistor 232 and on to the EO crystal 142. The number of charging MOSFET switches 224 used in the circuit 206 is determined by the voltage rating of the MOSFETs 224 divided into the maximum voltage applied to the EO crystal 142 plus a factor to ensure high reliability. For a voltage of 4 kV, five to six MOSFSETs of the Philips BUK 456 variety appears to suffice. When the charge pulse signal 214 goes to zero, the MOSFETs 224 are turned off as illustrated at time "$t_c$" of FIGS. 25A–25D and 26 and the EO modulator 140 maintains its charge until it is commanded to discharge by signal 216.

When the discharge pulse signal 216 is applied to the high voltage generation switching circuit 206through the amplifier/control circuit 206a, a pulsed signal 216 is applied to each of the $n_d$ step down transformers 230 which in turn applies a turn on signal across the Gate (G) and Source (S) connections of each of the "$n_d$" discharge MOSFETs 226. This enables current to discharge from the EO modulator crystal 142 through each of the "$n_d$" discharge MOSFETs 226 to ground as schematically illustrated at time "$t_d$" of FIGS. 25A–25D and 26. When the discharge signal 216 goes to zero, the MOSFETs 226 are turned off and the status of the switching circuit 206 is as depicted at time "$t_e$" of FIGS. 25A–25D and 26.

An impedance, $Z_n$, 234 can be connected across each of the $n_c$ charging MOSFETs 224 to provide a voltage balance across the MOSFETs 224. The resistive part of the impedance 234 across each of the charging MOSFETs 224 can typically each have a 10 megaohm value to balance the DC between each of the charging MOSFETs 224. If the avalanche properties of the charging MOSFET 224 present a problem then a capacitor across each of the resistors can be used. The value of the required capacitance across each of the charging MOSFETs 224, needs to be different. The capacitors are also a balance for the AC portion of the charging signals 214. From a cost standpoint the capacitor can be done away with if the charging MOSFETs 224 are selected not to be sensitive to avalanching problems.

Resistors 236 (typically 150 kilo ohms) are used to ensure DC balancing during the EO modulator 140 discharge portion of the cycle. The charging resistor 232 in FIG. 27 serves the purpose of minimizing cross conduction problems between the charging and discharging portion of the circuits.

Discussed above are the basic elements of this high voltage switching circuit 206. Variations upon these basic elements are possible to those versed in the fast electronic circuits state of the art. For example, a single transformer with multiple secondary windings can be used to drive the MOSFETs instead of individual cores as shown in FIG. 27. Positive feedback windings can also be added to produce faster pulse transitions. Various opto-isolated gate drive techniques could also be applied. Active off drive of the non-conduction MOSFETs can also be employed which allows this isolation resistor to be minimized or eliminated. Resonant charging techniques can also be used to reduce power consumption.

The high voltage pulse output from the high voltage switching circuit 206 may be varied in order to obtain a desired output optical power from the Q-switched laser pulse 344. This can be accomplished by varying the output voltage of the high voltage power supply 208 in either an open or closed electrical loop fashion. In addition, the ADDC circuit 306 allows extended variability in the output optical pulse width thereby permitting pulse energy variation on a pulse-to-pulse basis.

Figure 28:
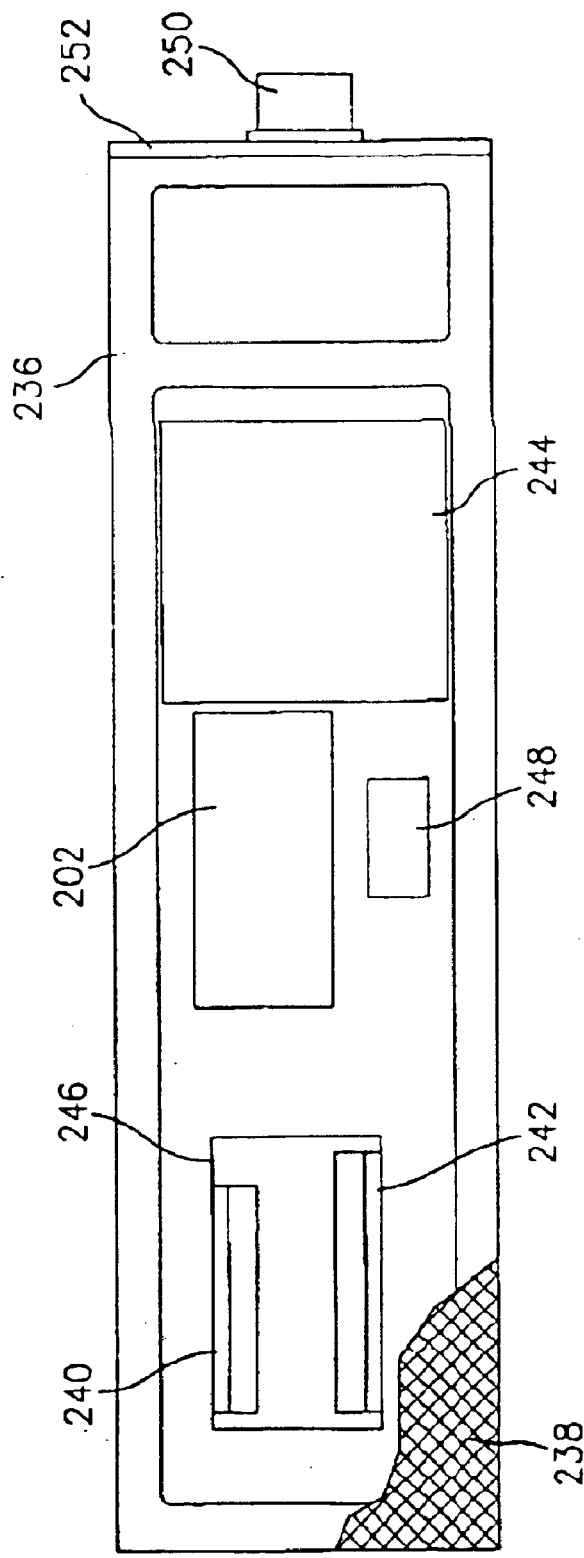
FIG. 28 is a schematic diagram of the housing and the placement of the assembly of the elements of the switching circuit of FIG. 27.

The pulse receiver 202, the high voltage DC supply 208 and the high voltage switching circuit 206 of FIGS. 5 and 10 and 27 are packaged in a metal housing 236 as illustrated in FIG. 28. Because of EMI considerations, careful attention is given to preventing electromagnetic radiation from either leaking out of or into the metal housing by techniques well known in the art. Item 238 is a cover for the housing 236. Items 240 and 242 are heat sinks for the high voltage switching circuit printed circuit board. Item 202 is the printed circuit board containing the pulse receiver. Item 244 is a filter capacitor and item 246 is the box containing the high voltage DC power supply 208 such as an Ultra volt Model 4C24-P60. Item 250 is the input/output electrical connector and Item 252 is the end plate.

Automatic Stop Drilling (ASD) Module

Figure 29:
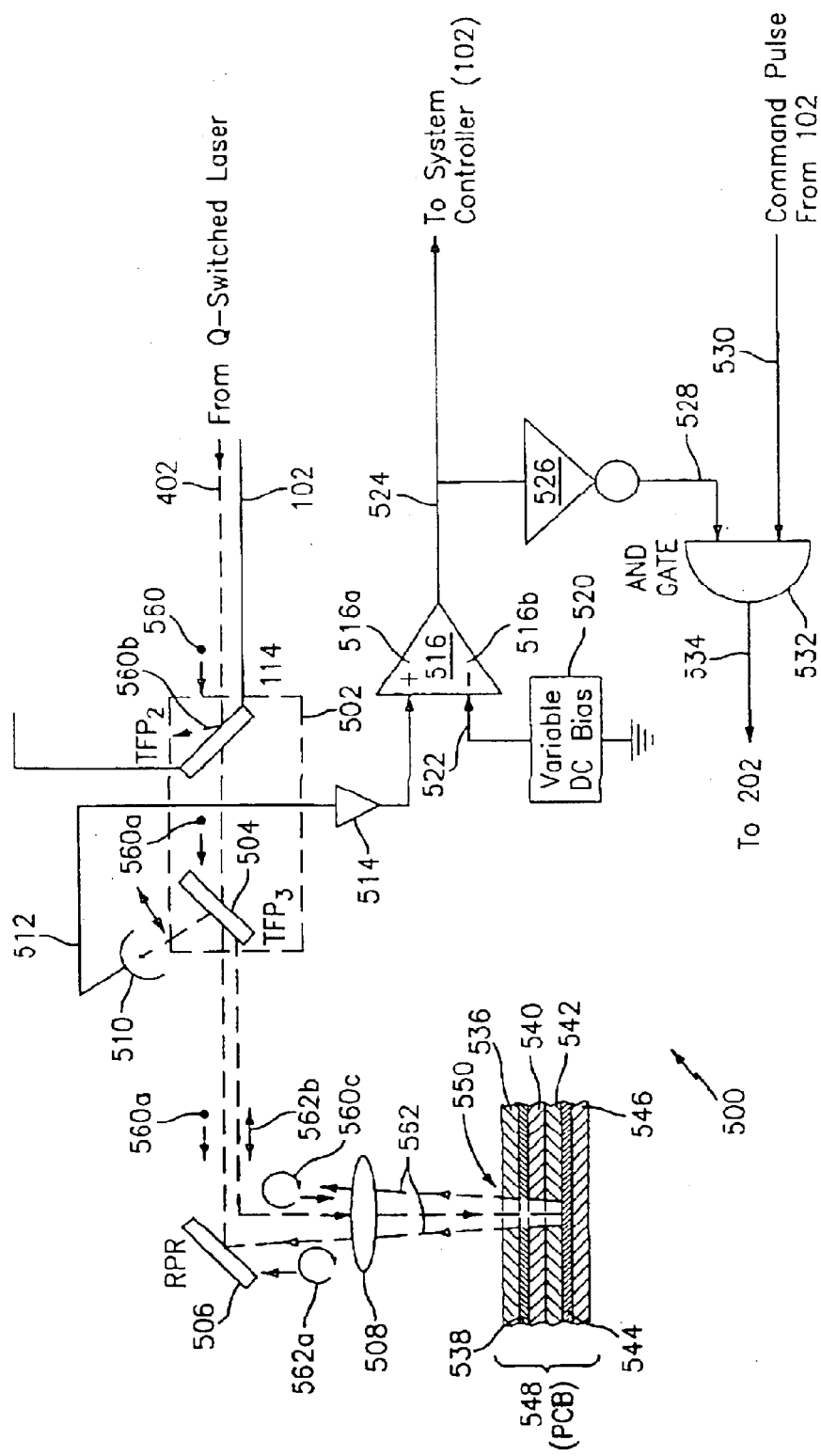
FIG. 29 is a schematic diagram of an automatic laser stop circuit for a Q-switched laser used in drilling blind via holes.

An attractive addition to a via hole laser drilling system that uses repetitive laser pulses, such as a Q-switched laser, an acousto-optic gated cell, a gated or super pulsed laser, or a TEA laser, is an automatic stop drilling (or processing) system operative to direct the laser to stop drilling operations, thus, stopping the process when a reflective surface, such as copper or other metal, is reached in the drilling processing. For example, an automatic stop drilling (ASD) (e.g., an automatic stop laser operation) system may utilize the large back reflectance from copper or other metals when the laser has drilled through a dielectric material in a printed circuit board. The detection of the signal from the back reflected radiation provides a signal to the laser to stop pulsing at that location on a work piece and to start pulsing again after the laser beam has been moved to another spot on the work piece. Such an ASD system prevents wasted time thereby increasing the throughput of the via hole drilling system. FIG. 29 illustrates a schematic of an ASD system 500 connected to the Q-switched laser housing 102 of FIG. 10. Such an ASD system 500 can also serve to prevent back reflection radiation from the workpiece 548 from entering the laser cavity 406, 408 and causing optical damage to the optical components within the cavity 406, 408.

FIG. 29 illustrates one method of implementing an ASD system. It also illustrates, as an example, how a pulsed via hole drilling laser has drilled through a work piece 548. As an example, the work piece 548, such as a printed circuit board, has four dielectric layers 536, 540, 542, 546, one opened copper interconnect 538 and a second copper interconnect 544 from which a strong back reflected signal is detected. The polarized pulsed laser beam is directed onto the work piece by the RPR 506 and a focusing lens 508. The pulsed laser beam drills through the first dielectric layer 536, past the opened copper interconnect, 538 and through dielectric layers 540 and 542 until the laser beam 402 is stopped by copper interconnect line 544. Once the copper interconnect line 544 is reached a large amount of radiation is reflected back out of the via hole 550 toward the focusing lens 508 and back toward the laser cavity. The ASD system 500 utilizes the back-reflected radiation to automatically stop the laser from continuing to pulse at this location. The laser re-initiates pulsing and therefore drilling action again after it is moved to a new location and commanded to restart pulsing.

The ASD system 500 functions as follows. The laser pulse 402 from the Q-switched laser is polarized in the plane of the paper as shown at 560 in FIG. 29. The laser pulse 402 passes through TFP 114 which is part of the laser housing 102 of FIGS. 5 and 10. TFP 114 then passes that radiation 560a polarized perpendicular to the plane of the paper with little loss, and reflects out other polarization components 560b of the radiation. The same occurs for TFP 504. Consequently, by rotating the TFP 504, one can vary the attenuation of the laser beam propagating onto the work piece 548. This is a manual option that can be incorporated into the laser housing 102 if a manual attenuation adjustment module is desired instead of adjusting the voltage applied to the EO crystal 142 to be described later, either in a closed loop format or by manually adjusting a variable resistor 212 of FIGS. 5 and 10. The two TFPs 114, 504 are positioned as indicated (i.e. tipped toward each other) in order to maintain a straight-line alignment from the laser head 400 to the RPR 506. If the option for such a manual attenuation beam adjustment is not selected, then only TFP 114 is required in FIG. 29. In either case, TFP 114 and 504 are used to pass the radiation onto RPR 506, onto the focusing lens 508 and then onto the work piece 548. The RPR 506 converts the polarization 560a that is perpendicular to the plane of the paper into a circularly polarized beam 560c so that when the circularly polarized radiation 562a is reflected 562 from the copper 544 in the work piece 548 is again reflected by the RPR 506, the radiation is translated into radiation 562b whose polarization is parallel to the plane of the paper. This polarization is reflected by the TFP 504 as shown and detected by a suitable detector 510, such as a pyro-electric detector. The use of the RPR also provides protection to the optics within the laser cavity from damage by radiation reflected back into the cavity by rotating the polarization of the back reflected radiation so that it is reflected away from the laser cavity by TFP3 504.

The electrical signal 512 from the detector 510 is applied to a preamplifier 514 and then to one input 516a of a voltage comparator 516. A variable DC bias 520, 522 is applied to the second input 516b. In order to avoid false alarms, the bias voltage 522 is adjusted to a high enough voltage so as to have the voltage comparator 516 emit an output signal 524 only on strong back-reflected signals arising from the metal reflection and not from the much weaker reflection from the dielectric. When the output signal 524 emitted by the voltage comparator 516 is larger than the bias voltage 522 a signal 524 is emitted by the voltage comparator. The electrical signal from the voltage comparator 524 is used to inform the system controller 102 that a "stop laser pulsing" command has been sent to the EO modulator switching circuit 206. This allows the system controller 102 to move the laser beam to another spot and reinitiate drilling action. The signal 524 from the voltage comparator 516 is also applied to an inverter 526 and then to a logic AND gate 532. The AND gate 532 supplies a "stop drilling" signal 534 to the pulse receiver 202, which insures that no voltage is applied to the EO crystal 142, if the signal 528 from the inverter 526 and a command pulse 530 from the pulse receiver 202 both applied to the AND gate 532.

The Automatic Stop Drilling System 500 of FIG. 29 operates as follows. If the drilling operation has not reached the second copper interconnect line 544, then there is little or no back reflected signal detected at the detector 510. As a consequence there is no input signal 512 provided to the comparator 516, nor signal output 524 from the comparator 516, i.e., the output 524 of the comparator 516 is at a "logic low." However, if the drilling operation has not reached the second copper interconnect line 544, the laser system 100 must continue drilling (i.e., continue Q-switching). In order for the laser system 100 to continue drilling, there must be an input 528 to the logical AND gate 532 so that the AND gate 532 can provide an output signal 534. This can occur because the inverter 526 converts the "logic low" of signal 524 to a "logic high" 528. The AND gate 532 logically ANDs the "logic high" of signal 528 with the "logic high" of signal 530 and the output 534 of the AND gate 532 directs the laser system 100 to continue drilling. If the drilling operation has reached the second copper interconnect line 544, then there is a large back reflected signal detected by the detector 510. As a consequence there is an input signal 512 provided to the comparator 516 through the preamplifier 514 and an output signal 524 from the comparator 516, i.e., the output signal 524 of the comparator 516 is now at a "logic high." When the drilling operation has reached the second copper interconnect line 544, the electronics instruct the laser system 100 to discontinue drilling (i.e., discontinue Q-switching). In order for the laser system 100 to discontinue drilling, the output 534 of the logical AND gate 532 must be a "logic low." Thus, the inverter 526 converts a "logic high" 524 to a "logic low" 528. The AND gate 532 logically ANDs the "logic low" of signal 528 with the "logic high" of signal 530 and the lack of an output signal 534 from the AND gate 532 results in no signal to the pulse receiver so that no voltage is provided to the EOM crystal 142, thereby directing the laser system 100 to discontinue drilling.

Simultaneously Super-Pulsed and O-Switched Laser Operation

Figure 30A:
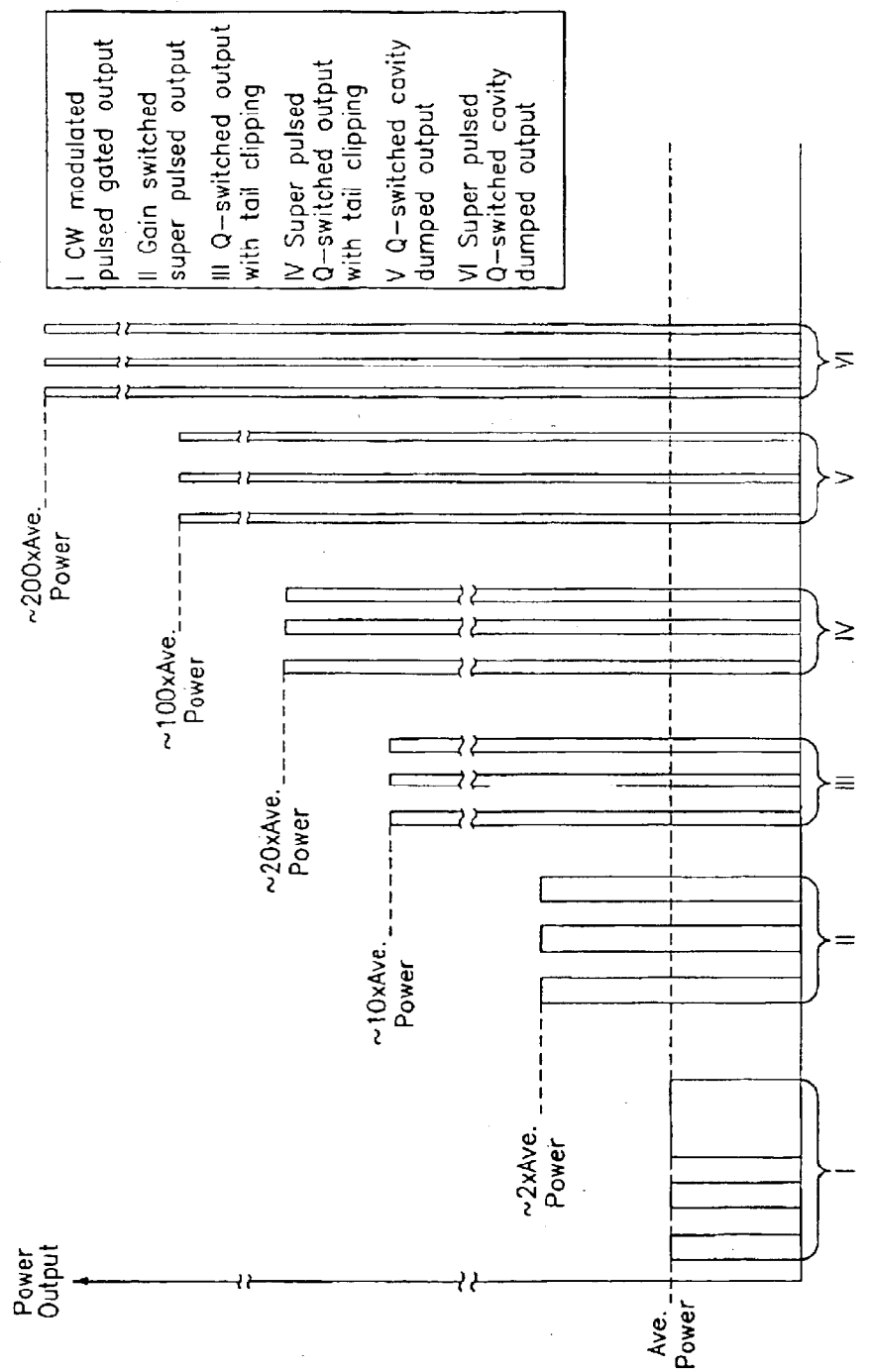
FIG. 30A is a graphical depiction of the relative laser output powers for various modulation techniques wherein format I is for CW pulsed, gated modulation, format II is for super pulsed, format III is for Q-switched with tail clipping, format IV is for super pulsed Q-switched with tail clipping, format V is for Q-switched cavity dumped and format VI is for super pulsed Q-switched cavity dumped.

FIG. 30A pulse formats I and II summarize the various $CO_2$ laser pulse techniques that are presently used to drill or perforate materials namely, amplitude modulated CW operation (I) or super pulsed (II) mode of operation. Pulse formats III through IV of FIG. 30A illustrate the shorter pulse, higher peak power approaches disclosed by this invention, namely Q-switched and simultaneously super pulsed and Q-switched operation. The advantages arising from the use of short, high peak power, high repetition rate, low energy per $CO_2$ laser pulses are well recognized as arising from the fact that as laser pulses become shorter one obtains cleaner holes and the drilling process is conducted more efficiently with minimum adverse thermal effects on the material. Even though the energy per pulse is lower, the high pulse repetition obtained with Q-switched and cavity dumping techniques increase the speed of the drilling process. Consequently, it is believed that the pulsing format of IV in FIG. 30A is better than III, and III is better than II and II is better than I in drilling via holes.

Pulse formats IV and III, where the Q-switched approach provides pulse widths of about 0.1 $\mu$sec to several $\mu$secs, are better than pulse format II. The high repetition rate gain switch approach of pulse format II yields pulse widths of one to tens of microseconds. Pulse format II is better than pulse format I. The pulse gated format I is the normal laser pulsing condition. It yields pulses of a few microseconds duration to CW. The disadvantage of the smaller energy per pulse associated with shorter pulses when compared with the higher energy per pulse for the wider pulses is made up by the higher repetition rate and higher peak power of the shorter pulses which expel the material out of the via hole being drilled by the laser pulses. These parameters result in better-defined, smaller diameter and smoother via or perforation holes. Which of the formats shown in FIG. 30A chosen depends on the trade off between the cost of the laser, the speed of the drilling process and the quality of the holes drilled.

Figure 30B:
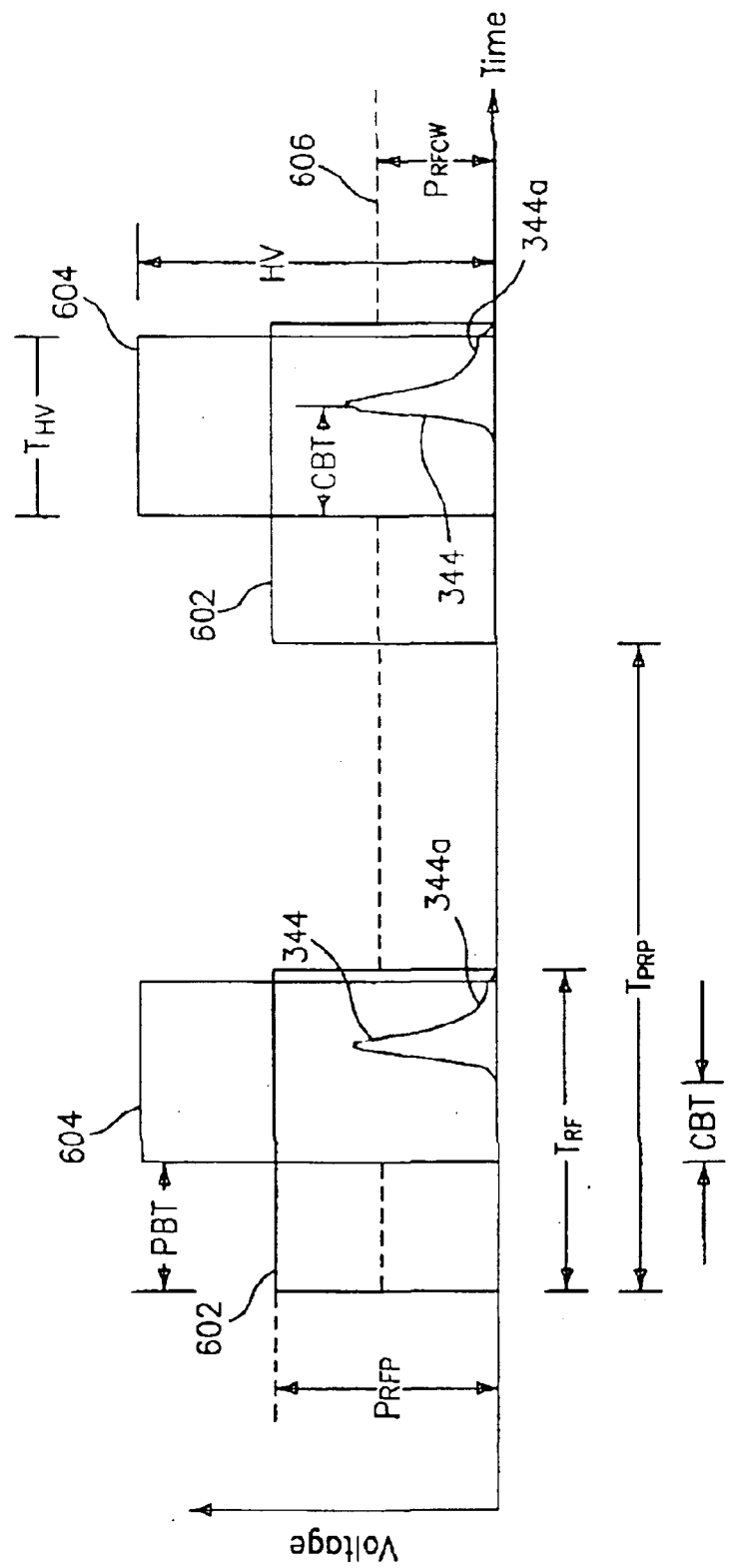
FIG. 30B is a graphical depiction of the relative timing of the application of a super pulsed RF pump power to a laser gain medium and a single pulse applied to an electro-optic crystal in a simultaneously super pulsed pumped and Q-switched laser.

FIG. 30A illustrates the higher peak power advantages realized in operating a laser in a simultaneous super pulsed and Q-switched mode and also in a simultaneous super pulsed, Q-switched cavity dumped mode. Advantages include higher peak power, higher energy per pulse, and faster laser pulse rise time outputs for the same average RF power 606 supplied to the laser head 400 at 716. The higher RF drive power in the super pulsed mode also enables $CO_2$ lasers to operate at higher gas pressures which can yield higher energy per output pulse over non-super pulsed operation. FIG. 30B illustrates repetitive pulse operation of simultaneously super pulsed and Q-switched waveforms. In particular, FIG. 30B shows the RF peak power pulse ($P_{RFP}$) 602 applied to the $CO_2$ gain medium 726 (at 716 in FIGS. 5 and 10), the high voltage pulse 604 applied to the EO crystal 142, the maximum average RF power (i.e., continuous wave radio frequency power 606 ($P_{RFCW}$)) that can be applied to the laser gain medium 726 and the resultant Q-switched laser output pulse 344, and their respective timing relationship with each other at a duty cycle of approximately 50%. In this example, one Q-switched pulse 344 is generated per super RF pulse 602 exciting the $CO_2$ laser discharge (gain medium 726).

Figure 4:
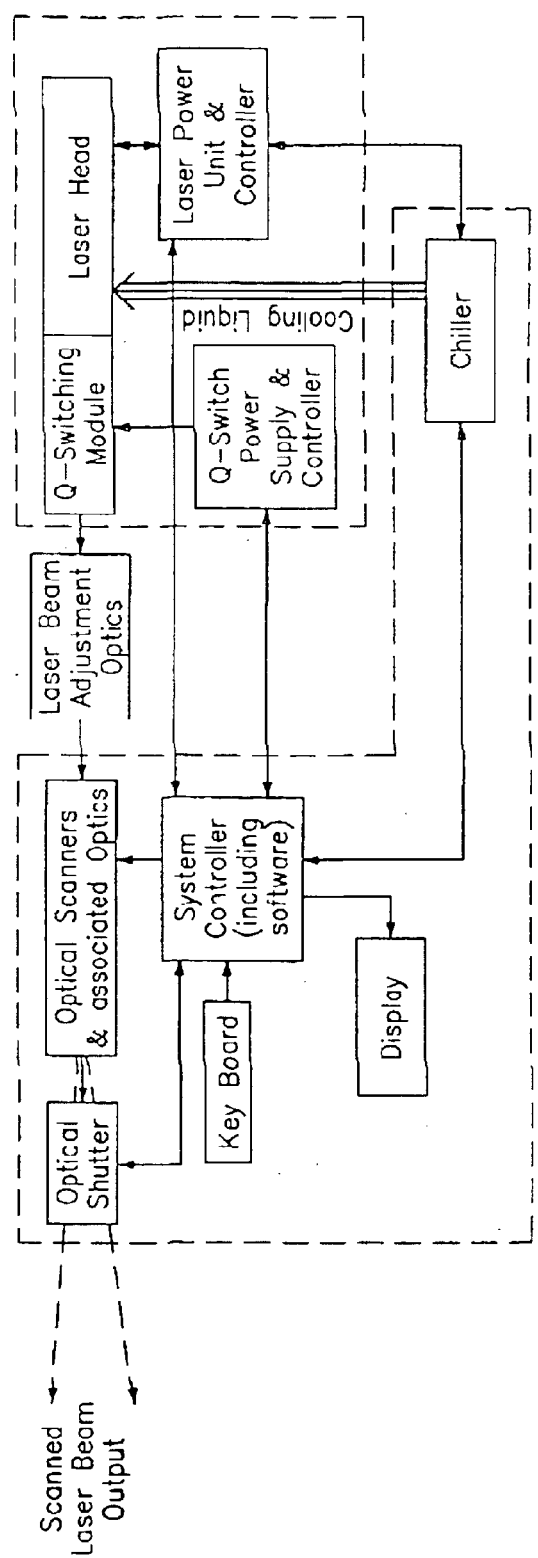
FIG. 4 is a block diagram of a generalized Q-switched laser material working system.

The laser drilling system operator determines the laser's super pulsed repetition frequency, $P_{RF}$, and the duty cycle $\eta$. FIG. 30B illustrates the condition where the peak power of the RF pulse ($P_{REP}$) 602 is about twice the average RF power capability of the power supply ($P_{RFCW}$) 606. This is typical for a duty cycle of 50%. The high voltage 604 applied to the EO crystal 142 is selected to provide a 90-degree polarization rotation as described for FIGS. 16A–17B, 5 and 10. The high voltage 604 is applied to the EO crystal 142 after allowing time, PBT, to elapse after the super pulsed RF is turned on in order for the population inversion in the laser medium to rise for an optimum time, which is about one to two population decay times, $\tau_d$, of the upper laser level. This time is denoted as the population build-up time (PBT) in FIG. 30B. The high voltage 604 causes the laser cavity 406, 408 to switch from a high loss state to a low loss state thereby allowing laser action to take place. This results in a Q-switched laser "spike" of radiation to be emitted by the laser after a cavity build-up time demoted as CBT in FIG. 30B. The system operator determines the delay time PBT between the initiation of the RF super pumping pulse 602 and the initiation of the HV pulse 604 applied to the crystal 142. This is done by inputting this information through the keyboard of FIG. 4 into the system controller, which provides the desired electrical signal to the RS 422 pulse receiver 202 and to the high voltage switch 206.

In FIG. 30B, $T_{RF}$ is the pulse width of the super pulse RF power ($P_{RFP}$) 602, $T_{HV}$ is the pulse width of the high voltage 604 applied across the EOM crystal 142, and $T_{PRP}$ is the super pulse repetition period. The duty cycle is defined as $T_{RF}/T_{PRP}$ and the super pulsed repetition frequency $P_{RF}=1/T_{PRP}$.

If the laser beam 402 is moved from one processing location (i.e. a via) to another processing location on the order of a millisecond or longer, then the super pulse operation can be performed at a much lower duty cycle. The lower duty cycle enables the application of higher RF power (i.e., 604 of FIG. 30B) to the laser discharge within the folded waveguide 806 during the super pulse operation as well as enabling the use of higher gas pressure in the gain medium. Both of these changes result in obtaining higher pulse energies. As a general rule, the amount of power $P_{RFP}$, applied to the gas laser discharge can be approximately equal to $P_{RFCW}$/Duty cycle. As an example, for a duty cycle of 1/6, the power $P_{RFP}$ can be up to $6 \times P_{RFCW}$. This enables obtaining higher peak powers and energies per Q-switched pulse over the operation illustrated in FIG. 30B. A low duty cycle super pulsed and Q-switched operation can operate in a single Q-switched pulse operation or in a multiple Q-switched pulse operation during a single super RF excitation pulse 602 duration $T_{RF}$.

Figure 31:
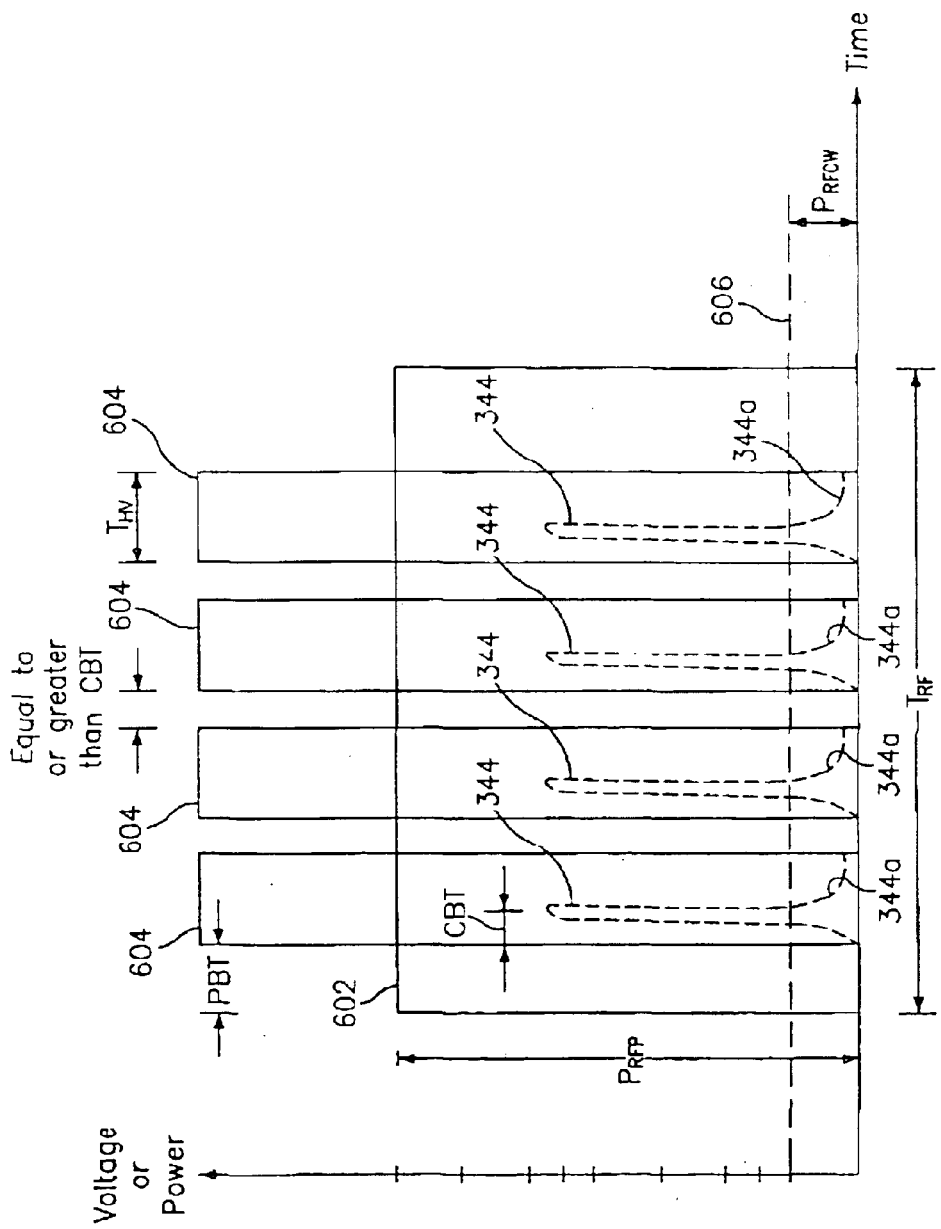
FIG. 31 is a graphical depiction of the relative timing of the application of super pulsed RF pump power to a laser gain medium and the repetitive pulses applied to an electro-optic crystal in a simultaneously super pulsed pumped and repetitively Q-switched laser.

Operation of a low super pulsed duty cycle, simultaneously super pulsed and repetitive Q-switched laser during one super RF pulse excitation of the gain medium 726 is schematically illustrated in FIG. 31. Typical performance parameters obtained for a pulse excitation duty cycle of 0.14 to 0.17, $P_{RFP}$=4 kW to 5 kW and $T_{RF}$=50 $\mu$sec are 20 kW to 25 kW peak power for a single Q-switched laser pulse with an energy of 7 to 8 mJ per pulse. For $P_{RFP}$=4 kW to 5 kW, $T_{RF}$=100 $\mu$see, and generating 10 Q-switched pulses during the excitation period $T_{RF}$=100 $\mu$sec, the average energy for the 10 pulses was 30 mJ. This output performance repeats at a repetition frequency equal to $1/T_{PRP}$. These results were obtained with the laser system depicted in FIGS. 5 or 10. The NV folded waveguide configuration 806 for the $CO_2$ laser head 400 is normally specified as a 100 W output laser when operated continuously.

When the tails 344a of the Q-switched pulse 344 are clipped as in FIG. 23B, the energies normally present in the pulsed long tails 344a of FIG. 23A are not extracted from the laser discharge gain medium 726. Consequently, this energy is saved and thus available for extraction in future Q-switched pulses 344, which follow in the repetitive Q-switching operation. With the tail clipped pulse width of FIG. 23B (i.e. 310 nsec wide at the base of the pulse) and with $T_{RF}$=100 $\mu$sec, and assuming a cavity build-up time of 500 nsec, as many as 123 Q-switched pulses can be repetitively obtained if one allows a 810 nsec time interval between the train of Q-switched pulses (i.e. $100 \times 10^{-6}/810 \times 10^{-9}$=123).

The output energies available from such a repetitive Q-switched pulse train during a super pulse excitation is sufficient to drill the most difficult plastic materials such as those impregnated with glass fibers (e.g., FR4 printed circuit board materials).

FIG. 31 schematically illustrates the operational events that occur for example where $P_{RFP}$=7×$P_{RFCW}$ and a RF pulse excitation 602, of duration $T_{RF}$, driving the laser discharge 726 with four repetitive Q-switched pulses 344 occurring during $T_{RF}$. After the population build-up time (PBT) required to populate the upper laser level of the discharge 726 under the $P_{RFP}$ RF pulse power, high voltage is applied to the EOM crystal 142 thereby turning the laser cavity 406, 408 from a high loss state to a low loss state. This in turn causes laser action to begin and, after the cavity build-up time (CBT), a Q-switched laser pulse 344 rises rapidly to a peak value and then drops to a low level with a long pulse tail 344a. The long pulse tail 344a would decay down to a value equal to the continuous wave output power level of the laser if allowed to do so. After a time duration $T_{HV}$, the high voltage pulse 604 applied to the EOM crystal 142 is turned off, thereby converting the laser cavity 406, 408 from a low loss state to a high loss state. This in turns stops laser action, thereby clipping the tail 344a of the Q-switched laser pulse 344. Clipping the tail 344a off the laser pulse 344 stops the depopulation of the upper laser level, thereby enabling the population of the upper laser level to again begin to build-up under the RF super pulse excitation 602 of the discharge 726.

Figure 32:
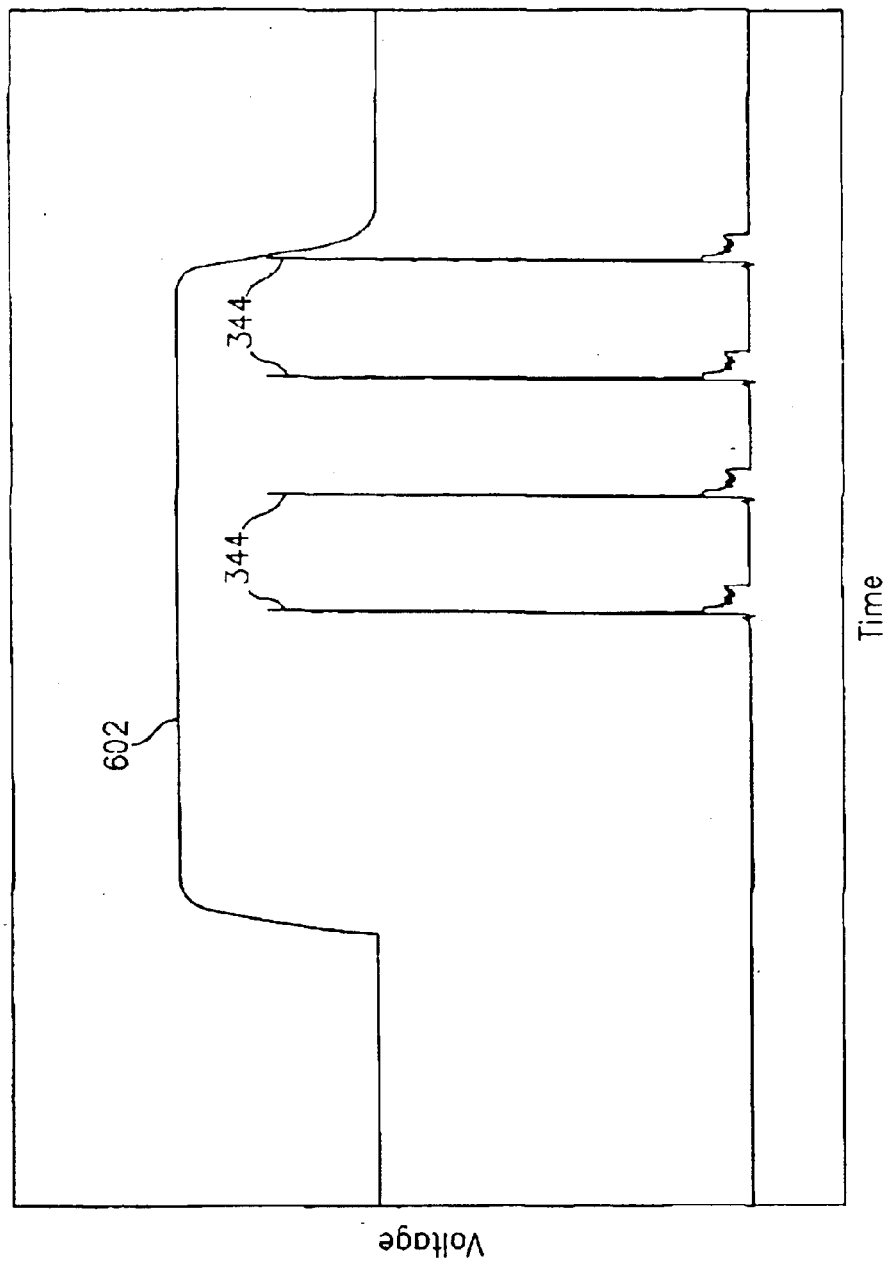
FIG. 32 is a graphical depiction of oscilloscope traces of the experimental results of the application of super pulsed RF pumped power to a laser gain medium and the repetitive Q-switched output laser pulses resulting from repetitive electrical pulses applied to an electro-optic crystal in a simultaneously super pulsed pumped and Q-switched $CO_2$ laser whose output was depicted in of FIG. 31.

FIG. 32 illustrates four Q-switched pulses at a 100 kHz PRF during one super pulse excitation of the laser discharge having a duration of approximately 60 $\mu$sec.

Laser pulse trains comprising of repetitive short pulses contained within a pulse train envelope are superior in drilling materials compared to a single long pulse. (Steve Maynard, Structured Pulses. Advantages in Percussion Drilling; Convergent Prima Newsletter, The Laser's Edge, Vol. 11, Winter 2000, pg. 1–4, which is incorporated herein by reference). Such structured pulse trains are known to achieve higher drilling speed, better hole taper control, better debris control, and enable finer tuning or adjustment of the drilling process when the pulse amplitude is sequentially increased from the beginning to the end of the laser pulse train. Repetitive Q-switching a laser naturally leads to the desired pulse train for hole drilling applications (see FIGS. 30A, 30B and 31 for two repetitive pulse train examples). Additional examples are schematically illustrated in FIG. 30A. They are CWRF pumped or gated (I), super RF pulsed pumped (II), CW pumped Q-switched (III) and super RF pulsed pumped Q-switched (IV) pulse trains.

Figure 33:
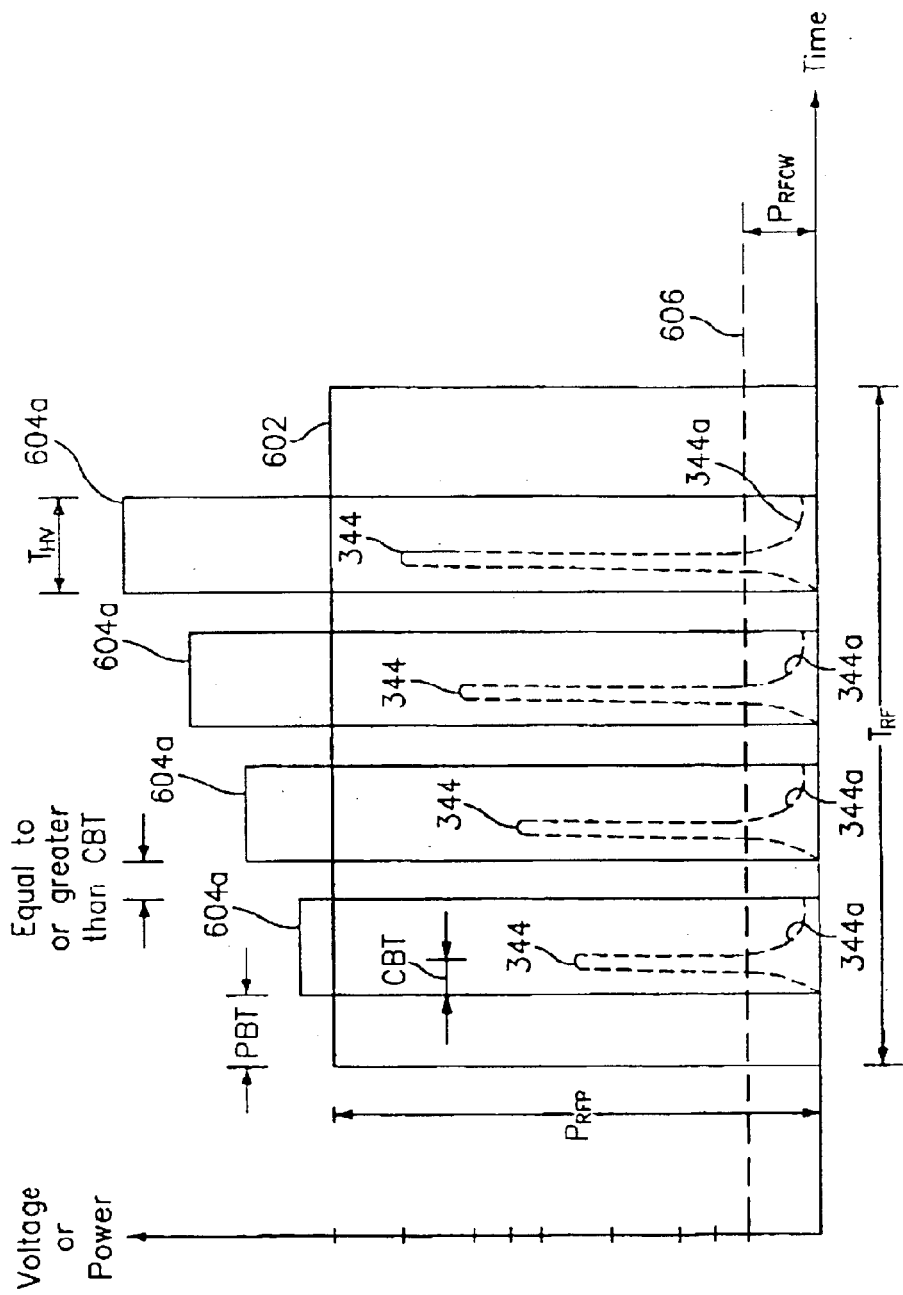
FIG. 33 is a graphical depiction of the relative timing of the application of super pulsed RF pump power to a laser gain medium and the increasing amplitude of repetitive pulses applied to an electro-optic crystal in a simultaneously super pulsed pumped and repetitively Q-switched laser with the Q-switched pulses increasing in amplitude.

By varying the amplitude of the high voltage 604 applied to the EOM crystal 142 a convenient non-mechanical, and therefore fast, variation of the amplitudes of the individual Q-switched pulses can be obtained (FIG. 33). This requires an electronic control of the voltage output of the high voltage power supply 208 of FIG. 5 or 10. This will be described later in this disclosure.

The first Q-switched laser pulse starting the drilling of a hole does not require as much energy as the last Q-switched laser pulse. This is so because the last Q-switched laser pulse is drilling deeper within the material. A larger pulse energy is required for drilling deeper within a material because it takes more laser energy to bring the material out of the hole. By sequentially increasing the laser energy as the pulse train progresses, the surface debris can be better controlled and excessive tapering of the hole can be prevented. Drilling with a structured pulse train results in the ability to begin drilling with low energy per pulse, which causes little or no "bell mouthing" of the hole, and minimal debris splattering. Once below the surface of the material, the energy of the pulses can be increased incrementally as shown in FIG. 33 and the drilling process continues with minimum tapering.

Figure 36:
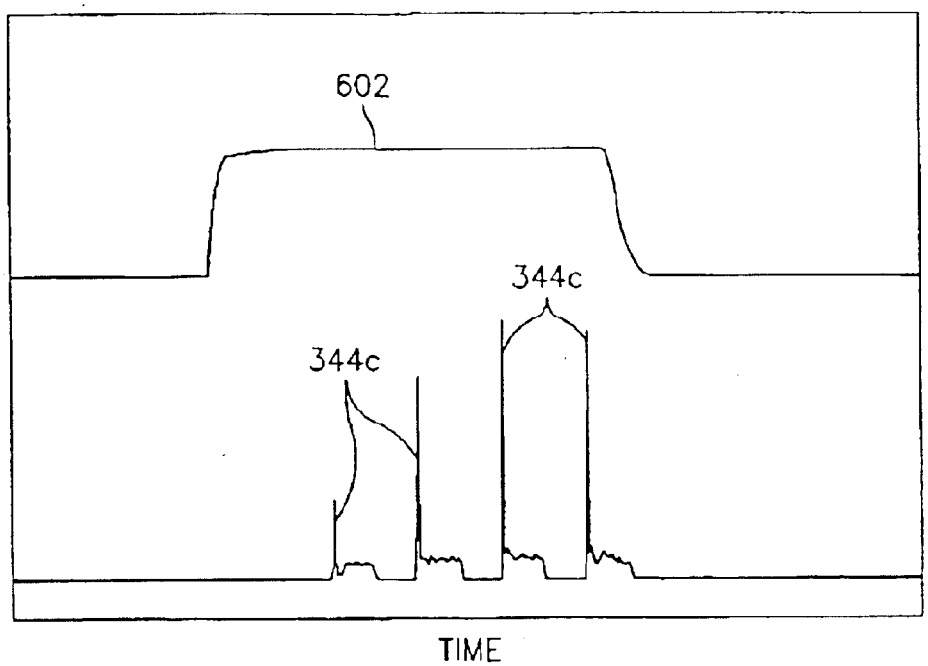
FIG. 36 is a first graphical depiction of oscilloscope traces of the experimental results of a simultaneously super pulsed RF pulsed pumped and Q-switched $CO_2$ laser with increasing amplitude Q-switched output pulses.

FIG. 33 schematically illustrates the events during the simultaneously RF gated super pulsed and repetitive Q-switched pulse train with progressively increasing laser pulse peak power. FIG. 36 illustrates experimental data of the operation of a Q-switched laser in this mode of operation.

Another method of adjusting the output power of the laser is to provide means for rotating TFP 504 of FIG. 29 about its center axis thus varying the amount of polarized laser radiation that can leave the laser housing. This mechanical adjustment is slow and does not allow the adjustment of peak power from pulse to pulse, except for very slow pulse repetition rates.

Control of Output of Individual Q-switching Pulse Peak Power

One can vary the peak power or amplitude of the laser output pulse 344 by varying the voltage 604 applied to the EO crystal 142 thereby not permitting a full 90-degree polarization rotation of the radiation within the laser cavity 406, 408. The voltage 604 applied to the EO crystal 142 can be changed by applying a signal to the high voltage power supply (HVPS) 208 to lower the voltage supplied to the high voltage switch which applies voltage to the EOM crystal 142 (see FIGS. 5 and 10). This can provide a fast, prescribed variation in the output Q-switched peak power from pulse to pulse.

Figure 34:
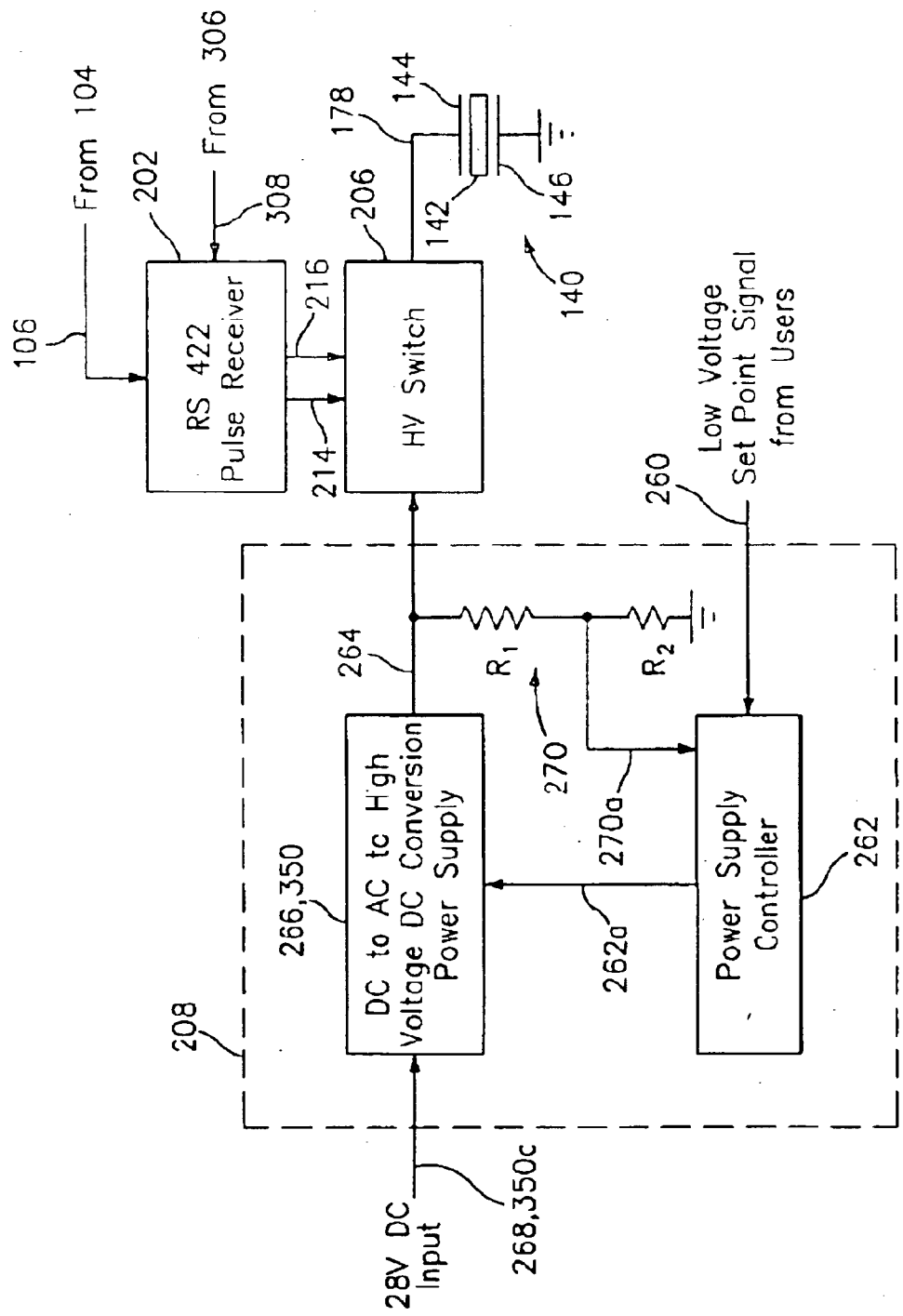
FIG. 34 is a schematic block diagram of the electronic circuit controlling the high voltage applied to the electro-optic modulator of FIGS. 5 and 10 for controlling the peak output pulse power of a Q-switched laser.

The output optical power from a laser is a relatively sensitive function of the laser intra-cavity losses. As such, using a method that allows the intra-cavity losses to be adjusted would permit the user to vary the laser output power in response to process demands. Since a Q-switched laser utilizes an internal variable optical loss modulator, such as the EOM 140, one method for accomplishing this task is to control the amplitude of the high voltage pulse applied to the electro-optic modulator 140. One method of varying the pulse amplitude of the laser output is to adjust the output of a low voltage DC-to-AC-to-high voltage DC power converter power supply 266 shown in FIG. 34. This drives the EOM crystal 142 through the HV switching circuit 206 of FIGS. 5 and 10. In this approach, the operator of the laser material processing system of FIG. 4 supplies a low voltage DC setpoint command 260 to a power supply controller 262 which then adjusts the high voltage output 264 of the power converter 266 to minimize the difference between the output voltage 264 and the user supplied setpoint 260 by way of the voltage divider 270. This is illustrated in the block diagram 208 of FIG. 34.

It should be noted that the power converter 266 can be a linear regulator, switching regulator, or a hybrid. In addition, in cases where a free running power conversion stage is employed, the user setpoint 260 can be used to adjust the input supply voltage 268, which feeds the power converter 266. Since this approach adjusts the output 264 of the power converter 266 in response to user supplied setpoint command 260 the response time will be relatively slow, e.g., 10 kHz and lower. The power converter 266 plus the power supply controller 262 and the voltage divider network 270 comprise the high voltage power supply (HVPS) 208 of FIGS. 5 and 10.

The high voltage output 264 from the power converter 266 is applied to the high voltage switching circuit 206 of FIGS. 5 and 10 which turns the high voltage signal 178 across the EOM modulator 140 on and off as explained for FIGS. 5 and 10. The operation of the electronics schematically illustrated by FIG. 34 enables one to vary the Q-switched pulse 604a amplitudes of each pulse within the pulse train as exemplified by FIG. 33.

Figure 35:
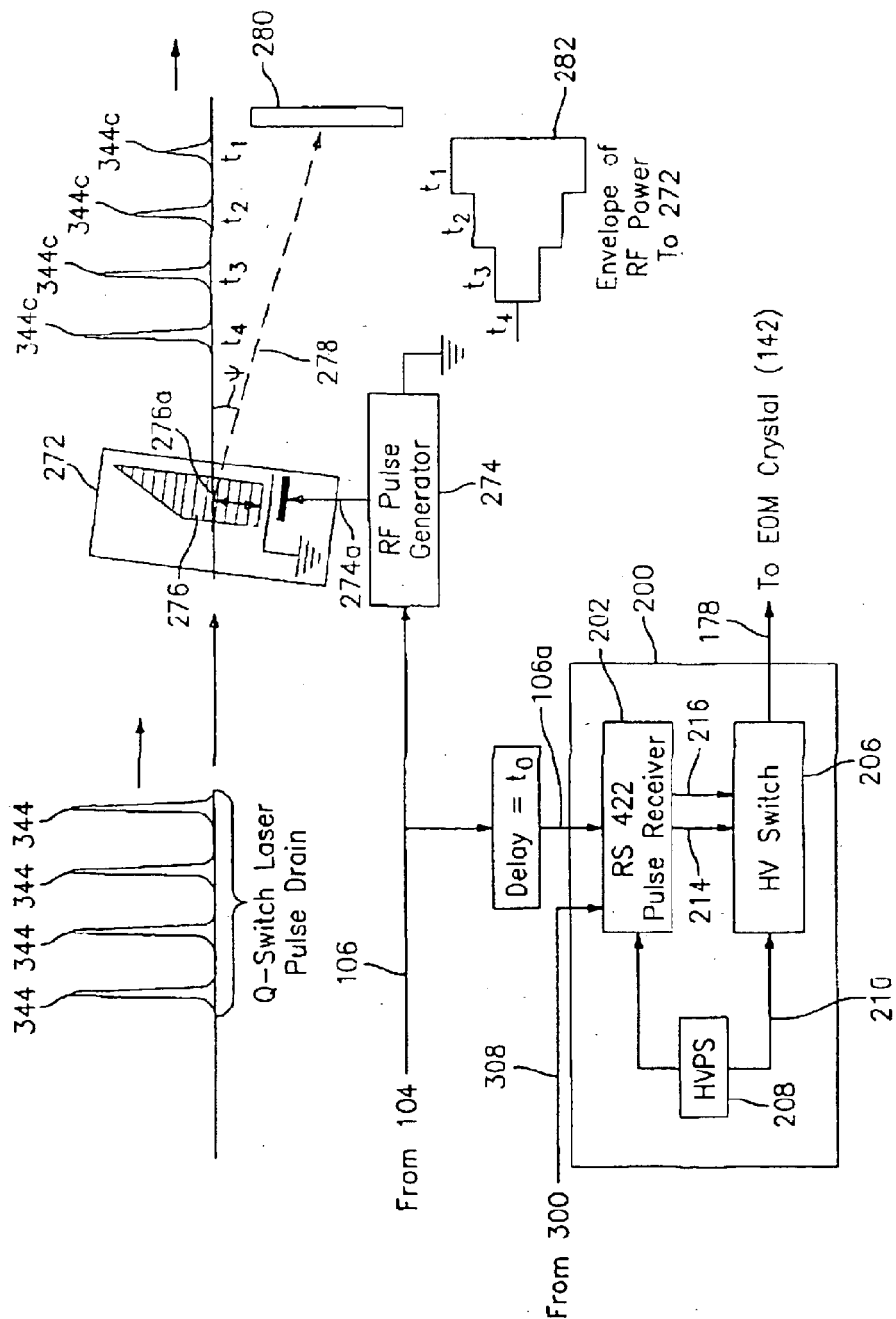
FIG. 35 is a schematic block diagram of an acousto-optic system for controlling the output peak power of Q-switched $CO_2$ lasers pulses.

Control of the Output of Individual Q-Switched Pulses within a Train with an Acousto-optic Cell An alternative method of varying the amplitude of individual Q-switched laser pulses 344, within the train of pulses 604 604a in FIGS. 31 and 33, is to use an optical loss modulator located external to the laser cavity 406, 408 of FIGS. 5 and 10 in order to obtain low taper in holes drilled by the laser. FIG. 35 schematically illustrates one approach by the use of an acousto-optic cell 272.

The Q-switched pulse train 344 emitted by the laser is transmitted through an acousto-optic (AO) cell 272. Germanium (Ge) is a good AO cell material for $CO_2$ laser radiation; although their higher optical loss and slower switching times when compared with EO modulators does not recommend them for intra-cavity loss modulation applications in $CO_2$ lasers utilized in industrial applications. Varying the RF signal 274a applied to the AO cell 272, varies the strength of an optical phase grating 276 generated within the Ge material. Such an optical phase grating 276 is generated by the ultrasonic wave propagating through the Ge material as is well known in the art. The optical phase grating 276 diffracts laser radiation 278 at the Bragg angle, $\psi$, out of the laser radiation 402 propagating through the AO cell 272. The Bragg angle, $\psi$, is determined by the ratio of the laser wavelength to the ultrasonic wavelength as is well known in the art. The higher the RF power 274a applied to the AO cell 272, the greater the amount of radiation 278 diffracted out of the laser beam 402 which is performing the drilling into a side order of the acoustically variable optical phase grating 276. This results in progressively larger amplitudes with time of the Q-switched pulses 344c, as seen at times $t_1$, $t_2$, $t_3$, and $t_4$. The diffracted laser beam is diverted onto an optical absorber or stop 280.

By synchronizing the RF power 274a applied to the AO cell 272, at a prescribed power level, to coincide with the arrival at 276a of a prescribed Q-switched laser pulse 344 propagating through the AO cell 272, one can vary the amplitude of each laser pulse 344 to a desired level. Since there is a time delay, $t_o$, necessary for the acoustic radiation to travel to the point 276a where the laser beam 402 passes through the AO cell 272, a comparable delay is induced in the signal 106 applied to the pulse receive 202, so as to obtain synchronization between the laser pulse train 344 and the RF power 274a applied to the AO cell 272 as shown in FIG. 35. This results in the increasing amplitudes of the Q-switched pulse train 344c as time increases from $t_1$ to $t_2$ to $t_3$ to $t_4$. The envelope of the RF power applied to the AO cell 272 is shown at 282 in FIG. 35. As can be seen, at time $t_1$, the envelope 282 of RF power is relatively high so that it causes the corresponding laser output pulse 344c at time $t_1$ to be relatively small because of the large diffraction out of the laser pulse by the acoustic wave generated by the RF power when the acoustic wave intersects the laser pulse in the AO cell. However, as the magnitude of the RF envelope 282 diminishes at times $t_2$, $t_3$ and $t_4$, the corresponding amplitudes of the Q-switched pulse train 344c increase respectively because of the smaller amount of diffraction caused by the lower amplitude acoustic waves generated by the decreasing RF power envelope 282.

Control of Individual Q-switched Pulse Peak Power by Control of Timing Between the RF Super Pulse Exciting the Discharge and the High Voltage Applied to the EOM Another method for obtaining variable peak power in the laser output pulse 344 as in FIG. 33 and the upper portion of FIG. 35 is to utilize the fact that the gain of the laser medium 726 begins to increase up to a maximum value in a time $T_{PBT}$ after the input power 602 (FIGS. 31 and 33) energizing the laser is turned on. Consequently, the timing between the initiation of the input power 602 energizing the laser and the switching of the laser cavity comprising mirrors 406, 408 from a high loss state to the low loss state (i.e. in the Q-switched case) will vary the peak power of an emitted laser pulse. If a shorter time is provided between the initiation of the laser pumping energy and the switching of the laser cavity 406, 408 from a high loss condition to a low loss condition, then the gain of the laser medium will not have peaked. Consequently the first pulse to be emitted will not have as large a peak power as it could have. After the Q-switched pulse is emitted by the laser, the gain of the medium has dropped down to the value required to maintain CW oscillation for the cavity loss condition. The gain of the laser medium 726 then begins to build up again when the cavity 406, 408 is switched to a high loss condition. The time required to exceed the laser gain at which the first laser pulse was emitted is now shorter because the gain build up begins at a larger population level than was the case for the first Q-switched pulse. If one then again switches from the high loss condition to a low loss condition at a time so that the gain is higher then when the first Q-switched pulse was emitted, then the second emitted laser pulse will have a higher peak power than the first pulse. These events can continue for a number of Q-switched laser pulses, thereby obtaining the increasing peak power of succeeding subsequent pulses until a maximum gain condition is reached. The number of pulses capable of being emitted by the laser is determined by the pumping intensity, the gain threshold of the laser, the time interval desired between the Q-switched pulses, the gas pressure of the laser, the cooling capability of the laser design and the amount of time delay between the initiation of the RF super pulse 602 pumping of the laser and the switching of the laser cavity 406, 408 from a high loss state to a low loss state.

FIG. 36 illustrates the results when the RF super pulse 602 of FIG. 32 is shortened from 60 microsecond to approximately 48 microseconds, the time interval between pulses is maintained at approximately 10 microseconds for both cases, and the time between switching from a high cavity loss to a low cavity loss condition is shortened so that the first Q-switched pulse is emitted approximately 14 microseconds as indicated in FIG. 36. Note that under these conditions, four Q-switched pulse are obtained with each succeeding pulse increasing in amplitude. The advantage of this approach over that of FIGS. 33 and 35 is simplicity and cost.

Figure 37:
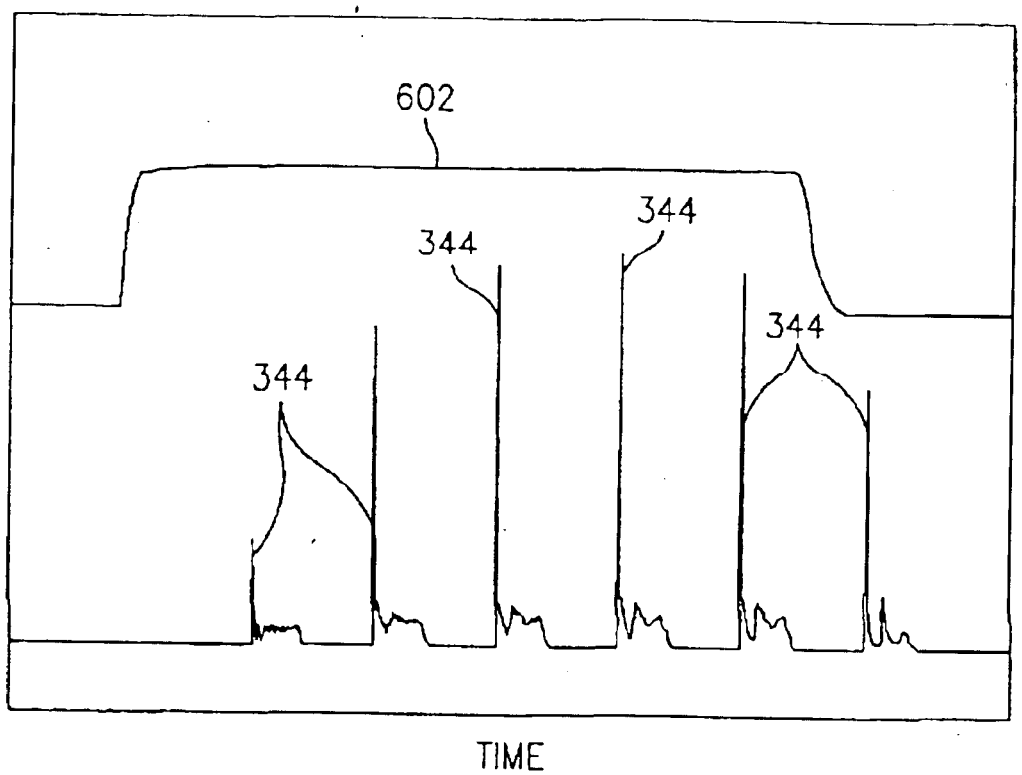
FIG. 37 is a second graphical depiction of oscilloscope traces of the experimental results of a simultaneously super RF pulsed pumped and Q-switched $CO_2$ laser showing varying repetitive Q-switched output pulses.

For example, if the RF pumping super pulse 602 is increased to 72 microseconds and the time interval between pulses and the initiation of the high loss to low loss optical cavity switch after the initiation of the RF super pulse pumping process remain essentially the same, then the number of output pulses 344 increases to 6 pulses but the peak power of the last two pulses are decreasing in peak power because of the heating of the laser gas (see FIG. 37). Such performance is generally not desirable in hole drilling operations. The time interval between pulses is selected based on the optimum time for the material removal from the hole before the arrival of the next pulse on the material. The approaches of FIGS. 33 and 35 provide for greater freedom and therefore for simpler optimization of the time interval between emitted laser pulses and more independent control of the peak power of the laser pulses. None-the-less, if the approach of FIG. 36 satisfies the application, it is lower in laser implementation cost.

The concept presented is described in terms of a $CO_2$ Q-switched laser but the principle is applicable to a Q-switched/cavity dumped $CO_2$ lasers as well as to other lasers such as semiconductor diode pumped or flash lamp pumped solid state laser such as YAG lasers.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A Q-switched $CO_2$ laser system for material processing, the system comprising:
   an optical cavity;
   a gain medium positioned within the optical cavity;
   a Q-switch operative to switch the cavity between a high loss state and a low loss state, wherein during the high loss state a gain in the gain medium increases and thereafter when the Q-switch is changed to a low loss state the gain in the gain medium is depleted creating a high peak power pulse and thereafter when the Q-switch is changed to a high loss state the Q-switch pulse is coupled out of the cavity;
   an optical detector operable to detect an emission of the Q-switch pulse and generate an output signal in response thereto;
   a timer operable to provide a control signal to the Q-switch in response to the output signal for switching back to the high loss state, thereby controlling the length of the generated Q-switch pulse.

2. The laser system as set forth in claim 1 further comprising:
   a comparator for receiving the output signal from the detector and supplying a trigger signal to the timer when a voltage generated by the detector reaches a predetermined level.

3. The laser system as set forth in claim 2 further comprising a signal amplifier receptive of the detector output signal providing thereby an amplified detector output signal to the comparator.

4. The laser system as set forth in claim 2 further comprising a first bias circuit for setting the value of the reference signal with respect to the output signal of the detector.

5. The laser system as set forth in claim 2 wherein:
   the output signal from the detector is split into a first signal component directed to a time delay device and a second signal component directed to an attenuator, wherein output portions from the time delay device and the attenuator are sent to the comparator which generates the trigger signal to the Q-switch when the output portions are about equal.

6. A $CO_2$ laser system for material processing, the system comprising:
   a folded waveguide laser having a plurality of wavelength selective mirrors defining an optical cavity;
   a gain medium positioned within the optical cavity for generating a laser beam;
   a cavity loss modulator for switching loss within the cavity from a high loss state to a low loss state or a low loss state to a high loss state, generating thereby one or more laser pulses;
   a pulsed signal generation system connected to the cavity loss modulator for delivering pulsed signals to the cavity loss modulator thereby controlling the state of optical loss within the optical cavity; and
   a control unit connected to the pulsed signal generation system for controlling the pulsed signal generation system.

7. The laser system as set forth in claim 6 further comprising:
   a pulse tail clipping circuit receptive of a portion of the laser beam and in communication with the pulsed signal generation system for truncating a part of the laser pulses.

8. The laser system as set forth in claim 6 further comprising:
   a shutter system connected to the control unit for alternately blocking and passing the laser beam.

9. The laser system as set forth in claim 6 wherein:
   the cavity loss modulator includes an active optical crystal having an entrance surface receptive of the laser beam and an opposing laser beam exit surface.

10. The laser system as set forth in claim 6 wherein:
    each of the plurality of wavelength selective mirrors has a thin film deposited thereon to at least partially reflect a desired gain line in the optical cavity.

11. The laser system as set forth in claim 10 wherein:
    the thin film is a ZnSe thin film.

* * * * *